（12） United States Patent
McEnroe

(10) Patent No.: US 11,420,893 B2
(45) Date of Patent: *Aug. 23, 2022

(54) SYSTEMS AND METHODS FOR MINIMIZING SHR FROM PIERCING DURING PHARMACEUTICAL PART CONVERTING USING A GAS FLOW

(71) Applicant: CORNING INCORPORATED, Corning, NY (US)

(72) Inventor: David John McEnroe, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 174 days.

This patent is subject to a terminal disclaimer.

(21) Appl. No.: 16/197,187

(22) Filed: Nov. 20, 2018

(65) Prior Publication Data

US 2019/0161384 A1    May 30, 2019

Related U.S. Application Data

(60) Provisional application No. 62/592,631, filed on Nov. 30, 2017.

(51) Int. Cl.
*C03B 33/06* (2006.01)
*C03B 33/095* (2006.01)
(Continued)

(52) U.S. Cl.
CPC ............... *C03B 33/06* (2013.01); *C03B 7/01* (2013.01); *C03B 23/043* (2013.01);
(Continued)

(58) Field of Classification Search
None
See application file for complete search history.

(56) References Cited

U.S. PATENT DOCUMENTS 1,832,039 A * 11/1931 Millar .................. C03B 23/213
65/285
1,981,692 A    11/1934 Dichter
(Continued)

FOREIGN PATENT DOCUMENTS

AT          404249 B      9/1998
CA         2298204 A1    8/2000
(Continued)

OTHER PUBLICATIONS

Iacocca, et al., "Corrosive attack of glass by a pharmaceutical compound," Journal of Materials Science, 42:801-811, Springer Science+Business Media, LLC (2007), DOI: 10.1007/s10853-006-0156-y.
(Continued)

*Primary Examiner* — Queenie S Dehghan
(74) *Attorney, Agent, or Firm* — F. Brock Riggs

(57) ABSTRACT

Systems for producing articles from glass tube include a converter having a base with a plurality of processing stations and a turret moveable relative to the base. The turret indexes a plurality of holders for holding the glass tubes successively through the processing stations. The systems further include a gas flow system or a suction system for producing a flow of gas through the glass tube during one or more heating, forming, separating or piercing operations. The flow of gas through the glass tube produced by the gas flow system or suction system may be sufficient to evacuate or purge volatile constituents of the glass from the glass tube and/or pierce a meniscus formed on the glass tube during separation, thereby reducing the Surface Hydrolytic Response (SHR) of the interior surface of the glass tube and articles made therefrom.

22 Claims, 31 Drawing Sheets

(51) Int. Cl.
*C03B 23/043* (2006.01)
*C03B 23/09* (2006.01)
*C03B 7/01* (2006.01)
*C03B 23/11* (2006.01)
*C03B 23/045* (2006.01)
*C03B 35/26* (2006.01)

(52) U.S. Cl.
CPC ............ *C03B 23/045* (2013.01); *C03B 23/09* (2013.01); *C03B 23/092* (2013.01); *C03B 23/095* (2013.01); *C03B 23/099* (2013.01); *C03B 23/11* (2013.01); *C03B 23/112* (2013.01); *C03B 33/095* (2013.01); *C03B 35/26* (2013.01)

(56) References Cited

U.S. PATENT DOCUMENTS

| | | | |
|---|---|---|---|
| 2,046,413 A | | 7/1936 | Richardson |
| 2,151,840 A | | 3/1939 | Dichter |
| 3,403,016 A | | 9/1968 | Smith |
| 3,455,667 A | * | 7/1969 | Snitzer .................. C03B 33/06 65/56 |
| 3,703,363 A | | 11/1972 | Heaton et al. |
| 3,736,118 A | | 5/1973 | Heflich et al. |
| 3,874,867 A | | 4/1975 | Dichter |
| 4,080,189 A | | 3/1978 | Dichter |
| 4,330,317 A | | 5/1982 | Vertova |
| 4,347,069 A | * | 8/1982 | Haney .................. C03B 23/045 427/231 |
| 4,441,908 A | | 4/1984 | Zauner |
| 4,516,998 A | | 5/1985 | Ritt et al. |
| 4,708,730 A | * | 11/1987 | Ziegler ................. C03B 9/3609 65/114 |
| 5,171,343 A | | 12/1992 | Leber et al. |
| 5,178,401 A | | 1/1993 | Mannl et al. |
| 5,252,115 A | | 10/1993 | Mannl et al. |
| 5,300,134 A | | 4/1994 | Mannl et al. |
| 5,695,539 A | | 12/1997 | Dichter |
| 6,305,729 B1 | | 10/2001 | Mukasa |
| 6,310,318 B1 | | 10/2001 | Vetter et al. |
| 6,792,743 B2 | | 9/2004 | Odell et al. |
| 7,980,096 B2 | | 7/2011 | Bartsch |
| 8,522,575 B2 | | 9/2013 | Wada |
| 9,409,808 B2 | | 8/2016 | Moseler et al. |
| 2004/0129026 A1 | | 7/2004 | Bartsch |
| 2014/0151371 A1 | | 6/2014 | Chang et al. |
| 2014/0373574 A1 | * | 12/2014 | Moseler ................ C03B 9/3841 65/111 |
| 2015/0197443 A1 | | 7/2015 | Voelkl et al. |
| 2015/0218047 A1 | | 8/2015 | Xu et al. |
| 2015/0299851 A1 | | 10/2015 | Bicker et al. |
| 2016/0016841 A1 | | 1/2016 | Frost et al. |
| 2016/0107918 A1 | | 4/2016 | Delgado Carranza |
| 2016/0130170 A1 | | 5/2016 | Maennl et al. |
| 2016/0272527 A1 | | 9/2016 | Moseler et al. |
| 2019/0263707 A1 | | 8/2019 | Frost et al. |

FOREIGN PATENT DOCUMENTS

| | | |
|---|---|---|
| CN | 1319570 A | 10/2001 |
| CN | 1526672 A | 9/2004 |
| CN | 2740604 Y | 11/2005 |
| CN | 103183466 A | 7/2013 |
| CN | 103732548 A | 4/2014 |
| CN | 105050978 A | 11/2015 |
| CN | 105377779 A | 3/2016 |
| CN | 107074611 A | 8/2017 |
| DE | 10151088 C1 | 5/2003 |
| DE | 102012109189 B3 | 3/2014 |
| EP | 1369392 B1 | 6/2010 |
| GB | 191118074 A | 8/1912 |
| GB | 527692 A | 10/1940 |
| JP | 2010274091 A | 12/2010 |
| JP | 2012180276 A | 9/2012 |
| WO | 2018091234 A1 | 5/2018 |

OTHER PUBLICATIONS

International Search Report & Written Opinion dated Feb. 14, 2019 for PCT/US2018/062919 filed Nov. 28, 2018. pp. 1-11.
International Search Report & Written Opinion dated Feb. 14, 2019 for PCT/US2018/062923 filed Nov. 28, 2018. pp. 1-11.
International Search Report & Written Opinion dated Feb. 14, 2019 for PCT/US2018/062924 filed Nov. 28, 2018. pp. 1-12.
International Search Report & Written Opinion dated Feb. 14, 2019 for PCT/US2018/062925 filed Nov. 28, 2018. pp. 1-10.
Non-Final Office Action dated Nov. 30, 2020 for U.S. Appl. No. 16/198,041, filed Nov. 21, 2018. pp. 1-17.
Final Office Action dated Jun. 14, 2021, for U.S. Appl. No. 16/197,971, filed Nov. 21, 2018. pp. 1-10.

* cited by examiner

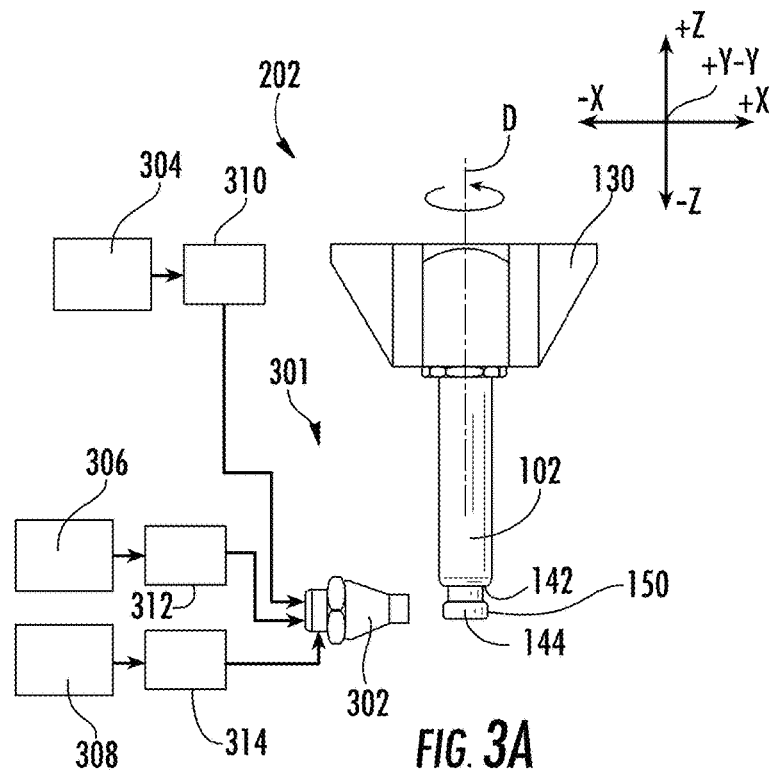
FIG. 3A
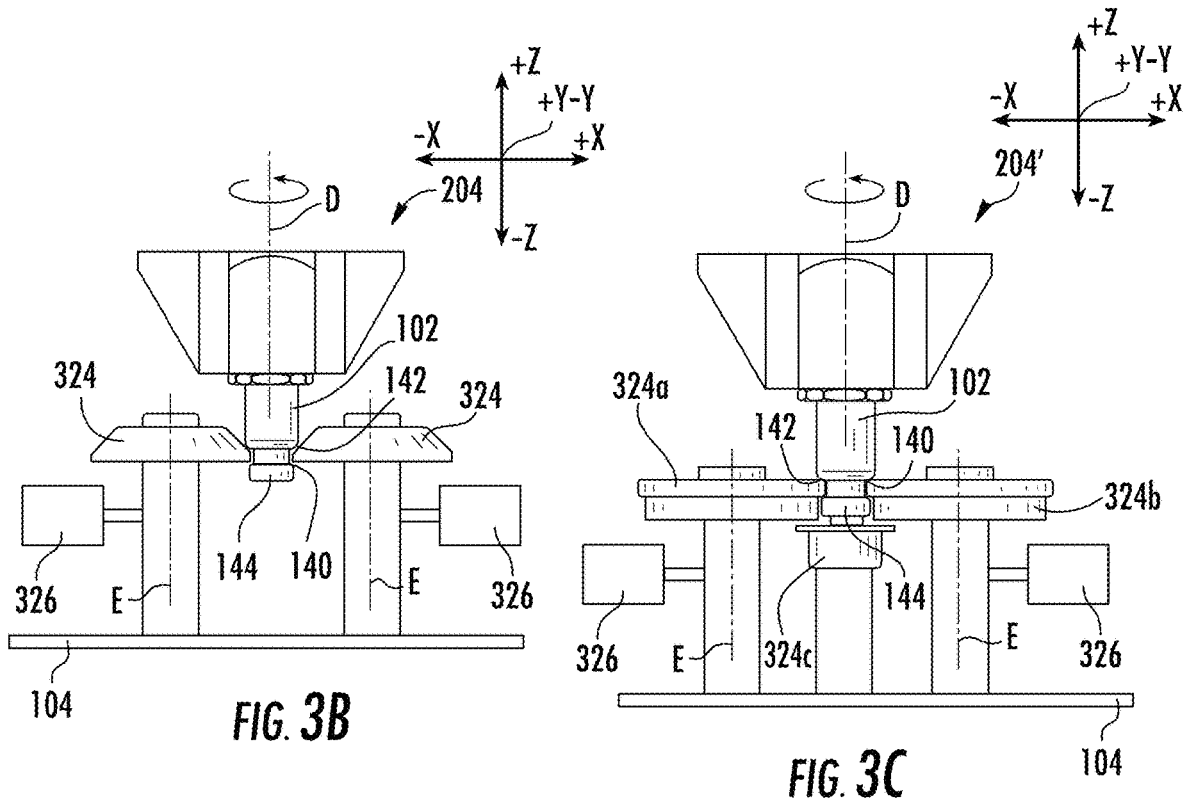
FIG. 3B
FIG. 3C

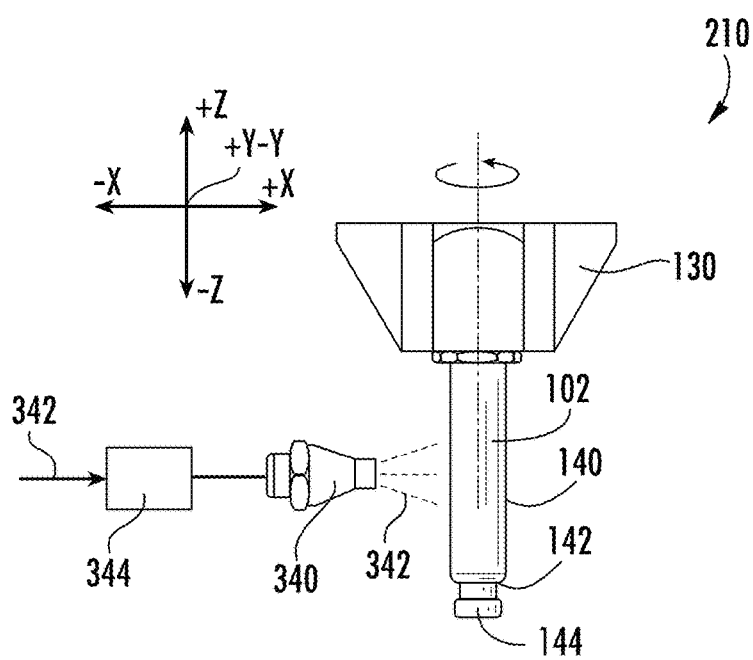
FIG. 3D
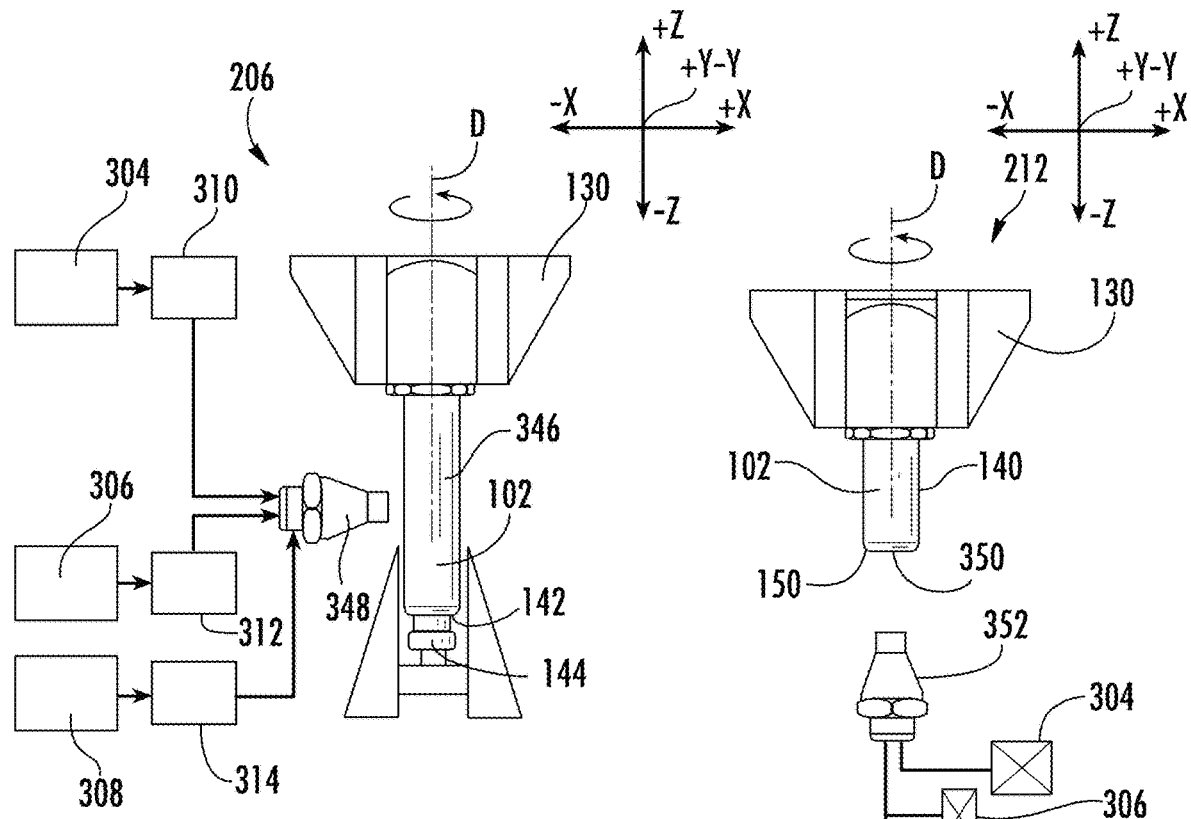
FIG. 3E
FIG. 3F

SYSTEMS AND METHODS FOR MINIMIZING SHR FROM PIERCING DURING PHARMACEUTICAL PART CONVERTING USING A GAS FLOW

CROSS-REFERENCE TO RELATED APPLICATION

This application claims the benefit of priority under 35 U.S.C. § 120 of U.S. Provisional Application No. 62/592,631 filed Nov. 30, 2017, and entitled "Systems and Methods for Minimizing SHR from Piercing During Pharmaceutical Part Converting Using a Gas Flow," the entire contents of which are hereby incorporated by reference.

BACKGROUND

Field

The present specification generally relates to systems and methods for producing glass articles from glass tubes, in particular systems and methods for reducing Surface Hydrolytic Response (SHR) of the glass article resulting from conversion of the glass tube.

Technical Background

Historically, glass has been used as the preferred material for packaging pharmaceuticals because of its hermeticity, optical clarity, and excellent chemical durability relative to other materials. Specifically, the glass used in pharmaceutical packaging must have adequate chemical durability so as to not affect the stability of the pharmaceutical formulations contained therein. Glasses having suitable chemical durability include those glass compositions within the ASTM standard 'Type IA' and 'Type IB' glass compositions which have a proven history of chemical durability.

The chemical durability of a glass, as used herein, refers to the ability of the glass to resist degradation upon exposure to specified chemical conditions. One measure of the chemical durability of the glass is the Surface Hydrolytic Response (SHR) of the glass, which can be thought of as a measure of the chemical stability of the glass when contacted with a pharmaceutical composition. The SHR of the glass can be assessed according to one of three analytical tests described in United States Pharmacopiea (USP) <660> entitled "Containers-Glass 1": the Glass Grains Test, the Surface Glass Test, and the Surface Etching Test. Other tests to assess the SHR of glass may include: DIN 12116 dated March 2001 and entitled "Testing of glass—Resistance to attack by a boiling aqueous solution of hydrochloric acid—Method of test and classification"; ISO 695:1991 entitled "Glass—Resistance to attack by a boiling aqueous solution of mixed alkali—Method of test and classification"; and ISO 720:1985 entitled "Glass—Hydrolytic resistance of glass grains at 121 degrees C.—Method of test and classification." The chemical durability of the glass may also be assessed according to ISO 719:1985 "Glass—Hydrolytic resistance of glass grains at 98 degrees C.—Method of test and classification," in addition to the above referenced standards.

Glass tubing may be converted into other glass articles, such as various glass containers for use in pharmaceutical applications including, without limitation, vials, syringes, ampoules, cartridges and other glass articles. The glass tubing may be converted, for example, in "converting machines." Converting machines have been used for over 75 years, and are currently made by various commercial and internal equipment suppliers. These converting machines typically reform long glass tube lengths into a plurality of glass articles using steps which include flame working, rotating and stationary tool forming, thermal separation, or score and shock cutoff steps.

During certain flame working operations that occur in the converting machine during the converting process, the glass tube may be heated to temperatures sufficient to vaporize one or more volatile constituents of the glass composition. Gas containing volatiles are injected into the working tube's interior in piercing. Effects from exhaust systems, burners, buoyancy-driven chimney flow, and cooling jets can move the volatile-containing gases in the tube interior, causing them to move upward, downward or to stagnate. These vaporized chemical components can condense on the cooler interior surfaces of the glass tube, which cause an increase in the SHR of the glass article.

SUMMARY

Accordingly, a need exists for systems and methods for converting glass tubes into glass articles, such as pharmaceutical packaging, while maintaining the surface hydrolytic resistance of the glass articles.

In a first aspect of the present disclosure, a system for producing glass articles from glass tubing may include a converter including a plurality of processing stations that include at least one heating station, at least one forming station, and a separating station. The converter may be operable to index a glass tube through the plurality of processing stations. The system may further include a gas flow system that includes a manifold fluidly couplable to a gas source, and a plurality of glass tube connectors, each glass tube connector removably coupleable to a distal end of the glass tube and fluidly coupled to the manifold by a conduit. For at least one of the glass tube connectors, the gas flow system may be operable to pass a gas from the manifold, through the conduit, through the glass tube connector, and into the distal end of the glass tube, and passing the gas into the distal end of the glass tube may produce a flow of gas adjacent to a proximal end of the glass tube. The flow of gas may be operable to remove at least a portion of an atmosphere from an interior of the glass tube and reduce contamination of an inner surface of the glass tube by alkali released from the glass tube.

A second aspect of the present disclosure may include the first aspect, wherein the gas flow system may be operable to deliver a gas pulse to the distal end of the glass tube.

A third aspect of the present disclosure may include the second aspect, wherein the gas pulse may have a duration less than a sum of an index time and a dwell time of the converter.

A fourth aspect of the present disclosure may include either of the second or third aspects, wherein the separating station may be a thermal separating station and the gas pulse may be sufficient to open a meniscus of glass formed at the proximal end of the glass tube during thermal separation.

A fifth aspect of the present disclosure may include any of the first through fourth aspects, wherein each of the plurality of glass tube connectors may include a central bore extending axially through the glass tube connector and a swivel connector disposed at least partially within the central bore.

A sixth aspect of the present disclosure may include any of the first through fifth aspects, wherein each of the plurality of glass tube connectors may comprise a stopper removably insertable into the distal end of the glass tube.

A seventh aspect of the present disclosure may include any of the first through sixth aspects, wherein each of the plurality of glass tube connectors may comprise a cap coupleable to an outer surface of the glass tube.

An eighth aspect of the present disclosure may include any of the first through seventh aspects, wherein the manifold may comprise a plurality of valves, each of the plurality of valves fluidly coupled to one of the plurality of flexible conduits.

A ninth aspect of the present disclosure may include the eighth aspect, wherein the manifold may comprise a plurality of valve actuators, each of the plurality of valve actuators operatively coupled to one of the plurality of valves, wherein each valve actuator may be operable to open and close the associated valve to deliver the gas pulse to the distal end of the glass tube.

A tenth aspect of the present disclosure may include any of the first through ninth aspects, further comprising at least one flow meter fluidly coupled to the manifold and operable to measure a flow rate or a total flow of the gas pulse to the distal end of the glass tube.

An eleventh aspect of the present disclosure may include any of the first through tenth aspects, wherein the gas flow system may further comprise at least one flow controller operable to vary a flow rate of the gas in response to changes in a length of the glass tube.

A twelfth aspect of the present disclosure may include any of the first through eleventh aspects, wherein the manifold may comprise an inner ring having a gas supply channel, and an outer ring surrounding the inner ring and rotatable with the main turret relative to the inner ring, the outer ring having a plurality of gas delivery channels, each of the gas delivery channels fluidly coupled to one of the plurality of glass tube connectors. The manifold may be operable to align one of the plurality of gas delivery channels of the outer ring with the gas supply channel of the inner ring to fluidly couple one of the plurality of glass tubes to the gas source.

In a thirteenth aspect of the present disclosure, a method for producing an article from a glass tube having an inner surface may include introducing the glass tube to a converter having a plurality of processing stations comprising at least one heating station and at least one forming station and heating a proximal end of the glass tube at the at least one heating station. Alkali is released from the glass tube during the heating. The method may further include forming at least one feature of the article at the proximal end of the glass tube in the at least one forming station, separating the article from the proximal end of the glass tube at a separating station, and introducing a flow of gas adjacent to a distal end of the glass tube by gas flow system. The gas flow system may include a manifold fluidly coupleable to a gas source and a plurality of glass tube connectors, each glass tube connector removably coupleable to the distal end of the glass tube and fluidly coupled to the manifold by a conduit. For at least one of the glass tube connectors, the gas flow system may be operable to pass a gas from the manifold, through the conduit, through the glass tube connector, and into the distal end of the glass tube. Passing the gas into the distal end of the glass tube may produce a flow of gas adjacent to the proximal end of the glass tube. The flow of gas may be operable to remove at least a portion of an atmosphere from an interior of the glass tube and reduce contamination of an inner surface of the glass tube by alkali released from the glass tube.

A fourteenth aspect of the present disclosure may include the thirteenth aspect, wherein separating the article from the glass tube may include thermal separation that produces a meniscus of glass across the proximal end of the glass tube and wherein the flow of gas adjacent to the proximal end of the glass tube may be sufficient to open the meniscus.

A fifteenth aspect of the present disclosure may include either the thirteenth or fourteenth aspects, wherein introducing the flow of gas may include introducing a gas pulse to the distal end of the glass tube.

A sixteenth aspect of the present disclosure may include the fifteenth aspect, wherein the gas pulse may have a duration less than the sum of a dwell time and an index time of the converter.

A seventeenth aspect of the present disclosure may include either of the fifteenth or sixteenth aspects, wherein separating the article from the glass tube may include thermal separation that produces a meniscus of glass across the proximal end of the glass tube and wherein the gas pulse may be sufficient to open the meniscus.

An eighteenth aspect of the present disclosure may include any of the fifteenth through seventeenth aspects, wherein a plurality of gas pulses may be introduced to the distal end of the glass tube.

A nineteenth aspect of the present disclosure may include any of the fifteenth through eighteenth aspects, further comprising controlling at least one of a duration of the gas pulse, a pressure of the gas pulse, or a volume flow rate of the gas pulse in response to changes in a length of the glass tube.

A twentieth aspect of the present disclosure may include any of the fifteenth through nineteenth aspects, further comprising controlling at least one of a duration of the gas pulse, a pressure of the gas pulse, or a volume flow rate of the gas pulse in response to changes in the tube diameter, wall thickness, glass type, converter operating temperatures, or combinations of these.

A twenty-first aspect of the present disclosure may include any of the thirteenth through twentieth aspects, comprising introducing the flow of gas to the distal end of the glass tube when the glass tube is positioned in one of the plurality of processing stations.

A twenty-second aspect of the present disclosure may include any of the thirteenth through twenty-first aspects, comprising introducing the flow of gas to the distal end of the glass tube when the glass tube is positioned in the separating station or a piercing station of the converter.

In a twenty-third aspect of the present disclosure, a method for producing an article from a glass tube having an inner surface may include introducing the glass tube to a converter having a plurality of processing stations comprising at least one heating station and at least one forming station and heating a proximal end of the glass tube at the at least one heating station. Alkali is released from the glass tube during the heating. The method may further include forming at least one feature of the article at the proximal end of the glass tube in the at least one forming station, separating the article from the proximal end of the glass tube at a separating station, and producing a flow of gas adjacent to the proximal end of the glass tube. The flow of gas may be operable to remove at least a portion of the atmosphere in an interior of the glass tube.

In a twenty-fourth aspect of the present disclosure, a system for producing glass articles from glass tubing may include a converter including a plurality of processing stations that include at least one heating station, at least one forming station, and a separating station. The converter may be operable to index a glass tube through the plurality of processing stations. The system may further include a gas flow system operable to produce a flow of gas adjacent to a proximal end of the glass tube. Producing the flow of gas at the proximal end of the glass tube may be operable to remove at least a portion of an atmosphere from the interior of the glass tube and reduce contamination of an inner surface of the glass tube by alkali released from the glass tube.

In a twenty-fifth aspect of the present disclosure, a system for producing glass articles from glass tube may include a converter including a plurality of processing stations that may include at least one heating station, at least one forming station, and a separating station. The converter may be operable to index a glass tube through the plurality of processing stations. The system may further include a gas flow system operable to produce a negative pressure adjacent to a proximal end of the glass tube. The negative pressure may be operable to evacuate at least a portion of the atmosphere from the interior of the glass tube.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIG. 3A schematically depicts a heating station of the converter of FIG. 1, according to one or more embodiments shown and described herein;

FIG. 3B schematically depicts a forming station of the converter of FIG. 1, according to one or more embodiments shown and described herein;

FIG. 3C schematically depicts another embodiment of a forming station of the converter of FIG. 1, according to one or more embodiments shown and described herein;

FIG. 3D schematically depicts a cooling station of the converter of FIG. 1, according to one or more embodiments shown and described herein;

FIG. 3E schematically depicts a separating station of the converter of FIG. 1, according to one or more embodiments shown and described herein;

FIG. 3F schematically depicts a piercing station of the converter of FIG. 1, according to one or more embodiments shown and described herein;

DETAILED DESCRIPTION

Figure 1:
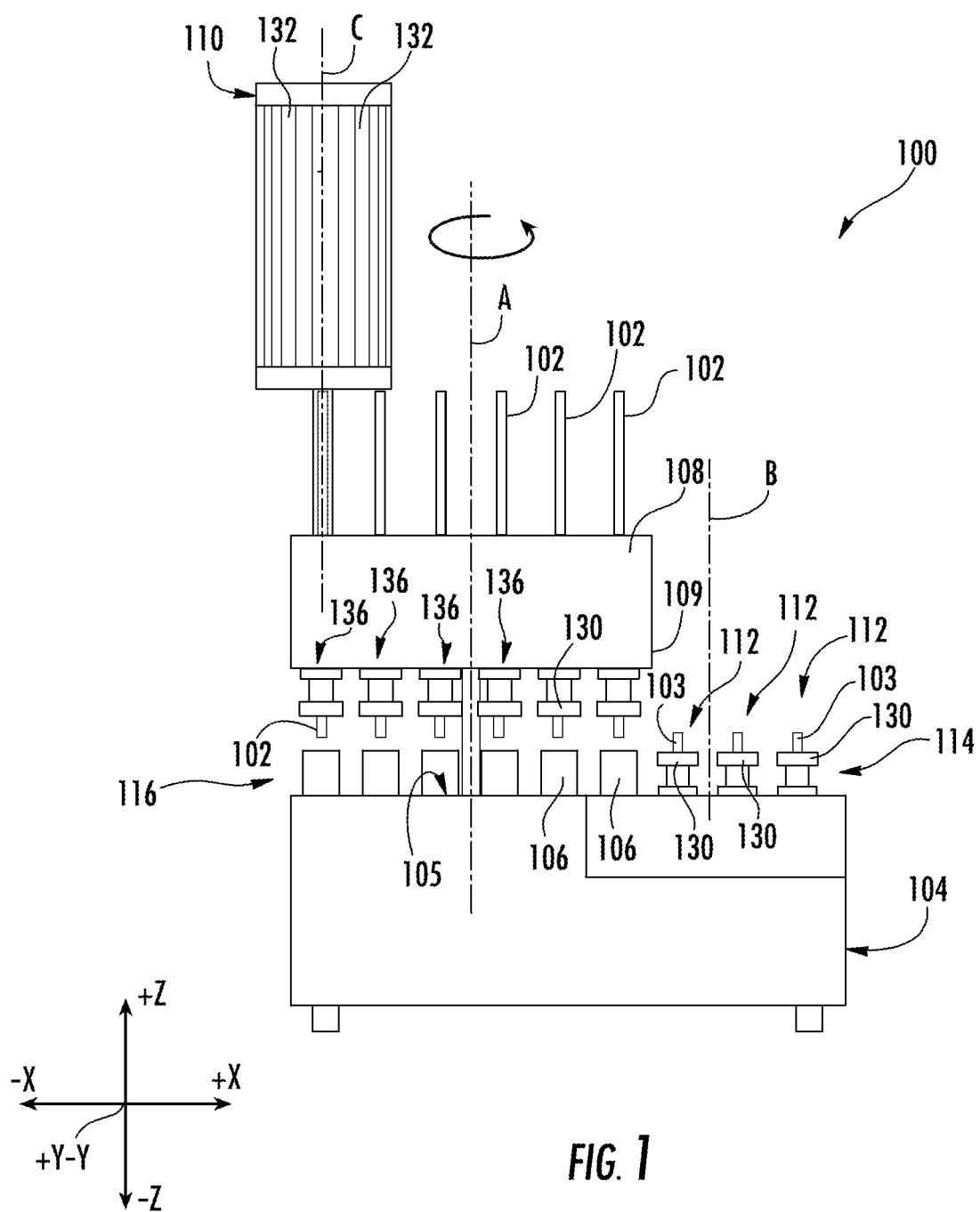
FIG. 1 schematically depicts an embodiment of a converter for producing glass articles from glass tubes, according to one or more embodiments shown and described herein.

Reference will now be made in detail to embodiments of systems and methods for reducing the Surface Hydrolytic Response (SHR) of glass articles produced from converting processes for converting glass tube into glass articles, examples of which are illustrated in the accompanying drawings. Whenever possible, the same reference numerals will be used throughout the drawings to refer to the same or like parts. Glass tubing may be converted into glass articles, in particular glass articles for use in pharmaceutical applications, which may include, without limitation, vials, syringes, ampoules, cartridges and other glass articles. The glass tubing may be converted into these glass articles using a converter comprising a plurality of processing stations. The processing stations may include heating stations, forming stations, thermal separating stations, and piercing stations, among other types of processing stations.

Certain processing stations, such as heating stations, separating stations, and piercing stations, for example, may involve flame working in which the glass is heated to temperatures in excess of the softening and/or melt temperature of the glass, such as temperatures in excess of 1500° C. These high temperatures to which the glass tube is heated may be sufficient to vaporize one or more volatile constituents of the glass. The volatile constituents may vaporize within the interior surfaces and also may be transported into the internal volume of the glass tube during the conversion process. In a vial converting machine for converting the glass tube into vials, a piercing station is required. In conventional vial converters, the piercing station typically requires a piercing burner to reopen the closed end (meniscus) of the working glass tube, the meniscus being formed in a preceding thermal separation step. With a typical piercing burner used in conventional vial converting machines, very high glass temperatures and external pressures are generated to open the glass meniscus. These high temperatures release volatiles from the interior glass surfaces into the interior of the tube. Further, when the meniscus opens, gases containing a concentration of volatiles are injected into the internal volume of the glass tube adding to the volatiles released prior to the meniscus opening. Throughout the converting process, there are a variety of interactions which induce pressure differences and hence induce flow of the gases within the internal volume of the glass tube, in either a downward or upward direction. For example, since the glass tube is hottest at its base, a buoyancy induced effect (chimney effect) tends to promote an upward flow of gases within the internal volume of the glass tube. Burners can create a Venturi effect, which can induce downward, upward, or neutral flow in the internal volume of the glass tube. Additionally, exhaust hood location, design, and operation can greatly influence flow directions induced within the internal volume of the glass tube. Further, cooling gas jets may be deployed on converting processes and can induce flow within the glass tube or sometimes entirely purge the internal volume of the working glass tube.

During the time the vaporized volatile constituents are present within the internal volume of the glass tube, the volatile constituents of the gases will condense on the interior surfaces of the glass tube, which are generally cooler. Condensation of these volatile constituents of the glass onto the interior surface of the glass tube changes the surface chemistry of the interior surface of the glass tube, which may adversely impact the SHR performance of the glass articles made from the glass tube. SHR is a measure of the chemical durability of the glass surface and is related to the solubility of glass components in various test solutions. The objective of the low SHR requirement for pharmaceutical packaging is to maintain low solubility of glass components in the pharmaceutical compositions. According to USP <660>, glasses classified as Type I glasses have a high hydrolytic resistance making them suitable for containing most parenteral and nonparenteral compositions. Deposits of volatile constituents on the interior surface of the glass articles caused by condensation of vaporized volatile constituents may increase the SHR of the glass article to levels unacceptable for Type I classification. Note that with borosilicate compositions, similar volatilation/deposition physics also induce conditions generating glass delamination, which is a considerable emerging concern within borosilicate converted parts.

Conventional pharmaceutical part manufacturers are challenged to meet SHR performance requirements established by governmental bodies and SHR recommendations from other non-governmental regulatory bodies. Various strategies have been developed to meet these SHR performance requirements and recommendations; including imposing limitations on speed and setup to minimize generation of volatiles; implementing exhaust system designs and setup to control internal flow directions; changing piercing burner designs and setup to minimize injection of volatile vapors during piercing; and/or passing the glass articles to downstream annealing processes or other post-converting treatments to remove or reincorporate the surface volatile deposits. However, these approaches to meeting SHR regulations substantially limit the process window of the converting process and can move the process in a direction unfavorable to glass strength and preventing defects, for example. In particular, these conventional approaches limit the production rate achievable by the given converting process, resulting in decreased efficiency of the converter and decreased product quality of the glass articles.

It is important to acknowledge that the volatile constituents and their evolution rates from pharmaceutical glasses are strongly dependent on the glass composition. Further, it is well understood that diffusion rates of volatile constituents from glasses follow an exponential relationship with temperature (typically Arrhenius equation). This means that the diffusion rate from the glass is strongly dependent on peak temperature. The areas of highest temperature generate the highest rate of volatiles. This relationship of diffusion rate to temperature is a significant driver for process sources of volatile generation. For example, boron and soda volatilize from Type 1B borosilicate glasses at relatively rapid rates. Aluminosilicate glasses volatize mainly soda—however the volatilation rate is much lower than Type 1B glasses at equivalent viscosity. The borosilicate diffusion curve is relatively flat versus the steeper aluminosilicate diffusion curve, which means that for aluminosilicate glass, the points in the process in which volatile constituents are released from the glass generally include only the highest temperature areas in the converting process, such as the thermal separation step and the piercing step. Because the borosilicate diffusion curve is flatter, the borosilicate converting process exhibits a higher generation rate of volatile constituents throughout the borosilicate converting process.

This application focuses on pharmaceutical processes for vial conversion. Vial convertors utilize a thermal separation step which creates the bottom of the vial. An undesired, but necessary, implication is that the working end of the upper glass tube is concurrently closed by a meniscus of glass. In order to facilitate the formation of a flange, the meniscus is pierced and the end reopened. Modeling and measurements of this piercing process show very high temperatures up to and exceeding 1700° C. can be reached over short durations (~0.1 sec). These high temperatures produce very high rates of diffusion of volatile constituents from borosilicate glasses from the inside surfaces prior to meniscus opening. Once the meniscus opening occurs inward, additional volatile laden gas is injected into the internal volume of the glass tube. Vial conversion, especially for larger vials, is well known in the industry for being the most sensitive (versus cartridge and syringe conversion processes) in generating volatiles because of the high temperatures required for piercing and injection at the piercing burner. Vials, especially large vials—where the hottest temperatures are needed, are the most challenged for SHR and delamination, in borosilicate glasses, for this reason. It should be noted that with larger glass tubes, the pressure to open the meniscus is less than the pressure to open the meniscus on smaller glass tubes, so that the contributions of volatiles generated from the hot interior surface 146 of the glass tube 102 prior to piercing predominate compared to the volatiles injected into the interior volume of the glass tube 102 with the piercing gas injection.

It should be understood that these strategies demonstrated on a vial convertor for SHR mitigation, however, can be applied to other converting processes, such as those for cartridges, syringes, ampoules, etc. Cartridge and syringe converting processes typically utilize score and break cutoff (versus thermal separation), so the high temperatures and pierce volatile injection with vial separation and piercing are not a consideration. In those processes, however, it should be clear to one skilled in the art that purging approaches in this disclosure can easily be extended to occur after or during the highest volatilization (temperature) areas.

The present disclosure is directed to systems and methods for reducing and or preventing deposits of volatile constituents of the glass on the interior surface of the glass tube. In particular, the systems and methods disclosed herein produce a flow of gas adjacent to the proximal end of the glass tube. The flow of gas is operable to remove at least a portion of the atmosphere in an interior of the glass tube. For example, the flow of gas may be sufficient to counteract the chimney effect, which may reduce or prevent travel of the vaporized volatile constituents upwards (i.e., in the +Z direction of the coordinate axis of the Figures) through the glass tube and condensation of the volatile constituents on the interior surface of the glass tube. The flow of gas adjacent to the proximal end of the glass tube reduces contamination of the inner surface of the glass tube by alkali released from the glass tube during one or a plurality of converting operations. Reducing deposits of volatile constituents of the glass on the interior surfaces of the glass tube may improve the SHR performance of the glass articles made from the glass tube.

Additionally, in some embodiments, the systems and methods may introduce a gas pulse or a negative pressure pulse sufficient to open the meniscus formed on the proximal end of the glass tube during separation, which may enable elimination of the piercing burner from the converter. Elimination of the piercing burner may eliminate the greatest cause of volatilizing constituents of the glass on the converter and may result in improved SHR.

Figure 5:
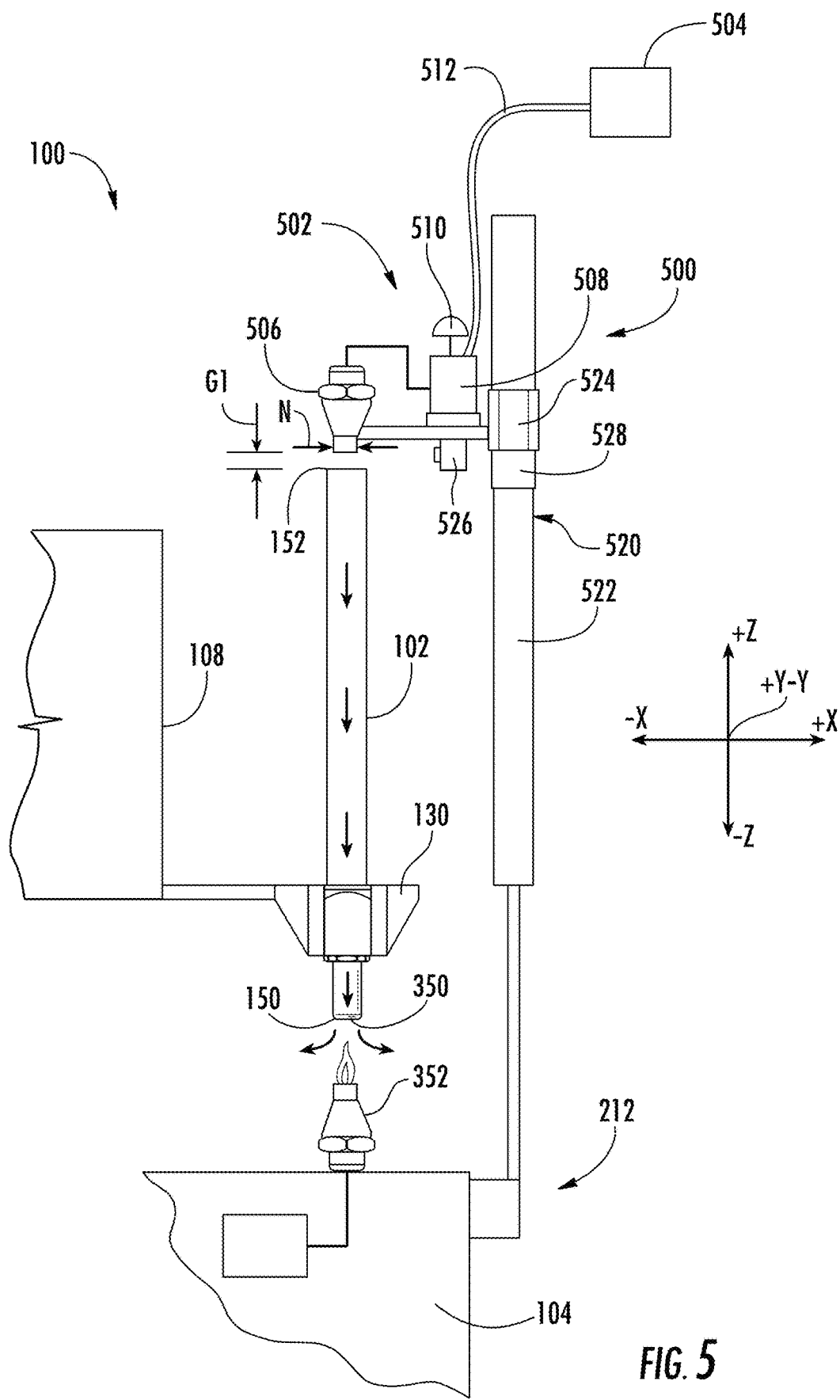
FIG. 5 schematically depicts a gas flow system positioned at a piercing station of the converter of FIG. 1, according to one or more embodiments shown and described herein.

An embodiment of a system for producing articles from glass tube is depicted in FIG. 5. In the embodiment depicted in FIG. 5, the system for producing glass articles from glass tubing includes a converter 100 having a plurality of processing stations that include at least one heating station, at least one forming station, and a separating station. The converter 100 is operable to index a glass tube 102 through the plurality of processing stations. The system may also include a gas flow system 500 operable to produce a flow of gas adjacent to a proximal end 152 of the glass tube 102. Producing the flow of gas at the proximal end 152 of the glass tube 102 is operable to remove at least a portion of an atmosphere from the interior of the glass tube 102 and reduce contamination of an inner surface of the glass tube 102 by alkali released from the glass tube 102. Also included in this disclosure is a method for producing an article from a glass tube 102 having an inner surface, the method including at least introducing the glass tube 102 to the converter 100 having a plurality of processing stations that include at least one heating station and at least one forming station, heating the proximal end 152 of the glass tube 102 at the at least one heating station, wherein alkali is released from the glass tube 102 during the heating, forming at least one feature of the article at the proximal end 152 of the glass tube 102 in the at least one forming station, separating the article from the proximal end 152 of the glass tube 102 at a separating station, and producing a flow of gas adjacent to the proximal end 152 of the glass tube 102. The flow of gas is operable to remove at least a portion of the atmosphere in an interior of the glass tube 102. The systems and methods disclosed herein may result in a reduction in deposits of volatile constituents of the glass on the interior surface of the glass tube 102, which may improve the SHR performance of the glass articles made therefrom. The embodiment of FIG. 5 as well as various other embodiments of the systems and methods for reducing SHR for the glass articles produced using the converting processes will be described herein with specific reference to the appended drawings.

Directional terms as used herein—for example up, down, right, left, front, back, top, bottom—are made only with reference to the figures as drawn and the coordinate axis provided therewith and are not intended to imply absolute orientation.

Unless otherwise expressly stated, it is in no way intended that any method set forth herein be construed as requiring that its steps be performed in a specific order, nor that specific orientations be required with any apparatus. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

As used herein, the "proximal end" of the glass tube is the end of the glass tube oriented towards the processing stations of the converter relative to the holder, and the "distal end" of the glass tube is the end of the glass tube oriented away from the processing station.

Referring now to FIG. 1, the converter 100 for producing glass articles from a glass tube 102 is schematically depicted. The converter 100 may be used to convert glass tubes 102 into a plurality of glass articles, such as, but not limited to, vials, syringes, cartridges, ampoules, or other glass articles. The converter 100 includes a base 104 having a plurality of processing stations 106, a main turret 108 positioned above the base 104 and rotatable relative to the base 104 about the central axis A, and a glass tube loading turret 110 positioned above the main turret 108 for feeding glass tube 102 to the main turret 108. The converter 100 may also include a plurality of secondary processing stations 112 on the base 104 and a secondary turret 114, which is rotatable relative to the base 104.

As schematically depicted in FIG. 1, the base 104 of the converter 100 is stationary and the processing stations 106 may be coupled to an upper portion 105 of the base 104. The plurality of processing stations 106 are spaced apart from one another and arranged in a main circuit 116. In one or more embodiments, the main circuit 116 may be circular so that the main turret 108 may index a glass tube 102 through the plurality of processing stations 106 by rotation of the main turret 108 about the central axis A. Alternatively, in other embodiments, the main circuit 116 may be linear. Although described herein in reference to a circular-shaped layout of processing stations 106, it is understood that the subject matter disclosed herein may apply equally well to converters having other arrangements of the processing stations 106.

The type and/or shape of the article to be made from the glass tube 102 may influence the number of processing stations 106 coupled to the base 104. The number of processing stations 106 of the main turret 108 may be from 14 to 32 processing stations 106. Although the converter 100 and converting process are described herein in the context of a converter 100 having sixteen processing stations 106 in the main circuit 116, it is understood that the converter 100 may have more or less than sixteen processing stations 106 in the main circuit 116. The processing stations 106 may include, by way of example and without limitation, one or more heating, forming, polishing, cooling, separating, piercing, measuring, feeding, or discharge stations or other processing stations for producing the glass articles from the glass tubes 102. The type and/or shape of the article to be made from the glass tube 102 may also influence the type of processing stations 106 and/or order of processing stations 106 of the converter 100.

The main turret 108 may be positioned above the base 104 and may be rotatably coupled to the base 104 so that the main turret 108 is rotatable about the central axis A relative to the base 104. A drive motor (not shown) may be utilized to rotate the main turret 108 relative to the base 104. The main turret 108 includes a plurality of holders 130, which are configured to removably secure each glass tube 102 to the main turret 108. The holders 130 may be clamps, chucks, or other holding devices, or combinations of holding devices. The holders 130 may orient each glass tube 102 so that the glass tube 102 is generally parallel to the central axis A of the main turret 108 and generally perpendicular to the upper portion 105 of the base 104. Although the converter 100 is described in this specification in the context of a vertically oriented converter 100, it should be understood that the converter 100 may be oriented horizontally or at an angle. Each of the holders 130 extends from a bottom portion 109 of the main turret 108 in a direction towards the base 104 (i.e., in the −Z direction relative to the coordinate axis in FIG. 1), and each holder 130 is oriented to position the glass tube 102 in or proximate to each of the successive processing stations 106 of the main circuit 116 of the base 104 as the main turret 108 is indexed about the central axis A. Vertical orientation of the glass tubes 102 allows a downward protruding portion of each glass tube 102 to be cycled progressively through the processing stations 106 of the main circuit 116. In some embodiments, the converter 100 may be operable to index each of the plurality of holders 130 progessively through the plurality of processing stations 106. Alternatively, in other embodiments, the converter 100 may be operable to translate the plurality of holders 130 continuously through the converting process. Each holder 130 may be individually rotatable relative to the main turret 108 about holder axis D, which may be generally parallel to the central axis A of the main turret 108. Each of the holders 130 may be operatively coupled to a motor (not shown), continuous drive belt, or other drive mechanism for rotation of each of the holders 130 relative to the main turret 108. Rotation of the holders 130 allows for rotation of the glass tube 102 relative to stationary burners, forming tools, cooling nozzles, or other features of the processing stations 106.

Figure 2:
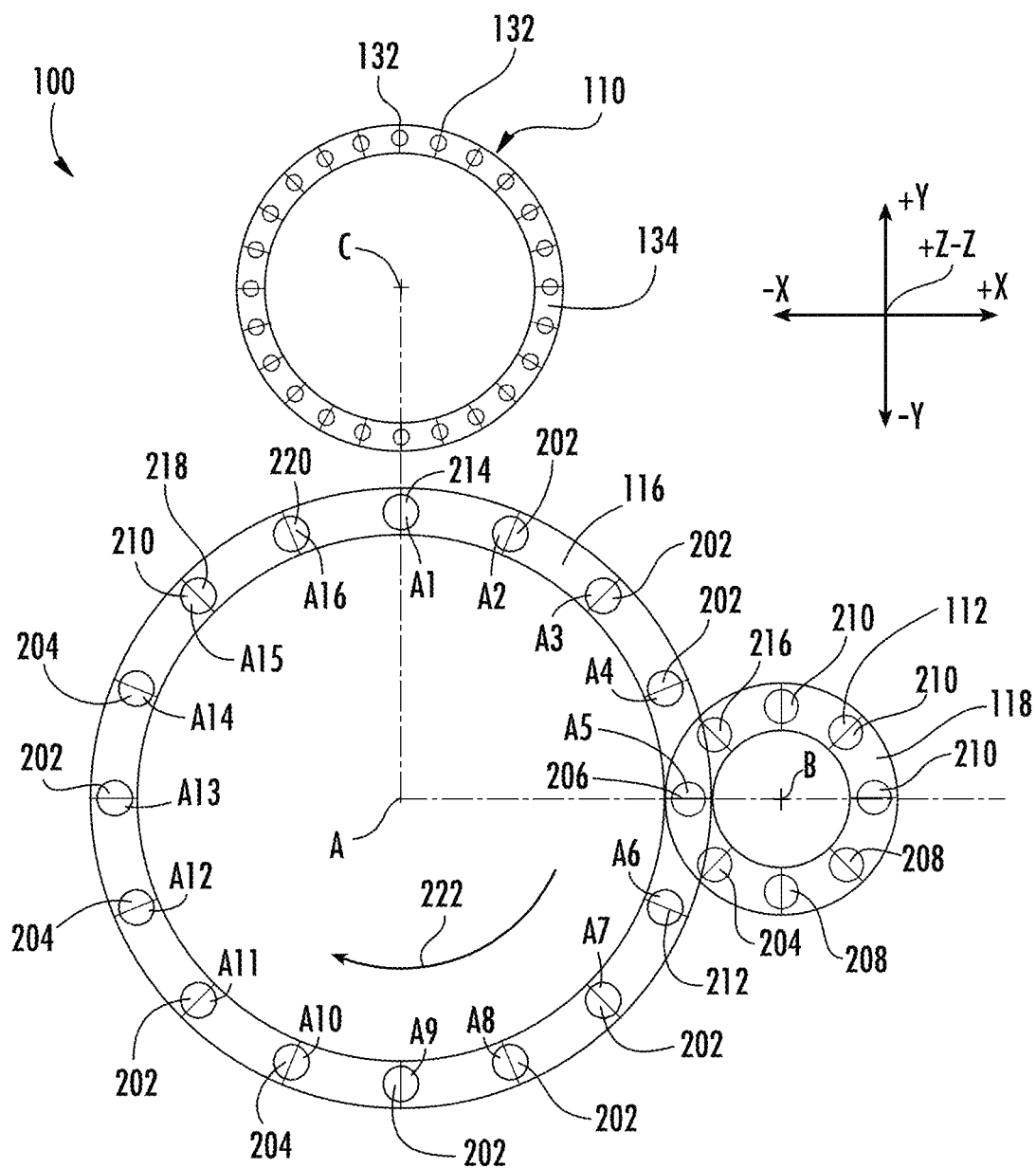
FIG. 2 schematically depicts a top view of a main turret, secondary turret, and feed turret of the converter of FIG. 1, according to one or more embodiments shown and described herein.

Referring to FIGS. 1 and 2, the converter 100 may have a plurality of secondary processing stations 112, which are also spaced apart and arranged in a secondary circuit 118 (FIG. 2), and a secondary turret 114 (FIG. 1) for indexing an article 103 (FIG. 1), which has been separated from the glass tube 102, through the plurality of secondary processing stations 112. The secondary turret 114 may be rotatable about a second axis B relative to the base 104. The second axis B may be generally parallel to central axis A of the main turret 108. The secondary turret 114 also includes a plurality of holders 130 to hold the glass articles 103 and position the glass articles 103 to engage with each of the secondary processing stations 112 in succession. The secondary turret 114 may receive the articles 103 from a separating station 206 (FIG. 2) of the main turret 108, index the articles 103 through the plurality of secondary processing stations 112 through rotation of the secondary turret 114, and discharge the finished articles from the converter 100.

The glass tube loading turret 110 may be positioned above the main turret 108. In embodiments, the glass tube loading turret 110 may be offset from the central axis A of the main turret 108. The glass tube loading turret 110 may be rotatable about an axis C, which may be generally parallel to the central axis A of the main turret 108. The glass tube loading turret 110 may be independently supported in a stationary position relative to the main turret 108, and rotation of the glass tube loading turret 110 may be independent of the rotation of the main turret 108. Referring to FIGS. 1 and 2, in some embodiments, the glass tube loading turret 110 may include a plurality of loading channels 132 arranged in a circular circuit 134 and configured to hold glass tubes 102. The glass tube loading turret 110 may be positioned to orient one of the loading channels 132 into vertical alignment (i.e., aligned in a direction parallel to the central axis A of the main turret 108 and/or parallel to the Z axis of FIG. 1) with a processing station 106 of the main circuit 116 of the converter 100 and the corresponding holders 130 on the main turret 108 that are indexed through the processing station 106 of the main circuit 116. In one or more embodiments, the processing station 106 aligned with the glass tube loading turret 110 may be a tube loading station 214 (FIG. 2). When the converter 100 has converted all or at least a portion of the glass tube 102 at a specific holder position 136 into one or more articles, the glass tube loading turret 110 may deliver a new length of glass tube 102 through the top of the main turret 108 to the holder 130 at the holder position 136, when the holder position 136 indexes into alignment with the tube loading station 214 of the main circuit 116. In alternative embodiments, the converter 100 may include an arm (not shown) movable between the main turret 108 and the glass tube loading turret 110. When the converter 100 has converted all or a portion of the glass tube 102 at a specific holder position 136, the arm may grab a new length of glass tube 102 from the glass tube loading turret 110 or other glass tube staging device and deliver the new length of glass tube 102 to the main turret 108 at the specific holder position 136. Other methods and apparatuses for delivering new lengths of glass tube 102 to the main turret 108 are contemplated.

Referring to FIG. 2, as previously described, the plurality of processing stations 106 of the converter 100 may include one or more heating stations 202, forming stations 204, separating stations 206, cooling stations 210, piercing stations 212, tube loading stations 214, discharge stations 216, measuring stations 218, tube length drop stations 220, or other stations and/or combinations of these stations. FIG. 2 schematically depicts the arrangement of the processing stations 106 for a converter 100 having a main circuit 116 of sixteen processing stations 106 and a secondary circuit 118 of eight secondary processing stations 112. As described, the processing stations 106 of the main circuit 116 are evenly spaced apart and evenly distributed about a circular circuit and the secondary processing stations 112 of the secondary circuit 118 are also evenly spaced apart and evenly distributed about a circular circuit. FIG. 2 also schematically depicts the glass tube loading turret 110 having a plurality of loading channels 132. In FIG. 2, the glass tube loading turret 110 is shown in a position spaced apart from the main circuit 116 for purposes of illustration. Although the glass tube loading turret 110 is depicted as having twenty-four loading channels 132, it is understood that the glass tube loading turret may have more or less than twenty-four loading channels 132.

The main circuit 116 of the converter schematically depicted in FIG. 2 may include one or more heating stations 202, a separating station 206, a piercing station 212, one or more forming stations 204, one or more cooling stations 210, a measuring station 218, a tube length drop station 220, and a tube loading station 214. Although FIG. 2 depicts the main circuit 116 as having a circular arrangement of the processing stations 106, as previously discussed, the main circuit 116 may have the processing stations 106 positioned in other-shaped arrangements, such as linear, polygonal, or other arrangements. With respect to the direction of indexing 222 of the main turret 108, the heating stations 202 may be positioned before the separating stations 206 and each of the forming stations 204 to preheat target regions of the glass tube 102 to a target temperature at which the target region of the glass tube 102 becomes viscous and deformable and may effectively be shaped or stretched and separated. At the separating station 206, the formed glass article 103 (FIG. 1) may be separated from the glass tube 102 (FIG. 1) as its bottom is concurrently formed. The separating station 206 may also be the processing station 106 at which the partially formed glass article 103, once separated, is transferred to the secondary turret 114 (FIG. 1) to be indexed through the secondary circuit 118 of secondary processing stations 112. The piercing station 212 may be positioned on the main circuit 116 downstream of the separating station 206 in the direction of indexing 222 of the main turret 108. At the piercing station 212, a meniscus 350 of the glass tube 102 previously formed in the separating station 206 is pierced, thereby reopening the proximal end 150 of the glass tube 102.

The forming stations 204 of the main turret 108 may be positioned downstream of the piercing station 212 in the direction of indexing 222. At the forming stations 204, the glass tube 102 is iteratively shaped into the desired shape of the finished glass article. As noted above, one or more heating stations 202 may be positioned before each of the forming stations 204 to preheat target regions of the glass tube 102 to a temperature at which the glass tube 102 may be formed. The forming stations 204 of the main turret 108 shape the proximal end 150 (FIG. 3A) of the glass tube 102 to form one end of the glass articles 103, and the forming stations 204 of the secondary turret 114 shape the other end of the glass articles 103 after the glass article 103 has been separated from the glass tube 102. In one or more embodiments, the converter 100 may be used to produce vials from the glass tubes 102, and the forming stations 204 of the converter 100 may include one or more shoulder forming stations, one or more flange forming stations, and one or more flange finishing stations, with one or more heating stations 202 positioned before and between each of the forming stations 204. The main circuit 116 may further include a measuring station 218, at which a dimensioning system (not shown) may be used to measure one or more dimensions of the glass tube 102, such as the diameter and thickness for example, and one or more dimensions of the features formed by the forming stations 204. Feature dimensions may include flange thickness, flange length, neck length, neck thickness, overall article length, other feature dimension, or combinations thereof. The measuring station 218 may be positioned directly after the last forming station 204 so that the dimensions are measured while the glass tube 102 is still at elevated temperature. Alternatively, the measuring station 218 may be positioned after one or more cooling stations 210 to measure the dimensions of the glass tube 102 and/or glass article at a lower temperature.

Still referring to FIG. 2, one or more cooling stations 210 may be positioned after the forming stations 204 in the direction of indexing 222 of the main turret 108. A tube length drop station 220 may be positioned after the forming stations 204, between the forming stations 204 and the separating station 206, to drop the partially formed glass tube 102 down, thereby positioning the glass tube 102 for separating the glass article 103 from the glass tube 102 at the separating station 206. The main circuit 116 may also include a tube loading station 214 for loading a new length of glass tube 102 feedstock from the glass tube loading turret 110 to the main turret 108 (FIG. 1). In one or more embodiments, the tube loading station 214 may be incorporated into a cooling station 210. The tube loading station 214 may be positioned between the last forming station 204 and the separating station 206.

The forming stations 204 of the main turret 108 form features at a first end of the glass article 103. For example, the forming stations 204 may form the shoulder 142 and flange 144 at the top (first end) of a glass article 103 that is a vial or cartridge. Once the glass article 103 is separated from the glass tube 102 at the separating station 206, the glass article 103 is transferred to the secondary processing stations 112 of the secondary turret 114. The secondary processing stations 112 may include one or more forming stations 204 for forming a second end of the glass article 103, which is opposite the first end of the glass article 103. For example, the forming stations 204 of the secondary processing stations 112 may form one or more features at a bottom (second end) of the glass article 103.

The secondary processing stations of the secondary circuit may include one or more heating stations 202, forming stations 204, polishing stations 208, cooling stations 210, discharge stations 216, or other stations or combinations of secondary processing stations 112. Although FIG. 2 depicts the secondary circuit as having a circular arrangement of the secondary processing stations 112, as previously discussed, the secondary circuit may have the secondary processing stations 112 positioned in other-shaped arrangements, such as linear, polygonal, or other arrangements. In one or more embodiments, the secondary processing stations 112 of the secondary circuit 118 may be used to form one or more features of the glass article 103, such as a vial, ampoule, cartridge, or syringe, for example, at an end of the glass article 103 opposite the end formed by the main turret 108. For example, in some embodiments, the glass article 103 is a vial and the forming stations 204 of the secondary circuit 118 may form the bottom of the vial. Other features are also contemplated such as those features characteristic of ampoules, cartridges, syringes, and the like. The secondary circuit 118 may include one or more polishing stations 208 to finish the surface of the glass article. The secondary circuit 118 may further include a plurality of cooling stations 210 and the discharge station 216, at which station the finished glass article 103 may be discharged from the converter 100.

The previous description of the processing stations 106 of the main circuit 116 and the secondary processing stations 112 of the secondary circuit 118 may represent a typical converter 100 for producing vials from the glass tube 102. However, it is understood that more or fewer processing stations 106 and secondary processing stations 112 may be utilized to make vials having different shapes or other glass articles, such as cartridges, syringes, ampoules, or other glass articles. Additionally, it is understood that the processing stations 106 and secondary processing stations 112 may be arranged in any of a number of different orders and/or configurations in order to produce differently shaped glass articles.

Referring now to FIG. 3A, a heating station 202 of the converter 100 is schematically depicted. Each of the heating stations 202 may include one or more heating elements 301. As illustrated in FIG. 3A, in embodiments, the heating element 301 may include one or more burners 302, which are used to heat targeted regions of the glass tube 102 prior to a forming operation performed at the forming station 204 (FIG. 2) or separating operation performed at the separating station 206 (FIG. 2). Although FIG. 3A depicts a single burner 302, it is understood that more than one burner 302 may be employed in a single heating station 202. Each burner 302 may be fluidly coupled to a fuel supply 304, an oxygen supply 306, and, optionally, an air supply 308. Examples of fuels for the burner may include, but are not limited to hydrogen, hydrocarbon fuel gases such as methane, propane, and butane for example, other fuels, or combinations of these. Each burner 302 may include a fuel control valve 310 to control the flow rate of fuel gas to the burner 302. Each burner 302 may also include an oxygen control valve 312 to control the mass flow rate of oxygen to the burner 302. Each burner 302 may further include an air control valve 314 for optionally controlling a flow rate of air to the burner 302. The burner 302 combusts the fuel gas in the presence of oxygen and/or air to produce a flame that heats at least the target region of the glass tube 102. Although the heating stations 202 of the converter 100 are described herein as heating the glass tube 102 using burners, it is understood that other heating elements or methods other than burners may be used to heat the glass tube 102.

Referring now to FIGS. 3B and 3C, examples of forming stations 204 of the converter 100 are schematically depicted. Each forming station 204 may include one or more forming tools 324. The forming tools 324 may be rotatable relative to the base 104 (FIG. 1) about tooling axis E, which are generally parallel to the central axis A (FIG. 1) of the main turret 108 (FIG. 1). When indexed into the forming station 204, the glass tube 102, which has been heated in a prior heating station 202, is rotated by the holder 130. The forming tools 324 are engaged with the outer surface 140 of the glass tube 102. Contact of the forming tools 324 with the outer surface 140 of the heated glass tube 102 forms the glass tube 102 into the desired shape. Upon expiration of the contact time, the forming tool actuators 326 withdraw the forming tools 324 from engagement with the glass tube 102.

FIG. 3B schematically illustrates an embodiment of a forming station 204 for forming the shoulder 142 of a glass vial formed from the glass tube 102. FIG. 3C schematically depicts an exemplary embodiment of a forming station 204' for forming the flange 144 of a glass vial formed from the glass tube 102. The forming station 204' for forming the flange 144 comprises three forming tools 324a, 324b, and 324c. Two of the forming tools 324a and 324b contact the outer surface 140 of the glass tube 102 to form the outer contour of the flange 144. The third forming tool 324c contacts the inner surface of the glass tube 102 radially inward of the flange 144 to form the inner diameter of the glass tube 102 at the flange 144. The third forming tool 324c also contacts the axial end of the glass tube 102 to form the axial surface of the flange 144. In embodiments, the third forming tool 324c may be stationary and the glass tube 102 rotated about the third forming tool 324c by the holder 130. In embodiments, a thin layer of lubricant, such as oil for example, may be disposed between the glass tube 102 and the third forming tool 324c to separate the glass tube 102 from making contact with the third forming tool 324c.

FIG. 3D schematically depicts a cooling station 210 having one or more cooling nozzles 340 positioned to direct a cooling fluid 342, such as chilled air or an inert gas for example, towards the glass tube 102. One or more of the cooling nozzles 340 may be positioned to direct the cooling fluid 342 to specific regions of the glass tube 102. One or more cooling fluid control valves 344 may be fluidly coupled to the cooling nozzles 340 to control the mass flow rate of cooling fluid 342 to the cooling nozzles 340, which enable control of the rate of cooling of the glass tube 102 as well as the temperature of the glass tube 102 and temperature gradients in the glass tube 102.

Referring now to FIG. 3E, a separating station 206 of the converter 100 is schematically depicted. The separating station 206 depicted in FIG. 3E is a thermal separation station and is positioned after one or more heating stations 202 in the direction of indexing 222 of the main turret 108. The heating stations 202 positioned before the separating station 206 heat the glass tube 102 to make the glass viscously deformable. The separating station 206 may include a separating burner 348. While the glass tube 102, which has been made viscously deformable by the previous heating stations 202, is rotated by the holder 130 about the holder axis D, the separating burner 348 may be engaged with the outer surface 140 of the glass tube 102 to cut the glass tube 102 to a target length, thereby separating an article 103 (FIG. 1) from the glass tube 102. Once separated from the glass tube 102, the article 103 may be transferred to the secondary turret 114 (FIG. 1) or discharged from the converter 100. Although shown in FIG. 3E as a thermal separating station, the separating station 206 may also be a non-thermal separating station such as a separating station using score and break techniques, as may be used for syringes and cartridges for example.

Referring now to FIG. 3F, a typical piercing station 212 of the converter 100 is schematically depicted. The piercing station 212 is positioned after the separating station 206 in the direction of indexing 222 of the main turret 108. As previously described, thermal separation of the article 103 from the glass tube 102 in the separating station 206 may cause a meniscus 350 of glass to form across the proximal end 150 of the glass tube 102. The piercing station 212 may include a piercing burner 352. The piercing burner 352 may be positioned below the proximal end 150 of the glass tube 102 and may be oriented toward the proximal end 150 of the glass tube 102. The piercing burner 352 may be fluidly coupled to one or more of a fuel gas supply 304, oxygen supply 306, air supply 308, or combinations of these. The fuel gas supply 304, the oxygen supply 306, and the air supply 308 were previously discussed in relation to the burner 302 of FIG. 3A. When main turret 108 indexes the glass tube 102 into the piercing station 212, the flame from the piercing burner 352 heats the meniscus 350 of glass and melts the meniscus 350 to pierce the meniscus 350 of glass and re-open the proximal end 150 of the glass tube 102. The heat from the piercing burner 352 creates a chimney effect in the internal volume of the glass tube 102. Additionally, gas flow out of the piercing burner 352 may also cause convection of gases and vapors upward in the internal volume of the glass tube 102

FIGS. 3A-3F include schematic illustrations of several different examples of processing stations 106 that may be utilized in the converter 100. However, it should be understood that other processing stations 106 having different structures, combinations of structures, or functions, may be utilized to achieve the desired conversion of the glass tube 102 into one or more glass articles.

Referring again to FIG. 2, in operation, the main turret 108 indexes the glass tubes 102, which are secured in the holders 130, into a processing station 106. A specific operation, such as heating, forming, piercing, separating, cooling, dropping, feeding, etc., is performed on the glass tubes 102 at each of the processing stations 106. As used herein, a "dwell time" of the converter 100 refers to the time that the glass tube 102 spends in a particular processing station 106 before being indexed by the main turret 108 to the next subsequent processing station 106. The converter 100 may be tuned so that all of the processing stations 106 complete their operations within the dwell time. At the end of the dwell time, the main turret 108 indexes the glass tubes 102 to the next processing stations 106. As used herein, the "index time" refers to the time that it takes for the main turret 108 to index the glass tubes 102 from one processing station 106 to the next processing station 106 and is measured in units of time. The total time per part per station, as used in this disclosure, is the sum of the dwell time and the index time.

Examples of converters 100 for converting glass tube 102 into glass vials include the Vial Forming Machine Model RP16 with Automatic Tube Feeder manufactured by AMBEG Dr. J. Dichter GmbH, which includes sixteen processing stations 106 in the main circuit 116 and eight secondary processing stations 112. Other examples include the Vial Forming Machine Model RP32 manufactured by AMBEG Dr. J. Dichter GmbH, which has thirty-two processing stations 106 in the main circuit 116 and two secondary circuits 118 with eight secondary processing stations 112 in each secondary circuit 118, and the Zeta 098 Vial Forming Machine manufactured by Euromatic S.R.L., which has 36 processing stations. Another example may include the Zeta 103 Cartridge Forming Machine manufactured by Euromatic S.R.L., which is a converter for converting glass tube into cartridges. The cartridge converter has similar characteristics to the previously described vial converters 100 but is utilized to produce glass articles having a cartridge form factor rather than a vial.

Although described in the context of a converter 100 for producing glass vials from glass tube 102, it should be understood that the converter 100 may be configured to produce one or more other articles, such as cartridges, syringes, ampoules, or other glass articles, by changing the forming tools 324 and/or the order or configuration of processing stations 106 in the main circuit 116 or secondary processing stations 112 in one or more secondary circuits 118.

During the converting process, the glass tube 102 may be heated to temperatures that may be equal to or greater than 1500° C. Heating the glass tube 102 to temperatures of 1500° C. or greater may cause one or more volatile constituents of the glass composition of the glass tube 102 to vaporize and diffuse into the atmosphere or into the internal volume of the glass tube 102. For some aluminosilicate glass compositions, the volatile constituents vaporized during the converting process may include sodium. For borosilicate glass compositions the volatile constituents may also include boron in addition to sodium. Other volatile constituents may also vaporize from the glass composition during converting.

These volatile constituents may be transported upward through the glass tube 102 due to a "chimney effect" caused by the heated gases in the glass tube 102 rising upward. Heating the gases inside the glass tube 102 reduces the density of the gases, which causes the heated gases to rise upward through the internal volume of the glass tube 102 through buoyancy forces. For example, referring to FIG. 3F, at the piercing station 212, the piercing burner 352 may be used to heat and open the meniscus 350 formed over the proximal end 150 of the glass tube 102 in the separating station 206. The piercing burner 352 may be generally oriented vertically upward (i.e., in the +Z direction of the coordinate axis in FIG. 3F) so that the flame extends from the piercing burner 352 generally vertically upward to impinge upon the meniscus 350 of the glass tube 102. The vertical orientation of the piercing burner 352 may increase the chimney effect at the piercing station 212 by directing hot combustion gases upward through the glass tube 102. Thus, in the piercing station 212, the chimney effect may be further increased due to convection of hot combustion gases upward through the glass tube 102 caused by the piercing burner 352. For other processing stations 106, such as the separating station 206, one of the heating stations 202, and/or one of the forming stations 204, the chimney effect may be caused primarily by the reduced density of the heated gases inside the glass tube 102. The increased chimney effect in the piercing station 212 due to convection caused by the piercing burner 352 may result in the vaporized volatile constituents traveling farther upward through the glass tube 102 before condensing on the interior surface 146 of the glass tube 102 compared to the other processing stations 106.

Figure 4:
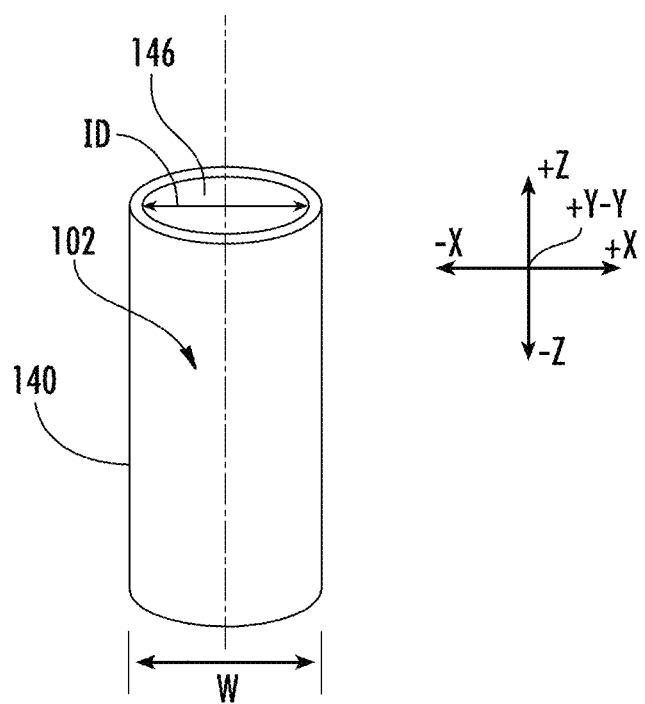
FIG. 4 schematically depicts a perspective view of a glass tube prior to conversion in the converter of FIG. 1, according to one or more embodiments shown and described herein.

As the heated gases travel upward through the glass tube 102 due to the chimney effect, the vaporized volatile constituents in the gases cool and may condense on the interior surfaces 146 (FIG. 4) of the glass tube 102. As the volatile constituents condense on the interior surface 146 of the glass tube 102, the volatile constituents may react to form deposits on the interior surface 146 of the glass tube 102. For example, for a glass composition comprising sodium, the sodium vapors condensing on the interior surface 146 of the glass tube 102 may react at the interior surface 146 to form one or a plurality of sodium compounds deposited onto the interior surface 146 of the glass tube 102. These deposits from condensation of the volatile constituents on the interior surface 146 of the glass tube 102 may continue to build up as the glass tube 102 is indexed multiple times through the processing stations 106 of the converter 100. As previously discussed, the buildup of these deposits on the interior surface 146 of the glass tube 102 may increase the SHR of the glass articles 103 produced from the glass tube 102.

The systems and methods disclosed herein may reduce or eliminate the formation of deposits on the interior surface 146 of the glass tube 102 by producing a flow of a gas through the glass tube 102 from the distal end 152 to the proximal end 150 of the glass tube 102 (i.e., the −Z direction of the coordinate axis of FIG. 5). Producing a flow of gas through the glass tube 102 towards the proximal end 150 of the glass tube 102 may counteract the chimney effect caused by heating the gases inside the glass tube 102 and may reduce or prevent vaporized volatile constituents from traveling upward through the glass tube 102 and condensing on the interior surface 146 of the glass tube 102. Additionally or alternatively, in other embodiments, the systems and methods disclosed herein may reduce or eliminate the formation of deposits on the interior surface 146 of the glass tube 102 by using the gas flow to pierce/open the meniscus 350 and eliminating the piercing burner 352 at the piercing station 212.

Figure 6A:
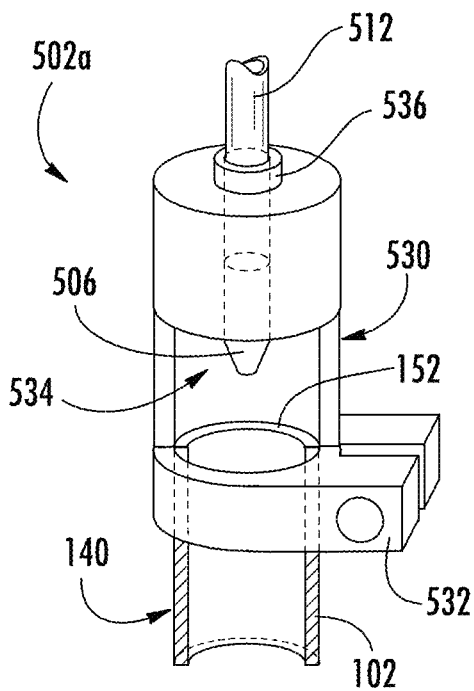
FIG. 6A schematically depicts another embodiment of a gas flow system for use with the converter of FIG. 1, according to one or more embodiments shown and described herein.
Figure 6B:
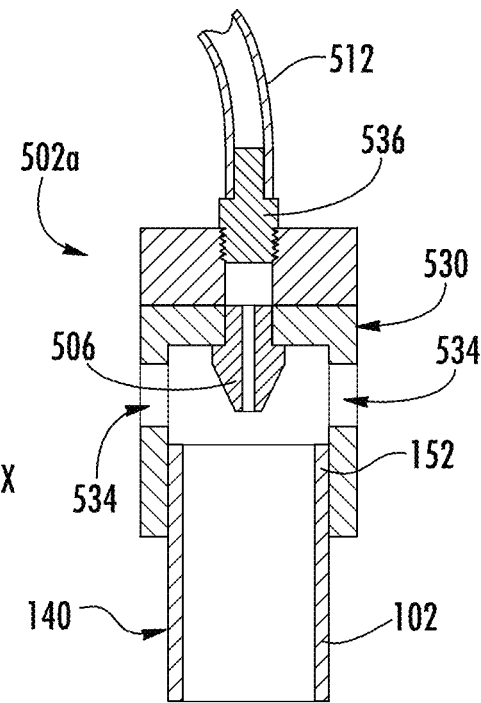
FIG. 6B schematically depicts a side view of a cylindrical mount of the gas flow system of FIG. 6A, according to one or more embodiments shown and described herein.
Figure 6C:
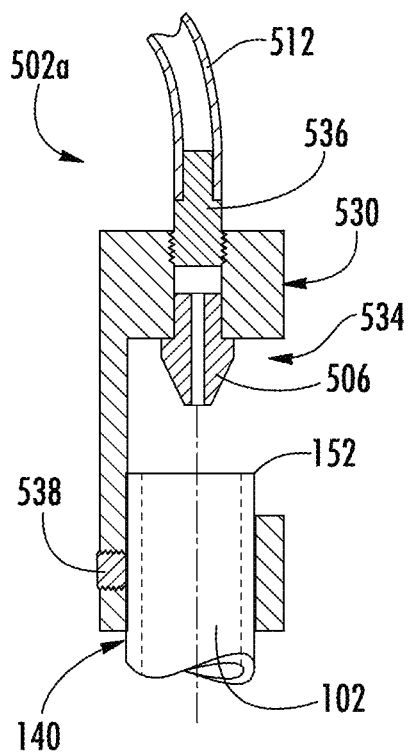
FIG. 6C schematically depicts another embodiment of a cylindrical mount of the gas flow system of FIG. 6A, according to one or more embodiments shown and described herein.
Figure 7:
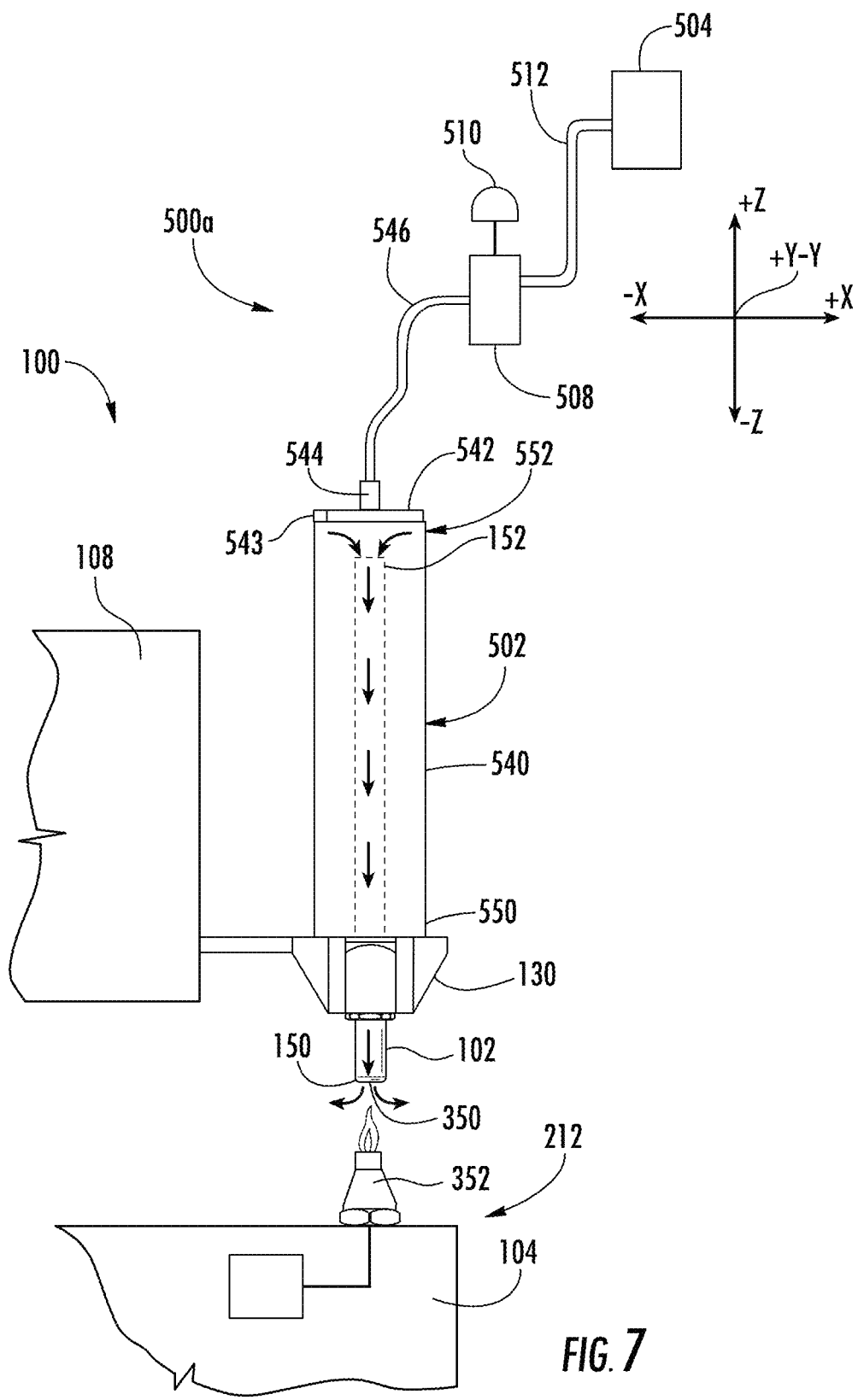
FIG. 7 schematically depicts another embodiment of a gas flow system having an enclosure positioned at the piercing station of the converter of FIG. 1, according to one or more embodiments shown and described herein.

Referring to FIGS. 5-7, the converter 100 may include a gas flow system 500 configured to deliver a flow of a gas into the distal end 152 of the glass tube 102 for a discrete duration of time, thereby creating a flow of gas through the glass tube 102 from the distal end 152 to the proximal end 150. The flow of gas through the glass tube 102 produced by the gas flow system 500 may counteract the chimney effect in the glass tube 102. Alternatively or additionally, in some embodiments, the gas flow system 500 may produce a flow of gas through the glass tube 102 sufficient to pierce the meniscus 350 formed at the proximal end 150 of the glass tube 102 following separation of the glass article 103 from the glass tube 102 at the separating station 206. The gas flow system 500 may include a gas source 504 and at least one gas delivery assembly 502 coupled to at least one processing station 106 or to each of the plurality of holders 130 of the main turret 108. The gas from the gas source 504 may include compressed air, inert gas, other gas, or combination of gases. In some embodiments, the gas of the gas source may be an inert gas, such as argon for example, which may further reduce the probability of forming deposits on the interior surface 146 of the glass tube 102.

Referring to FIG. 5, in some embodiments, the gas delivery assembly 502 may include a nozzle 506 positioned to deliver gas from the gas source 504 into the distal end 152 of the glass tube 102, which may be secured in a holder 130. The gas delivery assembly 502 may also include a valve 508 fluidly coupled to the nozzle 506. The valve 508 may be fluidly coupled to the gas source 504 so that gas from the gas source 504 may flow through the valve 508 to the nozzle 506 when the valve 508 is in an open position. The valve 508 may be fluidly coupled to the gas source 504 by a flexible conduit 512, which may allow a position of the gas delivery assembly 502 to move relative to the gas source 504. The gas delivery assembly 502 may include a valve actuator 510 operatively coupled to the valve 508 to open and close the valve 508 to control the flow of gas to the nozzle 506. The valve actuator 510 may be a pneumatic actuator, electric actuator, hydraulic actuator, electromagnetic actuator, or other type of actuator. In some embodiments, the valve actuator 510 may be a solenoid.

The nozzle 506 may be any suitable type of nozzle. In some embodiments, the nozzle 506 may be small enough to fit inside of the distal end 152 of the glass tube 102. In some embodiments, the nozzle 506 may be decoupled from the distal end 152 of the glass tube 102.

The gas delivery assembly 502 may include a positioner 520 coupled to the nozzle 506 and movable to position the nozzle 506 relative to the distal end 152 of the glass tube 102. As previously discussed, each cycle of the converter 100 includes removal of a glass article 103 from the length of the glass tube 102, thereby reducing the length of the glass tube 102. The length of the glass tube 102 decreases with each cycle of the glass tube 102 through the processing stations 106 of the converter 100. As the length of the glass tube 102 decreases, the position of the distal end 152 of the glass tube 102 changes (i.e., moves in the −Z direction according to the coordinate axis in FIG. 5).

Referring to FIG. 5, to account for the decreasing length of the glass tube 102 and changing vertical position of the distal end 152, the positioning system 520 may be operable to translate the nozzle 506 in the vertical direction (i.e., the +/−Z direction of the coordinate axis of FIG. 5) relative to the distal end 152 of the glass tube 102. In some embodiments, the positioning system 520 may be operable to position the nozzle 506 proximate the distal end 152 of the glass tube 102 until the glass tube 102 is consumed below the level of the holder 130. Once the glass tube 102 is consumed below the level of the holder 130, leakage of gas from the nozzle 506 may occur in the holder 130 so that less of the gas flow from the nozzle 506 enters the distal end 152 of the glass tube 102. In some embodiments, the positioning system 520 may include a rail 522 and a bracket 524 movable along the rail 522. In some embodiments, the rail 522 may be coupled to the base 104 of the converter 100 at a specific processing station 106, such as the piercing station 212 or the separating station 206 for example, so that the rail 522 is stationary and does not rotate with the main turret 108 or otherwise move with the glass tube 102 from processing station 106 to processing station 106. Alternatively, in other embodiments, the rail 522 may be coupled to the main turret 108 for rotation with the main turret 108 through the plurality of processing stations 106. The rail 522 may be oriented generally parallel to the glass tube 102. For example, in some embodiments, the rail 522 may be oriented generally vertically (i.e., in the +/−Z direction of the coordinate axis of FIG. 5).

The positioning system 520 may include a servo motor 528 coupled to the bracket 524 and moveably engaged with the rail 522 to allow for movement of the bracket 524 along the rail 522 by the servo motor 528. Although depicted and described as including a rail and bracket movable along the rail by the servo motor 528, it is understood that other types of positioning systems may be used to translate the nozzle 506 in the vertical direction (i.e., the +/−Z direction of the coordinate axis in FIG. 5) relative to the glass tube 102.

Still referring to FIG. 5, the nozzle 506 may be coupled to the bracket 524. In some embodiments, the nozzle 506 may be non-rigidly coupled to the bracket 524, such as by a spring loaded coupling. Non-rigidly coupling the nozzle 506 to the bracket 524 may prevent breakage of the glass tube 102 if the nozzle 506 makes contact with the glass tube 102 while indexing the glass tube 102 into or out of the processing station 106. Additionally, in some embodiments, the valve 508 and/or the valve actuator 510 may also be coupled to the bracket 524. The bracket 524 may position the nozzle 506 vertically above the distal end 152 of the glass tube 102 so that the nozzle 506 delivers the gas downward (i.e., the −Z direction of the coordinate axis in FIG. 5) directly into the distal end 152 of the glass tube 102. Translation of the bracket 524 along the rail 522 may move the nozzle 506 in the +/−Z direction of the coordinate axis of FIG. 5 to position the nozzle 506 relative to the distal end 152 of the glass tube 102.

The positioning system 520 may include a sensor 526 positioned to detect the vertical position of the distal end 152 of the glass tube 102. In some embodiments, the sensor 526 may be coupled to the bracket 524. Alternatively, the sensor 526 may be mechanically coupled to the positioner 528, the valve actuator 510, the valve 508, the nozzle 506, or other component of the gas delivery assembly 502. The sensor 526 may be oriented towards the glass tube 102 and may determine when the nozzle 506 is properly positioned relative to the distal end 152 of the glass tube 102. Examples of sensors may include, but are not limited to, proximity sensors (photo eye), light shields, other sensors, or combinations of sensors. The sensor 526 may be communicatively coupled to the positioner 528, which may be operable to position the nozzle 506 relative to the distal end 152 of the glass tube 102 in response to a signal from the sensor 526.

The positioning system 520 may position the nozzle 506 a distance G1 from the distal end 152 of the glass tube 102. The distance G1 from the nozzle 506 to the distal end 152 of the glass tube 102 may be small as possible to enable the nozzle 506 to deliver the gas into the glass tube 102 with minimal loss of gas outside the glass tube 102. Reducing the distance G1 from the nozzle 506 to the distal end 152 of the glass tube 102 may reduce the volume flow rate of gas required to evacuate the vaporized volatile constituents from the internal volume of the glass tube 102 and/or pierce the meniscus 350 of the glass tube 102. Conversely, increasing the distance G1 from the nozzle 506 to the distal end 152 of the glass tube 102 may increase the volume flow rate of gas required to evacuate the vaporized constituents from the internal volume of the glass tube 102 and/or pierce the meniscus 350 of the glass tube 102. In some embodiments, the distance G1 from the nozzle 506 to the distal end 152 of the glass tube 102 may be from 1 millimeter (mm) to 15 mm or more. In some embodiments, the gas delivery assembly 502 may be coupled to the base 104 of the converter 100 or to a stationary structure so that the gas delivery assembly 502 is positioned at a specific processing station 106. For example, the gas delivery assembly 502 may be positioned at the piercing station 212, the separating station 206, one of the heating stations 202, and/or one of the forming stations 204. In some embodiments, the gas flow system 500 may include a plurality of gas delivery assemblies 502, each positioned at a different processing station 106. For example, the gas flow system 500 may include a gas delivery assembly 502 positioned at the piercing station 212 and another gas delivery assembly positioned at the separating station 206. Additional gas delivery assemblies 502 may be positioned at one or more heating stations 202 and/or forming stations 204.

FIG. 5 illustrates the gas delivery assembly 502 positioned at the piercing station 212 of the converter 100. In operation, the converter 100 may index the glass tube 102 into the piercing station 212 having the gas delivery assembly 502 (e.g., the piercing station 212 of FIG. 5). Once the glass tube 102 is in position in the piercing station 212, the positioning system 520 may move the bracket 524 along the rail 522 to position the nozzle 506 proximate to the distal end 152 of the glass tube 102. The converter 100 may operate the piercing burner 352 to pierce the meniscus 350 formed over the proximal end 150 of the glass tube 102 in the preceding separating station 206. Immediately following piercing of the meniscus 350, the valve actuator 510 may be operated to open the valve 508, which may allow gas from the gas source 504 to flow through the valve 508, through the nozzle 506, and into the distal end 152 of the glass tube 102. The flow of gas into the distal end 152 of the glass tube 102 may cause the gas to flow downward (i.e., in the −Z direction of the coordinate axis of FIG. 5) through the glass tube 102 to counteract the chimney effect and prevent vaporized volatile constituents from traveling upward (i.e., +Z direction of the coordinate axis of FIG. 5) through the glass tube 102 and depositing on the interior surface 146 of the glass tube 102. After a set duration of time, the valve actuator 510 may operate to close the valve 508, which may reduce and/or stop the flow of gas into the glass tube 102. The valve actuator 510 in combination with the valve 508 may be used to control the volume flow rate of the gas through the nozzle 506.

The volume flow rate of gas from the nozzle 506 into the glass tube 102 may be sufficient to counteract the chimney effect and produce a net downward (i.e., −Z direction of the coordinate axis of FIG. 5) flow of gas through the glass tube 102. The flow rate and/or pressure of the gas from the nozzle 506 may depend on the size of the glass tube 102, such as the inside diameter ID (FIG. 4) of the glass tube. The volume flow rate and or pressure of the gas may also depend on other process conditions of the converter 100, such as process speed, converter setup, or glass type.

The valve actuator 510 may maintain the valve 508 in an open position for a discrete duration of time to produce a gas pulse through the glass tube 102. In some embodiments, the pulse duration of the gas pulse may be less than the time required for the main turret 108 to cycle once through all of the processing stations 106. Alternatively, in other embodiments, the pulse duration may be less than the dwell time of the converter 100. In still other embodiments, the pulse duration may be less than the index time of the converter 100. The pulse duration may be influenced by the inner diameter ID of the glass tube 102, the process speed, the converter setup, and the glass type.

Although described in the context of the piercing station 212, it is understood that the gas delivery assembly 502 may operate in a similar manner to evacuate the internal volume of the glass tube 102, when the gas delivery assembly 502 is coupled to other processing stations 106, such as the separating station 206, one of the heating stations 202, or one of the forming stations 204. Alternatively, the gas delivery assembly 502 may be configured to pierce the meniscus 350 of the glass tube 102 at the piercing station 212 or the separating station 206. For example, when the gas delivery assembly 502 is positioned at the piercing station 212, the gas delivery assembly 502 may be configured to deliver gas flow sufficient to pierce the meniscus 350, which may allow for removal of the piercing burner 352 from the piercing station 212. In some embodiments, the gas delivery assembly 502 may be positioned at the separating station 206 and may be configured to deliver a pulse of gas sufficient to pierce the meniscus 350 immediately following separation of the glass article 103 from the glass tube 102. In these embodiments, the valve actuator 510 of the gas delivery assembly 502 may operate to open the valve 508 immediately following separation of the article 103 from the glass tube 102 to pierce the meniscus 350 before the end of the dwell time of the glass tube 102 in the separating station 206. By piercing the meniscus 350 in the separating station 206 with the gas delivery assembly 502, the piercing station 212 may be eliminated from the converter 100 or reconfigured into a different type of processing station, such as a heating station 202, forming station 204, cooling station 210, measuring station 218, or other processing station 106. Eliminating the piercing burner 352 may result in substantial improvement in SHR performance of glass articles 103 produced from the glass tube 102. In some embodiments, eliminating the piercing station 212 altogether may improve the efficiency of the converter 100 by reducing the number of processing stations 106, thereby enabling faster converting and increased throughput.

When the gas delivery assembly 502 is employed to pierce the meniscus 350 of the glass tube 102, the volume flow rate of gas may be sufficient to pierce the meniscus 350 of the glass tube 102. However, if the volume flow rate of gas through the glass tube 102 becomes too great, the gas flow may result in destructive piercing of the meniscus 350, which may produce quenched glass particles ejected from the proximal end 150 of the glass tube 102.

In some embodiments, the gas flow system 500 may include a plurality of gas delivery assemblies 502 with each of the gas delivery assemblies 502 coupled to a holder 130 so that the gas delivery assemblies 502 are indexed with the glass tube 102 through all of the processing stations 106. In these alternative embodiments, the flexible conduits 512 may couple each of the gas delivery assemblies to a gas manifold 560 (See FIG. 8). The gas manifold 560 may be coupled to the gas source 504. In some embodiments, the manifold 560 may be coupled to the gas source 504 through a rotating union 564 (FIG. 8), which may allow the gas manifold 560 to rotate with the main turret 108 and the plurality of gas delivery assemblies 502 coupled thereto. In some embodiments, the gas delivery assemblies 502 may be coupled to the main turret 108 at positions corresponding to each of the holders 130.

Referring to FIGS. 6A, 6B, and 6C, an alternative embodiment of a gas delivery assembly 502a of the gas flow system 500 is schematically depicted. The gas delivery assembly 502a may include a cylindrical mount 530 and the nozzle 506 may be coupled to the cylindrical mount 530. The cylindrical mount 530 may be removeably coupleable directly to the distal end 152 of the glass tube 102. For example, as shown in FIGS. 6A and 6B, the cylindrical mount 530 may include a clamp 532 positioned to secure the cylindrical mount 530 to and around the outer surface 140 of the glass tube 102. Alternatively, as shown in FIG. 6C, the cylindrical mount 530 may have a set screw 538 to secure the cylindrical mount 530 to the distal end 152 if the glass tube 102. Other methods and structures available in the art for removably coupling the cylindrical mount 530 to the outer surface 140 of the glass tube 102 are also contemplated. The cylindrical mount 530 may position the nozzle 506 proximate to the distal end 152 of the glass tube 102. For example, in some embodiments, the cylindrical mount 530 may position the nozzle 506 so that the nozzle 506 is spaced apart from the distal end 152 of the glass tube 102 by the distance G1, previously described in relation to FIG. 5. As shown in FIGS. 6A, 6B, and 6C, the cylindrical mount 530 may also include one or a plurality of open vents 534. The open vents 534 may prevent over-pressuring the glass tube 102 when utilizing the gas flow system 500 to purge the internal volume of the glass tube 102.

Still referring to FIGS. 6A, 6B, and 6C, the nozzle 506 may be coupled to the flexible conduit 512 by a swivel connector 536. The swivel connector 536 may allow rotation of the cylindrical mount 530 and nozzle 506 relative to the flexible conduit 512. Through engagement of the cylindrical mount 530 with the distal end 152 of the glass tube 102, the gas flow system 500a may travel with the glass tube 102 as the glass tube 102 is indexed through the plurality of processing stations 106 of the converter 100. When the glass tube 102 is consumed after multiple rotations of the main turret 108 through the plurality of processing stations 106, the cylindrical mount 530 may be removed from the distal end 152 of the glass tube 102 so that a new glass tube 102 may be loaded in the holder 130. Once the new glass tube 102 is loaded into the holder 130, the cylindrical mount 530 may be coupled to the distal end 152 of the new glass tube 102. In some embodiments, the cylindrical mount 530 may be manually removed from the glass tube 102 and installed on a new glass tube 102 during tube loading. Because the cylindrical mount 530 of the gas delivery assembly 502a is coupleable directly to the distal end 152 of the glass tube 102, the cylindrical mount 530 may eliminate the need to change the position of the nozzle 506 after each cycle of the main turret 108 to account for the decreasing length of the glass tube 102.

Referring to FIG. 7, in another embodiment of the gas flow system 500a, the gas delivery assembly 502 may include an enclosure 540 positioned to enclose the distal end 152 of the glass tube 102 extending from the holder 130. The enclosure 540 may completely surround the distal end 152 of the glass tube 102 above the main turret 108 so that the glass tube 102 above the holder 130 is contained with the enclosure 540. A gas pulse may be introduced to an internal volume of the enclosure 540 and may produce a flow of gas vertically downward (i.e., −Z direction of the coordinate axis of FIG. 7) through the glass tube 102. This vertically downward flow of gas through the glass tube 102 may counteract the chimney effect in the glass tube 102 to reduce or prevent vaporized volatile constituents from passing up the glass tube 102 and condensing on the interior surfaces 146 of the glass tube 102. The gas pulse introduced to the enclosure 540 may also be sufficient to pierce the meniscus 350 of the glass tube 102 produced during separation of the article 103 from the glass tube 102. Additionally, the enclosure 540 may prevent upward flow of vaporized volatile constituents outside of the glass tube 102 from contacting and condensing on the exterior surfaces of the glass tube 102. Thus, the enclosure 540 may prevent the deposits of volatile constituents on the exterior surfaces of the glass tube 102.

Referring to FIG. 7, the enclosure 540 may have a proximal end 550 coupled to the holder 130 and a distal end 552 that extends above the distal end 152 of the glass tube 102. Coupling the proximal end 550 of the enclosure 540 to the holder 130 may cause the enclosure 540 to travel with the holder 130 through the plurality of processing stations 106 by rotation of the main turret 108. The proximal end 550 of the enclosure 540 may include a seal (not shown) between the proximal end 550 and the holder 130. The seal may create a gas-tight seal to prevent gas introduced to the enclosure 540 from leaking out from between the distal end 552 and the holder 130. The enclosure 540 may be made from a rigid material. In embodiments, the rigid material of the enclosure 540 may be gas impermeable and heat resistant. Examples of rigid materials may include, but are not limited to, metals (e.g., steel, aluminum, Inconel, or other metal or metal alloy), glass, heat resistant polymeric material, or other material. In some embodiments, the enclosure 540 may be generally cylindrical in shape. Although described as being cylindrical in shape, the enclosure 540 may have any other convenient shape as long as the enclosure 540 completely surrounds the glass tube 102 secured in the holder 130.

The enclosure 540 may include a cap 542 that may be removably coupleable to the distal end 552 of the enclosure 540. The enclosure 540 may include a cap seal (not shown) disposed between the cap 542 and the distal end 552 of the enclosure 540. The cap seal may produce a gas-tight seal between the cap 542 and the distal end 552 of the enclosure 540 to prevent gas from leaking out of the enclosure 540. The cap 542 may be coupled to the enclosure 540 by a hinge 543, lever, swivel, or other coupling capable of allowing the cap 542 to be moved away from engagement with the distal end 552 of the enclosure 540 and replaced during tube loading. In some embodiment, the gas flow system 500a may include a device (not shown) for opening and closing the cap 542 of the enclosure 540 during tube loading. The device for opening and closing the cap 542 may be any mechanical, electromechanical, pneumatic, magnetic, or other device capable of moving the cap 542 into and out of engagement with the enclosure 540. For example, in some embodiments, the cap 542 may be a split cap comprising two parts that are spring loaded so that, during tube loading, the two parts of the split cap may be electro-mechanically spread apart via arms, and after tube loading, the spring may bring the two parts back together. In some embodiments, the cap 542 may be manually disengaged from the enclosure 540 during tube loading.

The cap 542 may have a central bore extending vertically (i.e., in the +/−Z direction of the coordinate axis of FIG. 7) through the cap 542. The cap 542 may further include a swivel connector 544 disposed within the central bore and fluidly coupled to a flexible conduit 546. The enclosure 540, the cap 542, and the holder 130 may define an internal volume of the enclosure 540. The internal volume of the enclosure 540 may be in fluid communication with the distal end 152 of the glass tube 102 when the glass tube 102 is inside of the enclosure 540. In other words, the enclosure 540 may completely surround and enclose the distal end 152 of the glass tube 102.

Still referring to FIG. 7, the gas delivery assembly 502 may further include the valve 508. The flexible conduit 546 may be coupled to the valve 508 to fluidly couple the valve 508 to the enclosure 540 through the central bore of the cap 542. The swivel connector 544 may allow for rotation of the flexible conduit 546 relative to the enclosure 540, such as when the enclosure 540 rotates with the main turret 108 and/or with the holder 130. The valve 508 may be fluidly coupled to the gas source 504 so that gas from the gas source 504 may flow through the valve 508, through the flexible conduit 546, and into the enclosure 540 through the swivel connector 544. The valve 508 may be fluidly coupled to the gas source 504 by a flexible conduit 512, which may allow a position of the gas delivery assembly 502 to move relative to the gas source 504. The gas delivery assembly 502 may include a valve actuator 510, such as a solenoid for example, operatively coupled to the valve 508 to open and close the valve 508 to control the flow of gas to the enclosure 540.

Figure 8:
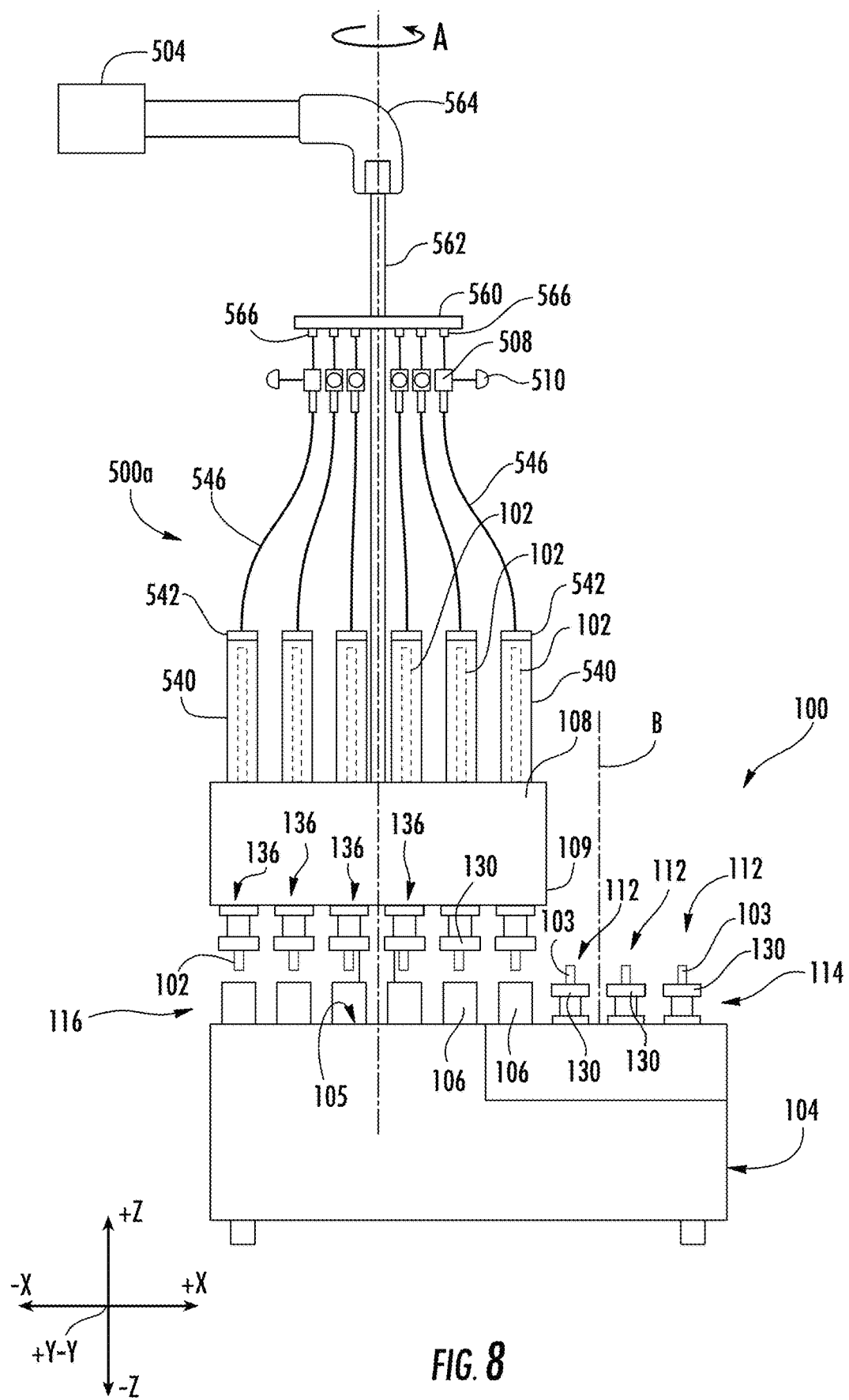
FIG. 8 schematically depicts the gas flow system of FIG. 7 having an enclosure coupled to each holder of the main turret of the converter of FIG. 1, according to one or more embodiments shown and described herein.

Referring now to FIG. 8, the gas flow system 500a may include a plurality of gas delivery assemblies 502. The enclosures 540 of the gas delivery assemblies 502 may be coupled to the holders 130 at every position on the main turret 108 so that each glass tube 102 secured in a holder 130 is enclosed within one of the enclosures 540. The gas flow system 500a may include a manifold 560 having a plurality of gas connections 566. In some embodiments, the manifold 560 may be positioned generally above (i.e., in the +Z direction of the coordinate axis of FIG. 8) relative to the main turret 108. In some embodiments, the manifold 560 may be coupled to the main turret 108 for rotation with the main turret 108. Although the manifold 560 is depicted in FIG. 8 and described herein as being circular in shape, the manifold 560 may also be non-circular when used with a non-circular converter. For example, for a linear converter, the manifold 560 may be linear. The valve 508 of each of the enclosures 540 may be fluidly coupled to one of the gas connections 566 of the manifold 560. The manifold 560 may be fluidly coupled to the gas source 504 through a gas supply conduit 562. In some embodiments, the gas supply conduit 562 and/or the manifold 560 may be fluidly coupled to the gas source 504 through a rotating union 564. For embodiments in which the processing stations 106 are arranged in a circular pattern, the rotating union 564 may allow the manifold 560 to rotate with the main turret 108 while simultaneously receiving the gas from the gas source 504 and distributing the gas to the gas delivery assemblies 502. The manifold 560 may have a plurality of connections (not shown) for mechanically and/or fluidly coupling each of the valves 508 to the manifold 560.

Referring back to FIG. 7, the gas flow system 500a may be operable to deliver a gas pulse to the enclosure 540 at one or more processing stations 106 to evacuate the internal volume of the glass tube 102 to reduce or prevent deposits of volatile components from forming on the interior surface 146 of the glass tube 102. FIG. 7 illustrates the gas delivery assembly 502 coupled to the holder 130 positioned in the piercing station 212 of the converter 100. In operation, the converter 100 may index the glass tube 102 into the piercing station 212 having the gas delivery assembly 502 (e.g., the piercing station 212 of FIG. 5). Once the glass tube 102 is in position in the piercing station 212, the converter 100 may operate the piercing burner 352 to open the meniscus 350 formed over the proximal end 150 of the glass tube 102 in the preceding separating station 206. Immediately following opening of the meniscus 350, the valve actuator 510 may be operated to open the valve 508, which may allow gas to flow from the manifold 560, through the valve 508, through the flexible conduit 546, and into the enclosure 540. Gas flow into the enclosure 540 may cause gas to flow from the enclosure 540 into the distal end 152 of the glass tube 102. The flow of gas into the glass tube 102 may cause the gases to flow downward (i.e., in the −Z direction of the coordinate axis of FIG. 5) through the glass tube 102 to counteract the chimney effect and prevent vaporized volatile constituents from traveling upward (i.e., +Z direction) through the glass tube 102 and depositing on the interior surface 146 of the glass tube 102. After a set duration of time, the valve actuator 510 may operate to close the valve 508, which may reduce and/or stop the flow of gas into the glass tube 102. The valve actuator 510 in combination with the valve 508 may be used to control the volume flow rate of the gas through the nozzle 506.

The volume flow rate of gas from the enclosure 540 into the glass tube 102 may be sufficient to counteract the chimney effect and produce a net downward (i.e., −Z direction) flow of gas through the glass tube 102. Additionally, the volume flow rate of gas sufficient to counteract the chimney effect in the glass tube 102 may be proportional to the inner diameter ID (FIG. 4) of the glass tube 102. The volume flow rate of gas may be influenced by the inner diameter ID of the glass tube 102, the dimensions of the enclosure 540, the process speed, the converter setup, and/or the type of glass. For example, a glass tube 102 having a greater inner diameter may require a greater volume flow rate of gas to counteract the chimney effect compared to a glass tube 102 having a smaller inner diameter.

As previously discussed, each cycle of the converter 100 includes removal of a glass article 103 from the length of the glass tube 102, reducing the length of the glass tube 102. The length of the glass tube 102 decreases with each cycle of the glass tube 102 through the processing stations 106 of the converter 100. The gas flow system 500a having the gas delivery assemblies 502 with the enclosures 540 may eliminate the need to reposition the gas delivery assembly 502 for each cycle of the main turret 108 to account for the decrease in length of the glass tube 102. However, as the length of the glass tube 102 decreases, the volume flow rate of gas from the manifold 560 to the enclosure 540 that may be required to counteract the chimney effect in the glass tube 102 may increase. Thus, in some embodiments, the valve actuator 510 may be operable to progressively increase the open position of the valve 508 to increase the volume flow rate of gas during the gas pulse as the length of the glass tube 102 decreases. Alternatively, in other embodiments, the valve actuator 510 may be operable to actuate to an open position sufficient to provide the required volumetric flow rate of gas at the shortest length of the glass tube 102.

The valve actuator 510 may maintain the valve 508 in an open position for a discrete duration of time to produce a gas pulse through the glass tube 102. The valve 508 may then be fully closed to end the gas pulse. In alternative embodiments, the valve 508 may be operable to deliver a gas pulse to the enclosure 540 by transitioning from a low gas flow position to a greater gas flow position. In these embodiments, the low gas flow position may provide a constant flow of gas to the enclosure 540 to maintain a slight positive pressure in the enclosure 540. When the gas pulse is initiated, the valve 508 may be opened further to increase the flow rate of gas into the enclosure 540 for the duration of the pulse to generate the gas pulse. The valve 508 may then be partially closed back to the low flow position to end the gas pulse. In some embodiments, the pulse duration may be less than the total cycle time of the converter. The total cycle time, as used herein, refers to the total time required to move a single glass tube 102 through the processing stations 106 of the converter 100, not including the secondary processing stations. Alternatively, in other embodiments, the pulse duration may be less than the dwell time of the converter 100. In still other embodiments, the pulse duration may be less than the index time of the converter 100. In still other embodiments, the pulse duration may be less than the sum of the index time and the dwell time of the converter.

Although described in the context of the piercing station 212, it is understood that the gas flow system 500a may operate to deliver a gas pulse to the enclosure 540 to evacuate the internal volume of the glass tube 102 at one or more of the other processing stations 106, such as the separating station 206 or one of the forming stations 204. Alternatively, the gas flow system 500a may be configured to deliver a gas pulse to the enclosure 540 sufficient to open the meniscus 350 of the glass tube 102 at the piercing station 212 or the separating station 206. For example, when the glass tube 102 is indexed into position at the piercing station 212, the gas flow system 500a may be configured to deliver gas flow to the enclosure 540 enclosing the glass tube 102 at the piercing station 212. The gas flow may be sufficient to open the meniscus 350. Using the gas flow system 500a to pierce the meniscus 350 may allow for elimination of the piercing burner 352 from the piercing station 212.

In some embodiments, the gas flow system 500a may be configured to deliver the gas pulse to the enclosure 540 at the separating station 206 to open the meniscus 350 immediately following separation of the article 103 from the glass tube 102. In these embodiments, the valve actuator 510 of the gas delivery assembly 502 may operate to open the valve 508 immediately following separation of the article 103 from the glass tube 102 to open the meniscus 350 before the end of the dwell time of the glass tube 102 in the separating station 206. By piercing the meniscus 350 in the separating station 206 with the gas delivery assembly 502, the piercing station 212 positioned downstream of the separating station 206 may be eliminated from the converter 100 or reconfigured into a different type of processing station, such as a heating station 202, forming station 204, cooling station 210, measuring station 218, or other processing station 106. Eliminating the piercing burner 352 may result in substantial improvement in SHR performance of glass articles 103 produced from the glass tube 102.

When the gas flow system 500a is employed to pierce/open the meniscus 350 of the glass tube 102 at the piercing station 212 or the separating station 206, the volume flow rate of gas may be sufficient to open the meniscus 350 of the glass tube 102. However, if the volume flow rate of gas through the glass tube 102 becomes too great, the gas flow may result in destructive piercing of the meniscus 350, which may separate droplets of molten glass from the proximal end 150 of the glass tube 102. As previously described, the volume flow rate of gas that may be required during the gas pulse to pierce the meniscus 350 of the glass tube 102 may increase as the glass tube 102 decreases in length through multiple passes through the processing stations 106 of the converter 100.

Referring to FIGS. 1, 2, and 6, when the glass tube 102 is fully consumed, a new glass tube 102 may be loaded into the holder 130 at the tube loading station 214 (FIG. 2). To accommodate loading the glass tube 102 into the holder 130, the cap 542 may be disengaged from the distal end 552 of the enclosure 540 and pivoted away from the distal end 552 to allow access to the holder 130. Once the new glass tube 102 is loaded into the holder 130, the cap 542 may be engaged with the distal end 552 of the enclosure 540 to seal the enclosure 540. The cap 542 may be manually or automatically engaged and disengaged with the distal end 552 of the enclosure 540 during tube loading in the tube loading station 214.

In an alternative embodiment, the gas flow system 500a may include a single gas delivery assembly 502 having the enclosure 540. The single gas delivery assembly 502 may be positioned at a specific processing station 106, such as the piercing station 212, the separating station 206, one of the heating stations 202, or one of the forming stations 204. During operation, the enclosure 540 may be engaged with the holder 130 to enclose the glass tube 102 secured in the holder 130 when the holder 130 is indexed into the processing station 106. The gas pulse may be applied to the glass tube 102 by the gas delivery assembly 502 through the enclosure 540 enclosing the glass tube 102. After the gas pulse, the enclosure 540 may be disengaged from the holder 130 and removed from the processing station 106.

Figure 9A:
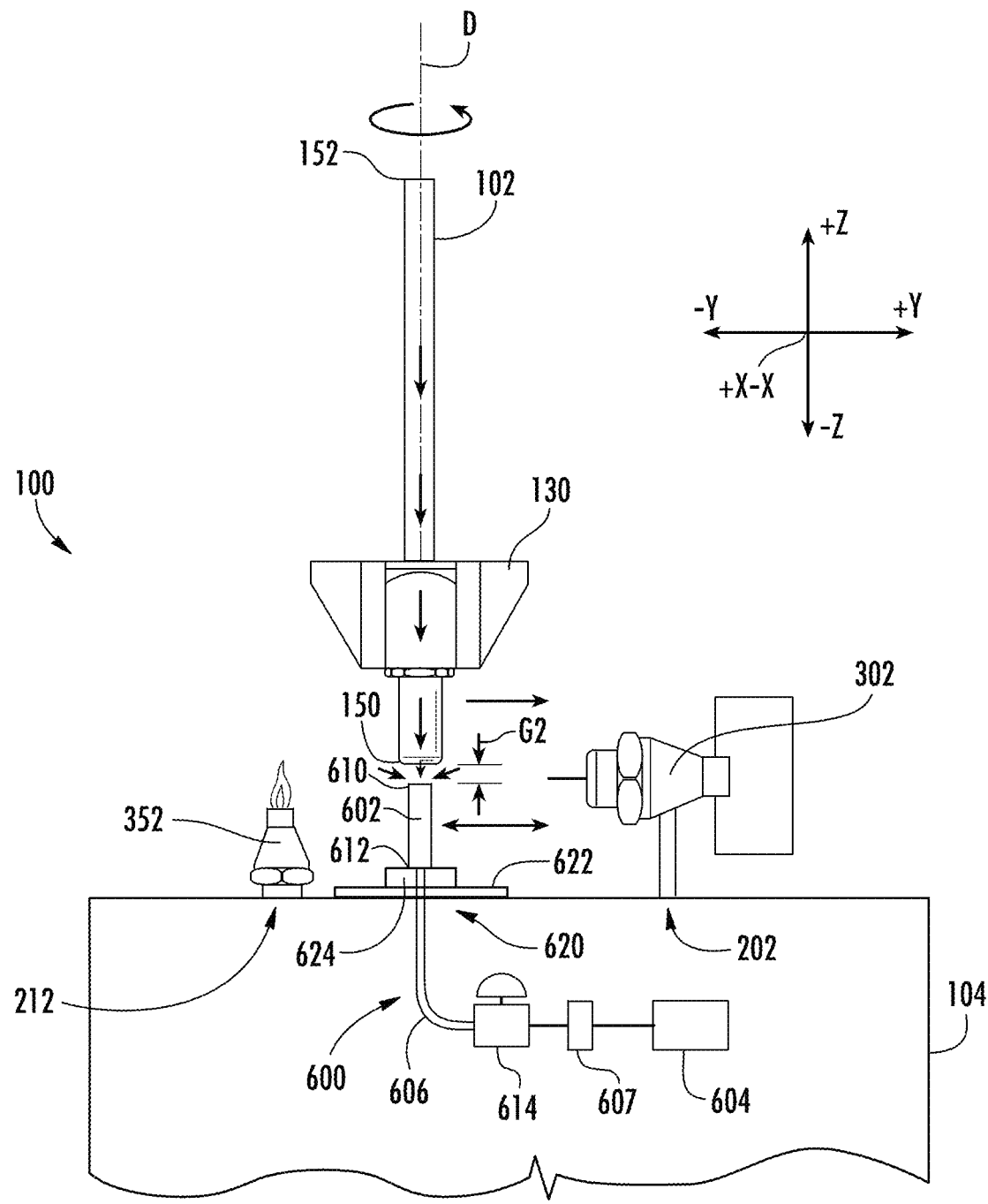
FIG. 9A schematically depicts a suction system positioned between two processing stations of the converter of FIG. 1, according to one or more embodiments shown and described herein.

Referring to FIGS. 9A-15B, additional systems and methods disclosed herein may reduce or eliminate formation of deposits on the interior surface 146 of the glass tube 102 by introducing a negative pressure (e.g., a negative pressure pulse or a continuous suction) to the proximal end 150 of the glass tube 102 to produce a flow of gas and/or vapors through the glass tube 102 from the distal end 152 to the proximal end 150 (i.e., the −Z direction of the coordinate axis of FIG. 9A). As used in this disclosure, the term "negative pressure" refers to a localized pressure that is less than ambient pressure, thereby producing a suction force that induces a flow of gas towards the source of the negative pressure. Producing a flow of gas through the glass tube 102 towards the proximal end 150 of the glass tube 102 by application of a negative pressure to the proximal end 150 of the glass tube 102 may counteract the chimney effect caused by heating the gases inside the glass tube 102 and may reduce or prevent vaporized volatile constituents from traveling upward (i.e., in the +Z direction of the coordinate axis of FIG. 9A) through the glass tube 102 and condensing on the interior surface 146 of the glass tube 102. Additionally or alternatively, in other embodiments, the systems and methods disclosed herein may reduce or eliminate the formation of deposits on the interior surface 146 of the glass tube 102 by using the negative pressure (i.e., suction) to open the meniscus 350, thereby eliminating the piercing burner 352 at the piercing station 212.

Referring to FIGS. 9A, 9B, 10, 11, and 12, the converter 100 may include a gas flow system operable to produce a negative pressure at the proximal end 150 of the glass tube 102. In some embodiments, the gas flow system may be a suction system 600 positionable proximate to the proximal end 150 of the glass tube 102 when the glass tube 102 is positioned in one of the processing stations 106 of the converter 100 or when the glass tube 102 is indexed between two processing stations 106. The suction system 600 may be operable to produce a negative pressure at the proximal end 150 of the glass tube 102 to produce a flow of gas and/or vapors in the internal volume of the glass tube from the distal end 152 to the proximal end 150 of the glass tube 102 (e.g., the flow of gas may be vertically downward in the −Z direction of the coordinate axis in FIG. 9A). In some embodiments, the suction system 600 may be positioned at a specific processing station 106, such as the piercing station 212, the separating station 206, one of the heating stations 202, one of the forming stations 204, or other processing stations 106. Alternatively, in other embodiments, the suction system 600 may be positioned between two of the processing stations 106 to produce the negative pressure at the proximal end 150 of the glass tube 102 when the glass tube 102 is indexed between the two processing stations 106. For example, the suction system 600 may be positioned between the separating station 206 and the piercing station 212 of the converter and/or between the piercing station 212 and a heating station 202 or other processing station 106 downstream of the piercing station 212.

In some embodiments, the suction system 600 may reduce the SHR of the glass articles 103 produced from the glass tube 102 by evacuating the gases and/or vapors from the internal volume of the glass tube 102. In particular, the negative pressure produced by the suction system 600 through the suction tube 602 positioned close to the proximal end 150 of the glass tube 102 may be sufficient to overcome the chimney effect in the internal volume of the glass tube 102 and cause the gases and/or vapors to flow towards the proximal end 150 of the glass tube 102 (i.e., in the −Z direction of the coordinate axis of FIG. 9A) and out of the glass tube 102. Removing the gases and vapors from the internal volume of the glass tube 102 may reduce or prevent vaporized volatile constituents of the glass from condensing on the interior surface 146 of the glass tube 102, thereby reducing the SHR of the glass tube 102 and the glass articles 103 made therefrom.

In other embodiments, the negative pressure produced by the suction system 600 may be utilized to pierce the meniscus 350 of the glass tube 102 formed during separation of the glass article 103 from the glass tube 102 in the separating station 206. Using the suction system 600 to pierce the meniscus 350 may enable elimination of the piercing burner 352 in the piercing station 212, which may further reduce the SHR of glass articles 103 made from the glass tube 102 and may enable the piercing station 212 to be reconfigured into another type of processing station 106. Additionally, in some embodiments, using the suction system 600 to open the meniscus 350 may enable elimination of the piercing station 212 altogether, which may increase the efficiency of the converter 100 by enabling faster converting and increased throughput.

The suction system 600 may also allow for the reduction of SHR of the glass tube 102 without having to adjust for the progressive shortening of the glass tube 102 as the glass tube 102 cycles multiple times through the processing stations 106 of the converter 100. The suction system 600 is positioned at the proximal end 150 of the glass tube 102, which does not change positions as the glass tube 102 is consumed through multiple passes of the glass tube 102 through the processing stations 106.

Figure 9B:
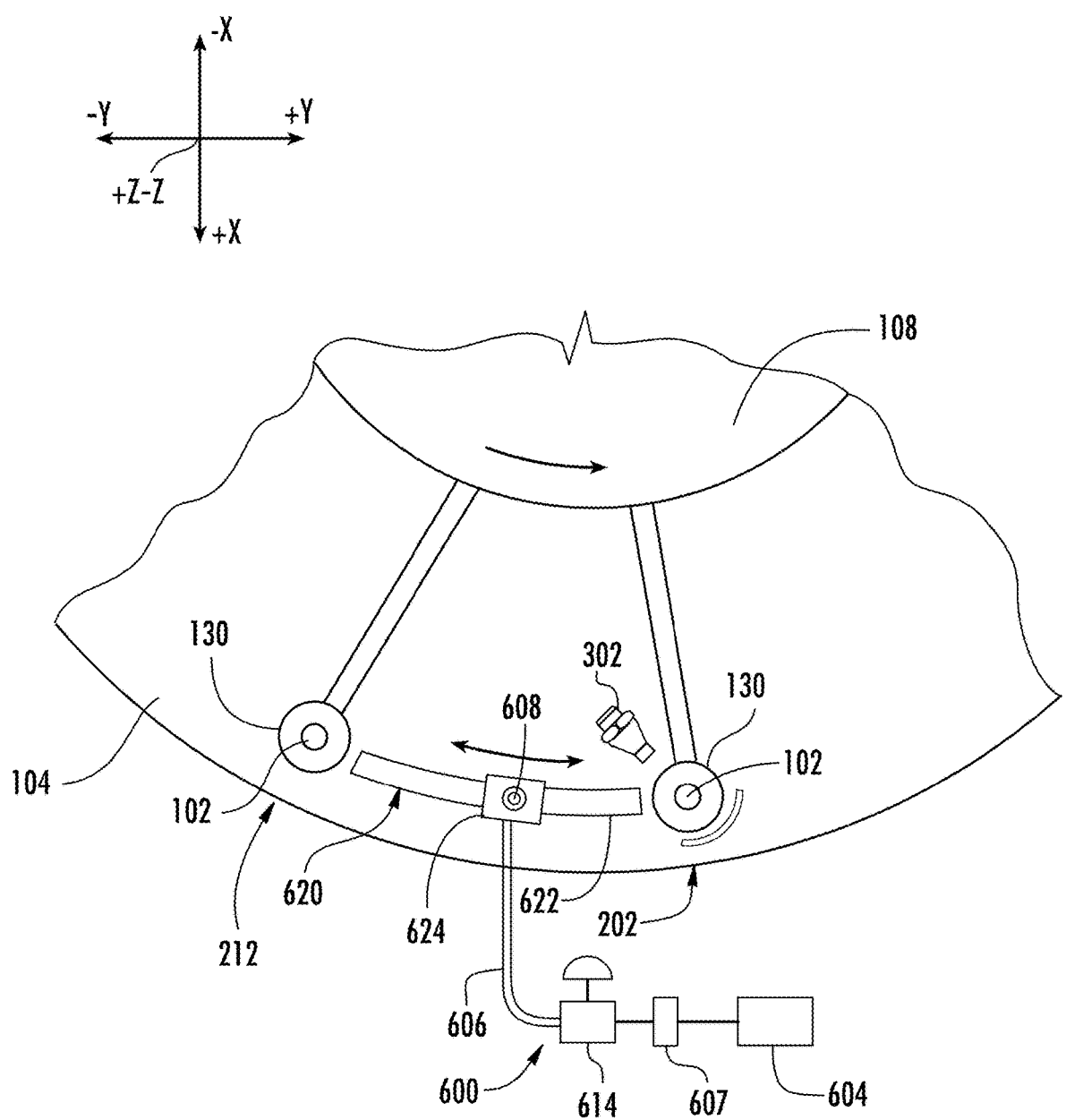
FIG. 9B schematically depicts a top view of the suction system of FIG. 9A, according to one or more embodiments shown and described herein.

Referring to FIGS. 9A and 9B, the suction system 600 may include a suction tube 602 and a vacuum generator 604 fluidly coupled to the suction tube 602 by a conduit 606. The suction system 600 may optionally include a vacuum manifold 607 fluidly coupling the vacuum generator 604 to the conduit 606. In some embodiments, the suction system 600 may include a plurality of suction tubes 602 disposed at different positions on the converter 100, such as at or between combinations of heating stations 202, forming stations 204, separating stations 206, piercing stations 212, or other processing stations 106. In these embodiments, the optional vacuum manifold 607 may enable the vacuum generator 604 to supply vacuum to the plurality of suction tubes 602 simultaneously.

In some embodiments, the suction system 600 may optionally include a control valve 614 to control an amount of negative pressure applied by the suction tube 602 to the proximal end 150 of the glass tube 102. As used herein, a "control valve" refers to a combination of a valve and an actuator operable to control the position of the valve (e.g., the combination of valve 508 and actuator 510 described relative to FIG. 5 may be considered a control valve), thereby controlling the flow through the valve. The control valve 614 may also control the duration of the negative pressure applied by the suction tube 602. For example, the control valve 614 may be operated to open and close to deliver a negative pressure pulse (i.e., a negative pressure applied for a discrete period of time) to the proximal end 150 of the glass tube 102. The control valve 614 may include one or more of a pneumatic actuator, electric actuator, hydraulic actuator, electromagnetic actuator, or other type of actuator. In some embodiments, the control valve 614 may include a solenoid.

The suction tube 602 may include a suction inlet 608 (FIG. 9B) disposed in a proximal end 610 of the suction tube 602. As used in relation to the suction tube 602, the proximal end 610 is the end of the suction tube 602 oriented towards the proximal end 150 of the glass tube 102. A distal end 612 of the suction tube 602 may be coupled to the conduit 606. The distal end 612 of the suction tube 602 refers to the end of the suction tube 602 oriented away from the proximal end 150 of the glass tube 102. The suction tube 602 may be generally cylindrical in shape with a cross-sectional shape that may be circular, oval, square, rectangular, polygonal, or any other convenient shape. Although the suction tube 602 is described herein as being a structure separate from the conduit 606, it is understood that the suction tube 602 may also be an end portion of the conduit 606 such that the suction tube 602 and the conduit 606 form a unitary structure.

The suction tube 602 may be oriented parallel to the glass tube 102 with the proximal end 610 of the suction tube 602 vertically below (i.e., in the −Z direction of the coordinate axis of FIG. 9A) and facing towards the proximal end 150 of the glass tube 102 so that the suction inlet 608 of the suction tube 602 at least partially overlaps with the opening in the proximal end 150 of the glass tube 102 when viewed in the +/−Z direction of the coordinate axis of FIG. 9A. In some embodiments, the suction tube 602 may be centered on the axis of rotation D of the glass tube 102 so that the suction tube 602 is vertically aligned (i.e., in the +/−Z direction of the coordinate axis of FIG. 9A) with the glass tube 102 and the suction inlet 608 is centered below the opening in the proximal end 150 of the glass tube 102.

The suction tube 602 may be positioned with the proximal end 610 of the suction tube 602 spaced apart from the proximal end 150 of the glass tube 102 by a distance G2 in the +/−Z direction of the coordinate axis of FIG. 9A. In some embodiments, the distance G2 may be small enough to produce a negative pressure sufficient to overcome the chimney effect in the internal volume of the glass tube 102. In other embodiments, the distance G2 may be small enough to produce a negative pressure sufficient to pierce the meniscus 350 formed over the proximal end 150 of the glass tube 102 in the separating station 206. The distance G2 may be decreased to reduce the amount of vacuum required to overcome the chimney effect in the internal volume of the glass tube 102 and produce the flow of gas and/or vapors towards the proximal end 150 of the glass tube 102 and/or pierce the meniscus 350 formed over the proximal end 150 of the glass tube 102.

However, the proximal end 150 of the glass tube 102 may exhibit dimensional variability from glass tube to glass tube, and positioning the suction tube 602 too close to the proximal end 150 of the glass tube 102 may result in contact of the glass tube 102 with the suction tube 602 during indexing of the glass tube 102 into the processing station 106 or between processing stations 106. Additionally, when the suction tube 602 is positioned at the piercing station 212, separating station 206, or one of the heating stations 202, positioning the suction tube 602 too close to the glass tube 102, may affect the performance of the burner (e.g., the burner 302, the separating burner 348, or the piercing burner 352). In particular, producing the negative pressure in close proximity to the burner at the heating station 202, separating station 206, or piercing station 212 may disrupt the flame by diverting the flame away from the glass tube 102 towards the suction tube 602. Furthermore, positioning the proximal end 610 of the suction tube 602 too close to the glass tube 102 may reduce or eliminate the amount of room temperature air drawn into the suction tube 602, which may lead to damage to the suction tube 602, conduit 606, vacuum manifold 607, and/or the vacuum generator 604. For example, heated gases and vapors from the internal volume of the glass tube 102 as well as room temperature air may be drawn into the suction tube 602. The room temperature air from outside the glass tube 102 mixes with the heated gases and vapors drawn from inside the glass tube 102 and cools the heated gases and vapors. The heated gases and vapors from the internal volume of the glass tube 102 may reach temperatures greater than 1000° C., 1200° C., or even as high as 1500° C. Without room temperature air to mix with and cool these gases and vapors, drawing these heated gases and vapors into the suction system 600 through the suction tube 602 may cause thermal stress to the suction system 600, which may result in damage to the suction tube 602, conduit 606, vacuum manifold 607, control valve 614, and/or the vacuum generator 604.

Referring to FIG. 9A, in some embodiments, the distance G2 between the suction tube 602 and the glass tube 102 may be less than or equal to 25 millimeters (mm). For example, in some embodiments, the distance G2 between the suction tube 602 and the glass tube 102 may be less than or equal to 20 mm, less than or equal to 15 mm, less than or equal to 10 mm or less than or equal to 5 mm. In some embodiments, the distance G2 between the suction tube 602 and the glass tube 102 may be influenced by the inner diameter ID (FIG. 4) of the glass tube 102, the process speed, the converter setup, and/or the type of glass.

As previously described, positioning the suction tube 602 close to the proximal end 150 of the glass tube 102 may cause the suction tube 602 to contact gases and/or vapors having temperatures in excess of 1000° C., or even in excess of 1200° C. or 1500° C. In some embodiments, the suction tube 602 may be constructed of heat resistant materials, such as a metals, ceramics, other refractory materials, or combinations thereof, to minimize damage to the suction tube 602 caused by the heated gases and vapors. For example, the suction tube 602 may be made from one or more of quartz, fused silica, alumina, Inconel, or combinations of these. The conduit 606 and/or the vacuum manifold 607 may also be made from heat resistant materials such as metal (e.g., steel, aluminum, Inconel, or other metal or metal alloy), ceramics, other refractory materials, heat resistant polymers, other heat resistant materials, or combinations thereof.

The vacuum generator 604 may be any suitable device for producing a vacuum or suction at the proximal end 610 of the suction tube 602. In some embodiments, the vacuum generator 604 may be capable of producing a negative pressure at the proximal end 610 of the suction tube 602 sufficient to evacuate the gases from the internal volume of the glass tube 102 and/or pierce the meniscus 350 of the glass tube 102. Examples of vacuum generators may include, but are not limited, vacuum pumps, Venturi devices (e.g., vacuum ejectors), compressed air vacuum generators, vacuum compressors, fans, other apparatus capable of producing sufficient negative pressure, or combinations of these.

In some embodiments, the conduit 606 may be a rigid conduit, such as a conduit made from metals (e.g., steel, aluminum, Inconel, or other metal or metal alloy), glass, rigid heat resistant polymers, ceramics, or other rigid materials. Alternatively, in other embodiments, the conduit 606 may be a flexible conduit, such as a rubber hose, flexible plastic conduit, or flexible metal hose. Using a flexible conduit for the conduit 606 may enable movement of the suction tube 602 relative to the vacuum generator 604 and/or the vacuum manifold 607 as described subsequently in this disclosure. In some embodiments, the conduit 606 may be coupled to the suction tube 602 with a swivel connector (not shown) to enable the suction tube 602 to rotate slightly relative to the conduit 606.

FIGS. 9A and 9B illustrate the suction system 600 positioned between the piercing station 212 and a heating station 202 downstream of the piercing station 212 to produce the negative pressure as the glass tube 102 is indexed between the piercing station 212 and the heating station 202. Although depicted as being positioned between the piercing station 212 and the heating station 202, it is understood that the suction system 600 could be positioned between the separating station 206 and the piercing station 212 or between any two other processing stations 106 of the converter 100.

The suction system 600 may include a translation system 620 operable to move the suction tube 602 between the piercing station 212 and the heating station 202 to maintain the suction tube 602 aligned with the glass tube 102 as the glass tube 102 is indexed from the piercing station 212 to the heating station 202. In some embodiments, the translation system 620 may include a track 622 and a suction tube carriage 624 engaged with the track 622 and translatable along the track 622. The track 622 may be shaped to follow the path of the glass tube 102 as it is indexed between the two processing stations 106. For example, in some embodiments, the track 622 may be arcuate in shape to follow the arcuate path of the glass tube 102 indexed through processing stations 106 arranged in a circular pattern. Alternatively, in other embodiments, the converter 100 may have a linear arrangement of processing stations 106, and the track 622 may be linear. Other shapes for the track 622 are contemplated depending on the spatial arrangement of the processing stations 106 of the converter 100. The suction tube 602 may be coupled to the suction tube carriage 624 so that when the suction tube 602 is positioned underneath the glass tube 102, the proximal end 610 of the suction tube 602 is spaced apart from the proximal end 150 of the glass tube 102 by the distance G2 previously described. Various devices may be utilized to translate the suction tube carriage 624 along the track 622. Examples of these devices may include, but are not limited to, servo motors, hydraulic cylinders, or other devices capable of moving the suction tube carriage 624 along the track 622.

In operation, at the end of the dwell time of the glass tube 102 in the piercing station 212, the translation system 620 may position the suction tube 602 at an end of the track 622 nearest to the piercing station 212. When the dwell time concludes, the glass tube 102 may be indexed from the piercing station 212 to the heating station 202 immediately downstream from the piercing station 212 (e.g., in the direction of rotation of the main turret 108). As the glass tube 102 moves out of the piercing station 212, the translation system 620 may position the suction tube 602 under the proximal end 150 of the glass tube 102 (i.e., in the −Z direction of the coordinate axis of FIG. 9A) and move the suction tube 602 in concert with the glass tube 102 to maintain the suction tube 602 in alignment with and under the glass tube 102 until the glass tube 102 reaches the heating station 202. While moving the suction tube 602 along under the glass tube 102, the suction tube 602 may produce a negative pressure at the proximal end 150 of the glass tube 102, which may overcome the chimney effect in the internal volume of the glass tube 102 and cause the heated gases and vapors in the internal volume of the glass tube 102, including volatile constituents vaporized in the piercing station 212, to flow downward (i.e., −Z direction of the coordinate axis of FIG. 9A) through the glass tube 102 and out through the proximal end 150 of the glass tube 102. Producing the flow of heated gases and vapors downward through the glass tube 102 may reduce or prevent condensation of the volatile constituents on the interior surface 146 of the glass tube 102. When the suction system 600 is positioned between the separating station 206 and the piercing station 212, the suction from the suction tube 602 may be sufficient to pierce the meniscus 350 formed at the proximal end 150 of the glass tube 102 in the separating station 206.

Referring to FIG. 9A, the control valve 614 of the suction system 600 may operate to open and close to deliver a negative pressure pulse while the suction tube 602 is positioned underneath the glass tube 102. For example, in some embodiments, the control valve 614 may open when the suction tube 602 is positioned under the glass tube 102 at the separating station 206 end of the track 622 and close when the suction tube 602 reaches the piercing station 212 end of the track 622. Alternatively, in other embodiments, the control valve 614 may be operated to open for a duration shorter than a time required to move the suction tube 602 along the entire track 622. At the end of the index time, when the glass tube 102 is in position in the subsequent processing station (i.e., heating station 202 of FIGS. 9A and 9B), the translation system 620 may move the suction tube 602 back along the track 622 to the upstream processing station 106 (i.e., piercing station 212 in FIGS. 9A and 9B) to position the suction tube 602 for indexing the next glass tube 102 between processing stations 106.

Although the translation system 620 is described as including the track 622 and the suction tube carriage 624, the translation system 620 may also include an arm that pivots about a pivot point or other mechanical, electromechanical, or magnetic device to maintain the suction tube 602 aligned with the glass tube 102 during indexing of the glass tube 102.

Figure 10:
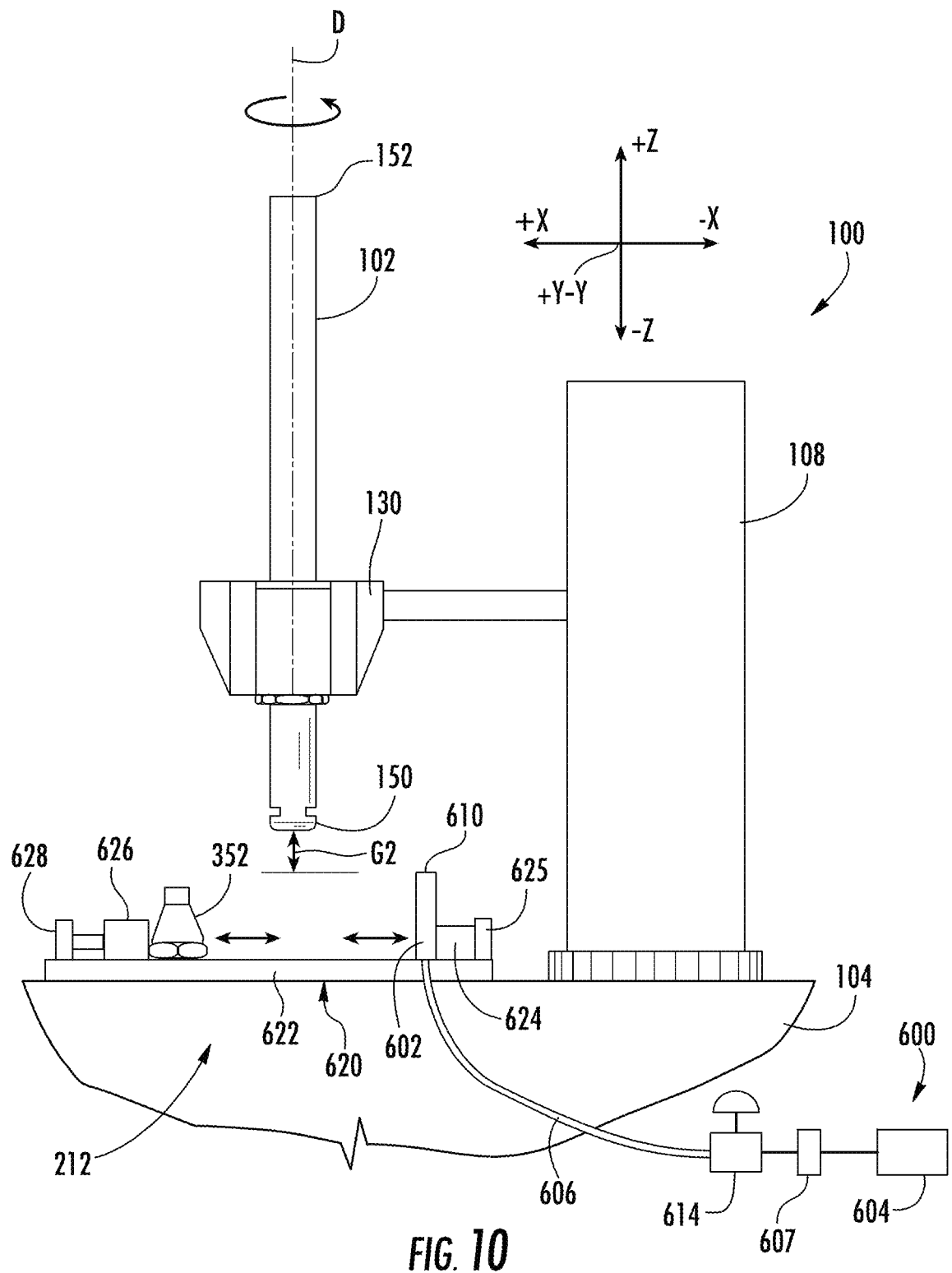
FIG. 10 schematically depicts another embodiment of the suction system of FIG. 9A positioned at a single processing station of the converter of FIG. 1, according to one or more embodiments shown and described herein.

Referring to FIG. 10, in an alternative embodiment, the suction system 600 may be positioned at a specific processing station 106, such as the piercing station 212 shown in FIG. 10, and the translation system 620 may be operable to move the suction tube 602 into and out of position under the proximal end 150 of the glass tube 102 during the dwell time of the converter 100, when the glass tube 102 is positioned in the piercing station 212. As previously described, the translation system 620 may include the track 622 and the suction tube carriage 624 movable along the track 622 to move the suction tube 602 into and out of position beneath the glass tube 102. The suction tube 602 may be coupled to the suction tube carriage 624 so that when the suction tube 602 is positioned underneath the glass tube 102, the proximal end 610 of the suction tube 602 is spaced apart from the proximal end 150 of the glass tube 102 by the distance G2 previously described.

The translation system 620 may also include a suction tube actuator 625 to move the suction tube carriage 624 along the track 622 to index the suction tube 602 into and out of position beneath the proximal end 150 of the glass tube 102. The translation system 620 may also include a burner carriage 626 coupled to the piercing burner 352, or other burner or forming tool, and movable along the track 622. The translation system 620 may include a burner actuator 628 to move the burner carriage 626 along the track 622 to index the piercing burner 352 into and out of position in the piercing station 212. The suction tube actuator 625 and burner actuator 628 may be any type of actuator capable of translating the suction tube carriage 624 and burner carriage 626, respectively, along the track 622. Examples of actuators that may be suitable for the suction tube actuator 625, burner actuator 628, or both may include, but are not limited to, pneumatic actuators, electric actuators, hydraulic actuators, magnetic actuators, servo motors, gear systems, or other actuators.

In operation, the piercing burner 352 may be indexed into position in the piercing station 212 for piercing the meniscus 350 of the glass tube 102 when the glass tube 102 is indexed in the piercing station 212. Once the piercing burner 352 pierces the meniscus 350, the burner actuator 628 may be operated to move the piercing burner 352 out of position in the piercing station 212, and the suction tube actuator 625 may be operated to move the suction tube 602 into position underneath the proximal end 150 of the glass tube 102 and into alignment with the glass tube 102. The suction tube 602 may produce a negative pressure at the proximal end 150 of the glass tube 102 to draw heated gases and vapors downward (i.e., the −Z direction of the coordinate axis of FIG. 10) through the internal volume of the glass tube 102 and out of the proximal end 150 of the glass tube 102. In some embodiments, the control valve 614 may operate to open and close the suction tube 602 to deliver a negative pressure pulse to the proximal end 150 of the glass tube 102 when the suction tube 602 is in position beneath the glass tube 102. For example, the control valve 614 may be operated to open when the suction tube 602 is first positioned beneath the glass tube 102 and close at the end of the dwell time. Alternatively, the control valve 614 may be operated to open when the suction tube 602 is positioned beneath the glass tube 102 and close before the end of the dwell time or after the end of the dwell time. At the end of the dwell time, the converter 100 indexes the glass tube 102 to the next processing station 106. The translation system 620 then may operate to move the suction tube 602 out of position in the piercing station 212 and move the piercing burner 352 back into position in the piercing station 212 to pierce the next glass tube 102 indexed into the piercing station 212.

Alternatively, in some embodiments, the suction tube actuator 625 may be operable to translate the suction tube 602 vertically (i.e., in the +/−Z direction of the coordinate axis of FIG. 10) into and out of position proximate to the proximal end 150 of the glass tube 102.

Although the suction system 600 is depicted in FIG. 10 as being positioned at the piercing station 212 of the converter 100, it is understood that the suction system 600 may be positioned at any of the other processing stations 106 of the converter 100. For example, the suction system 600 may be positioned at the separating station 206 of the converter 100, and the translation system 620 may be operable to move the separating burner 348 and the suction tube 602 into and out of position in the separating station 206. The suction system 600 may also be positioned at one of the heating stations 202, one of the forming stations 204, or one of the other processing stations 106 of the converter 100.

Figure 11:
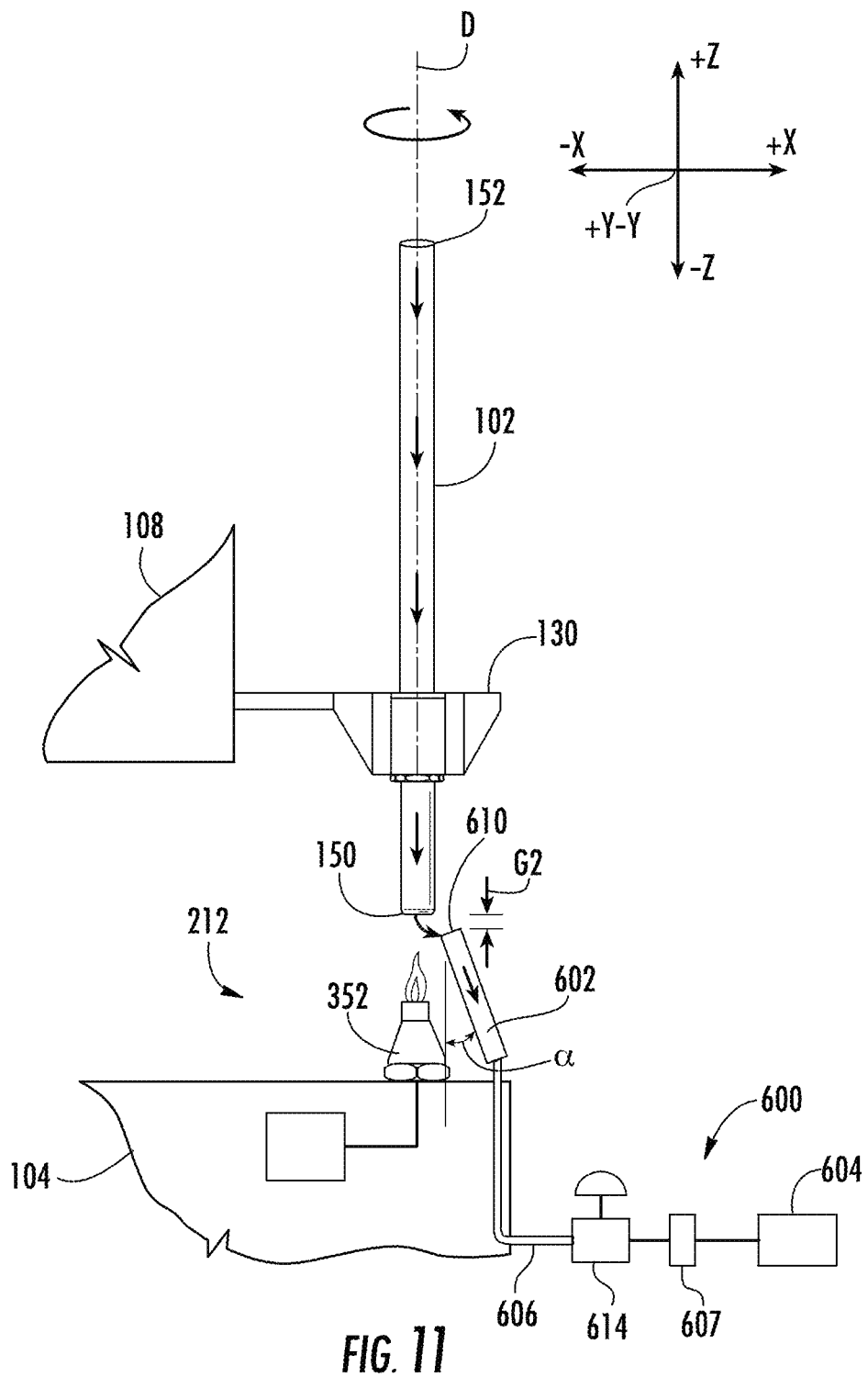
FIG. 11 schematically depicts yet another embodiment of the suction system of FIG. 9A, according to one or more embodiments shown and described herein.

Referring to FIG. 11, the suction tube 602 may be coupled to the piercing station 212 or other processing station 106 at a fixed position relative to the base 104 of the converter 100 so that the proximal end 610 of the suction tube 602 is spaced apart from the proximal end 150 of the glass tube 102 by the distance G2 when the glass tube 102 is indexed into the piercing station 212. In some embodiments, the suction tube 602 may be mounted in a fixed position at an angle α relative to the centerline of the glass tube 102 (i.e., axis D), as depicted in FIG. 11. In some embodiments, the angle α may be greater than zero and less than 90°. Alternatively, in other embodiments, the suction tube 602 may be oriented substantially parallel to axis D and positioned with the centerline of the suction tube 602 offset from axis D of the glass tube 102. In these embodiments, when the suction tube 602 is substantially parallel to axis D, the angle α may be less or equal to than 5°, less than or equal to 3°, less than or equal to 1°, or about 0°. Although shown in FIG. 11 as being coupled to the piercing station 212 of the converter 100, it is understood that the suction tube 602 may be coupled to any other processing station 106, such as one of the separating station 206, heating stations 202, or forming stations 204, for example.

In operation, the suction system 600 having the suction tube 602 coupled at a fixed position may be operable to provide a continuous negative pressure at the proximal end 610 of the suction tube 602. Alternatively, in some embodiments, the suction system 600 may be operable to produce a negative pressure pulse at the proximal end 150 of the glass tube 102. For example, the control valve 614 may operate to open for a discrete duration of time to deliver the negative pressure pulse and then may close to end the negative pressure pulse. In some embodiments, the duration of the negative pressure pulse may be less than the dwell time of the converter 100. For example, in some embodiments, the suction tube 602 may be positioned in the piercing station 212, and the suction system 600 may be configured to open the control valve 614 to produce a negative pressure pulse to evacuate the heated gases and vapors from the internal volume of the glass tube 102 after piercing the meniscus 350 with the piercing burner 352.

Figure 21B:
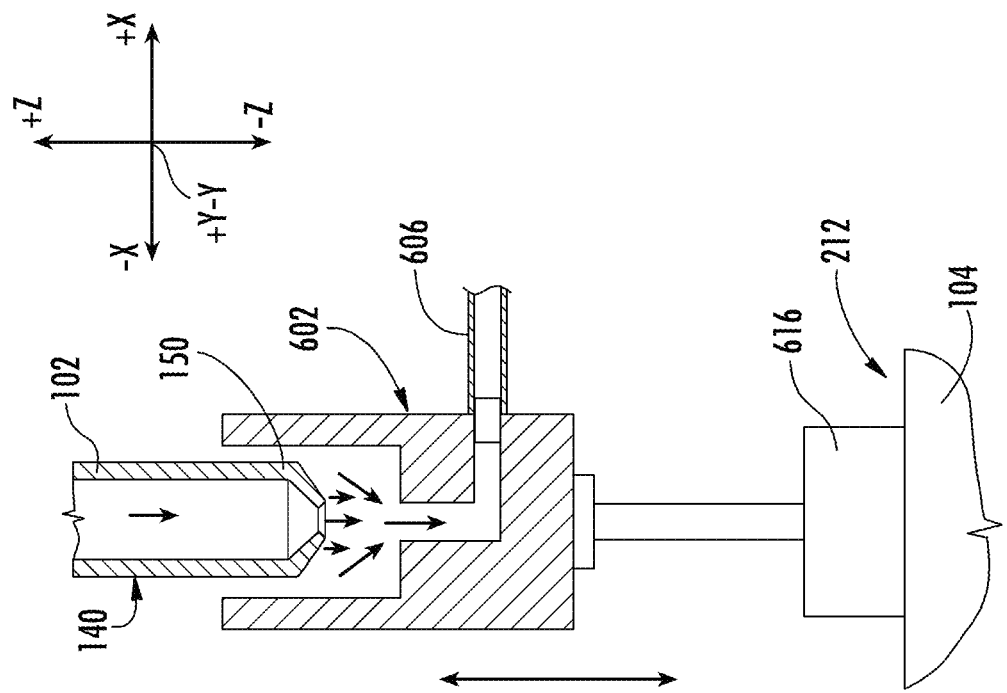
FIG. 21B schematically depicts operation of the suction system of FIG. 21A, according to one or more embodiments shown and described herein.
Figure 21A:
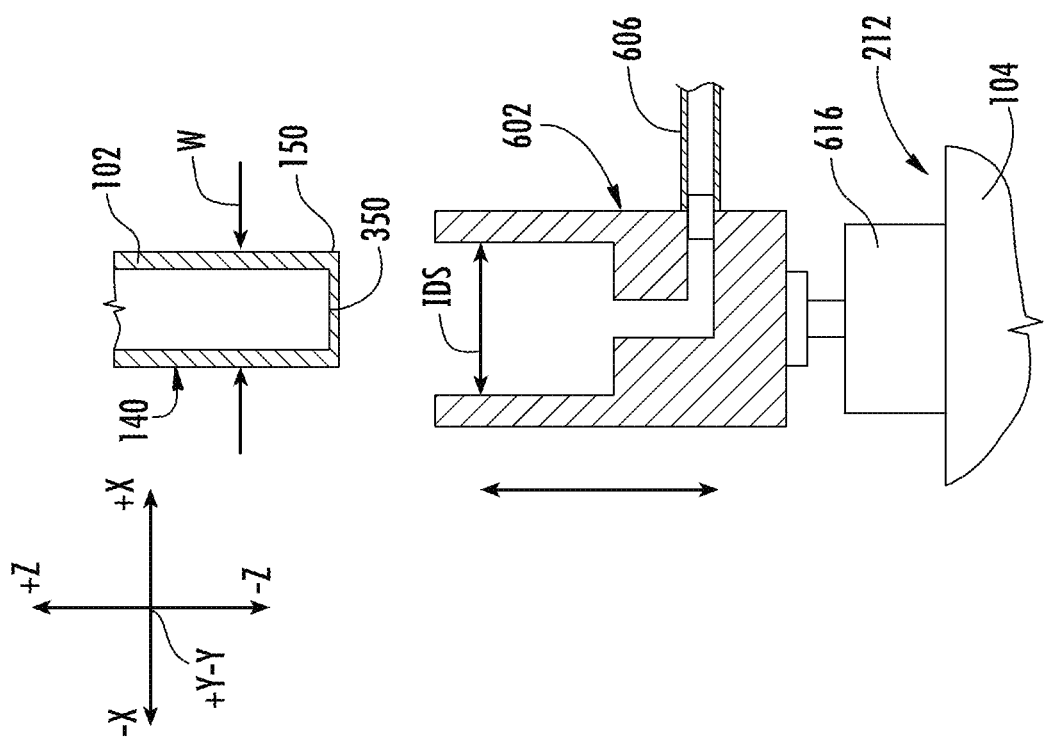
FIG. 21A schematically depicts another embodiment of a suction system of the converter of FIG. 1, according to one or more embodiments shown and described herein.

Referring to FIGS. 21A and 21B, in some embodiments, the suction system 600 may be used to pierce the meniscus 350 of the glass tube 102 in the piercing station 212 instead of the piercing burner 352. In these embodiments, the suction tube 602 may be coupled to the base 104 at the piercing station 212 of the converter 100. The suction tube 602 may be coupled in a fixed position so that the suction tube 602 is aligned vertically (i.e., +/−Z direction of the coordinate axis of FIG. 11) with the glass tube 102 (i.e., the centerline of the suction tube 602 is aligned with the axis D of the glass tube 102). The suction system 600 may be operable to deliver a negative pressure pulse at the proximal end 150 of the glass tube 102 sufficient to pierce the meniscus 350 formed at the proximal end 150 of the glass tube 102 in the separating station 206.

As shown in FIGS. 21A and 21B, in some embodiments, the proximal end 610 of the suction tube 602 may have an inner diameter IDS that is larger than the width W of the glass tube 102. The suction system 600 may include an actuator 616 operable to actuate the suction tube 602 vertically upward (i.e., in the +Z direction of the coordinate axis of FIG. 21A) towards the proximal end 150 of the glass tube 102. In some embodiments, the actuator 616 may move the suction tube 602 vertically upward into a position in which the proximal end 610 of the suction tube 602 surrounds the proximal end 150 of the glass tube 102. The actuator 616 may be any type of mechanical, electromechanical, pneumatic, hydraulic, magnetic, or other type of actuator capable of indexing the suction tube 602 upward towards the proximal end 350 of the glass tube 102.

Referring to the embodiment in FIGS. 21A and 21B, in operation, the main turret 108 may index the glass tube 102 into the piercing station 212. When the glass tube 102 is in position in the piercing station 212, the actuator 616 may actuate to move the suction tube 602 towards the proximal end 150 of the glass tube 102 so that the proximal end 610 of the suction tube 602 surrounds the proximal end 150 of the glass tube 102, as shown in FIG. 21A. The suction tube 602 may apply the negative pressure to the meniscus 350 at the proximal end 150 of the glass tube 102. The negative pressure may be sufficient to pierce the meniscus 350 of the glass tube 102, as shown in FIG. 21B. In some embodiments, the suction tube 602 may continue to produce the negative pressure after piercing the meniscus 350 to further evacuate gases and vapors from the internal volume of the glass tube 102. The actuator 616 may then be actuated again to move the suction tube 602 vertically downward (i.e., in the −Z direction of the coordinate axis of FIG. 21) away from the glass tube 102 to disengage the suction tube 602 from the proximal end 150 of the glass tube 102. At the end of the dwell time of the converter 100, the main turret 108 may then index the glass tube 102, which has the meniscus 350 pierced by the suction tube 602, from the piercing station 212 to a downstream processing station 106.

In some embodiments, the suction system 600 may include a plurality of suction tubes 602, and each of the suction tubes 602 may be coupled to one of the holders 130 so that each of the suction tubes 602 may be indexed with the glass tube 102 through each of the processing stations 106. In some embodiments, the vacuum manifold 607 may be positioned above the main turret 108 and may be fluidly coupled to the vacuum generator 604 through a rotating union, such as the rotating union 560 depicted in FIG. 8. In some embodiments, the suction system 600 may be configured to deliver suction to the proximal ends 150 of the glass tubes 102 continuously throughout the converting process. Alternatively, in other embodiments, the suction system 600 may be configured to deliver negative pressure pulses to the proximal ends 150 of the glass tubes 102 at one or more specific processing stations 106, such as one of the heating stations 202, forming stations 204, separating station 206, piercing station 212, or other processing station 106.

Figure 12A:
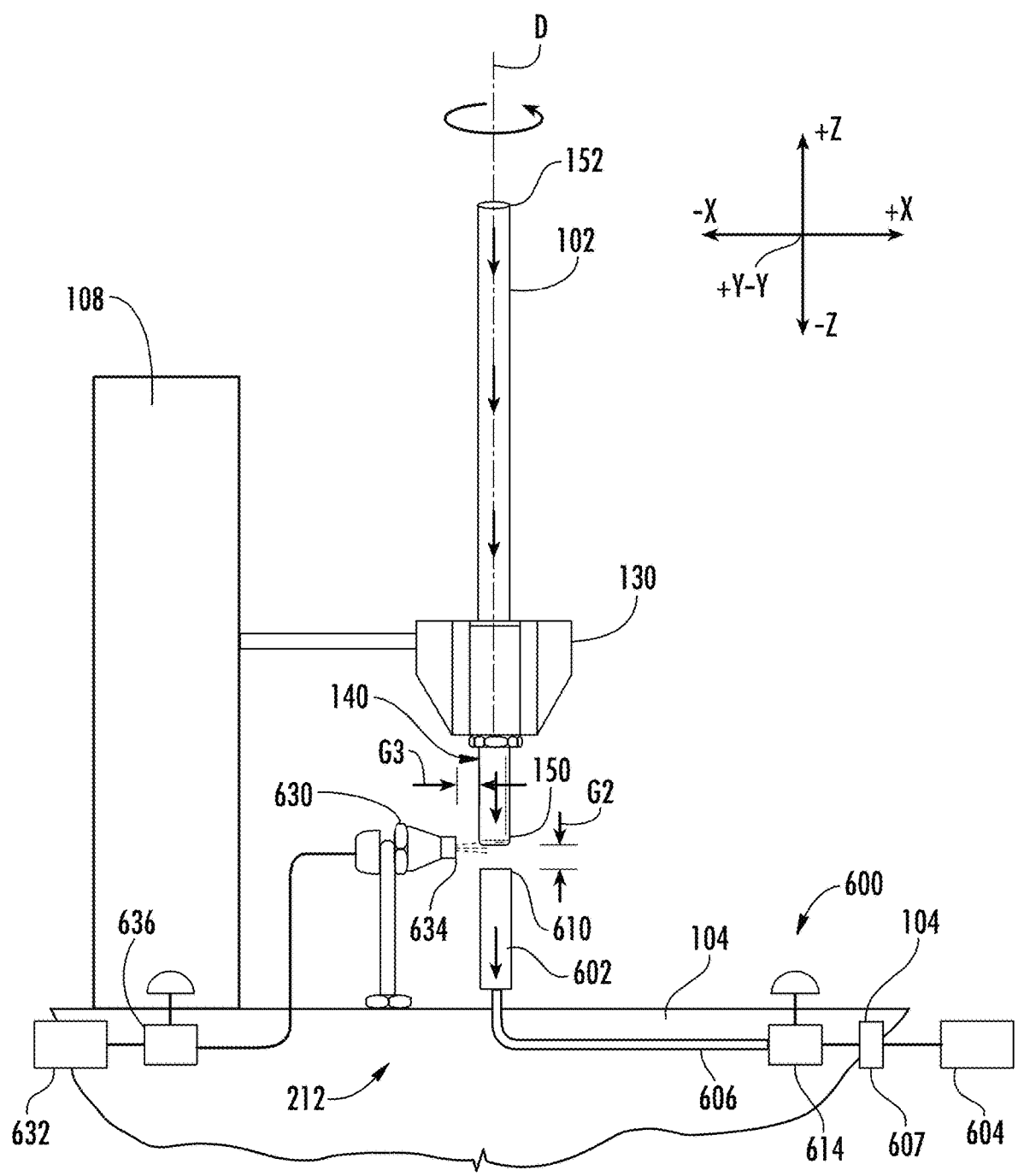
FIG. 12A schematically depicts an embodiment of a piercing station of the converter of FIG. 1, according to one or more embodiments shown and described herein.
Figure 12B:
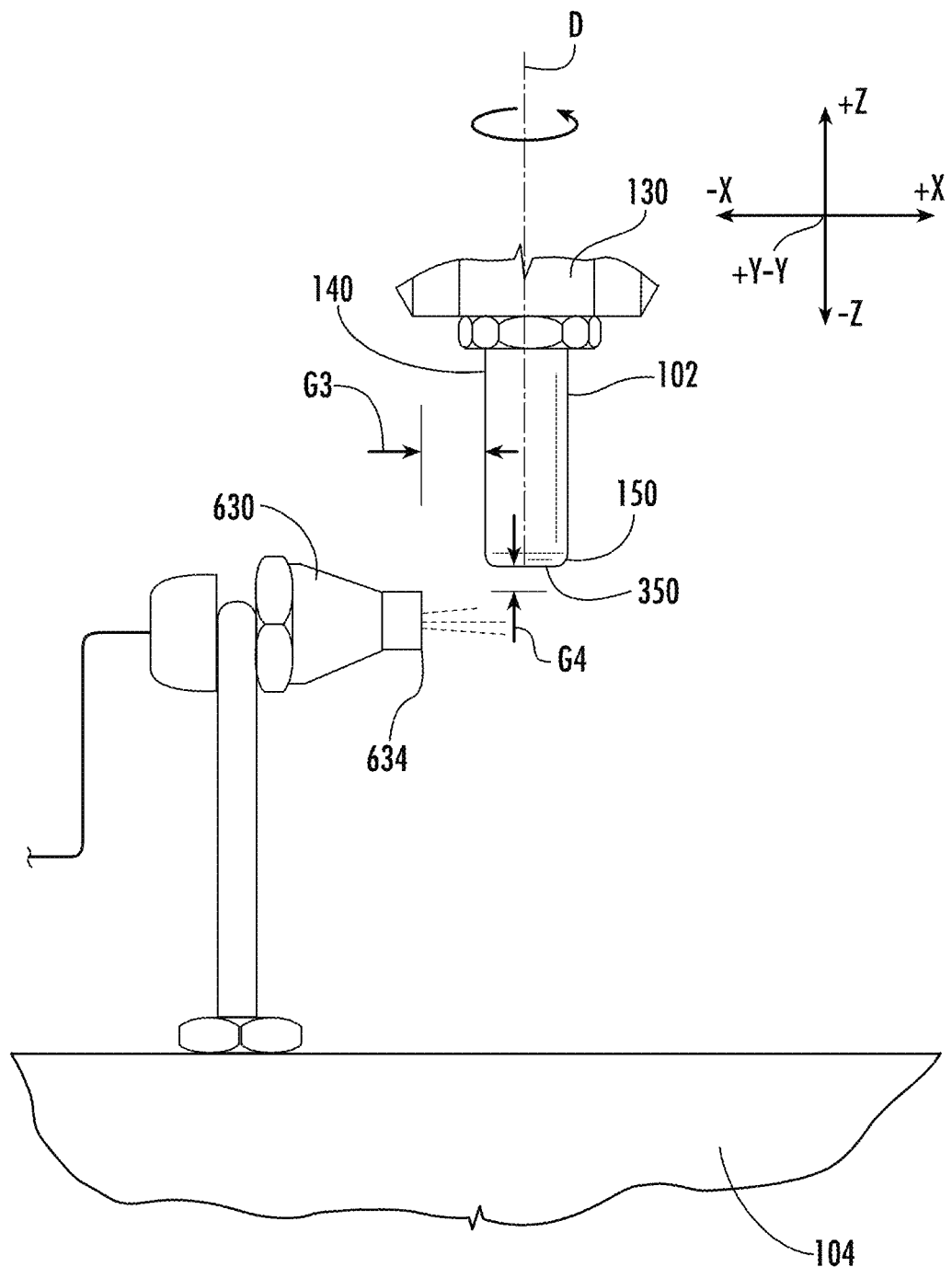
FIG. 12B schematically depicts a piercing jet positioned in the piercing station of FIG. 12A, according to one or more embodiments shown and described herein.

Referring to FIGS. 12A and 12B, in some embodiments, the piercing station 212 of the converter 100 may include a piercing jet 630 positioned to direct a gas flow across the meniscus 350 of the glass tube 102 to pierce the meniscus 350. The gas flow across the meniscus 350 of the glass tube 102 may produce a vacuum or suction force against the meniscus 350 through the Bernoulli Effect. The suction force may be sufficient to open the meniscus 350 of the glass tube 102 at the piercing station 212. The velocity of the gas flow across the meniscus 350 of the glass tube 102 may be influenced by the inner diameter ID of the glass tube 102, the process speed, the converter setup, and/or the type of glass. The piercing jet 630 may be a gas jet, a burner, or any other suitable type of nozzle capable of delivering a high-velocity stream of air across the meniscus 350 of the glass tube 102. For example, in some embodiments, the piercing jet 630 may be a multi-orifice planer burner. The piercing jet 630 may be fluidly coupled to one or more gas sources 632, such as fuel gas, oxygen, compressed air, nitrogen, inert gas, other gas or combinations of gases. Control valve 636 may be positioned between the gas source 632 and the piercing jet 630 to control operation of the piercing jet 630. For example, the control valve 636 may be configured to open and close to deliver a burst of gas flow (i.e., a gas pulse) across the meniscus 350 at the proximal end 150 of the glass tube 102. The control valve 636 may include one or more of a pneumatic actuator, electric actuator, hydraulic actuator, electromagnetic actuator, or other type of actuator. In some embodiments, the control valve 636 may include a solenoid.

As shown in FIGS. 12A and 12B, the piercing jet 630 may be coupled to the base 104 of the converter 100 and may be oriented to produce a flow of gas generally perpendicular to the axis D of the glass tube 102 and parallel to the meniscus 350 of the glass tube 102 (i.e., generally in an X-Y plane of the coordinate axis of FIGS. 12A and 12B). The proportions in FIG. 12B are exaggerated for purposes of illustration. Referring to FIG. 12B, the piercing jet 630 may be spaced radially outward from the glass tube 102 so that the tip 634 of the piercing jet 630 is radially spaced apart from the outer surface 140 of the glass tube 102 by a distance G3. The distance G3 between the tip 634 of the piercing jet 630 and the outer surface 140 of the glass tube 102 may be small enough to provide a gas stream having a gas velocity across the surface of the meniscus 350 sufficient to create a suction force capable of opening the meniscus 350. However, if the distance G3 is too small, the tip 634 of the piercing jet 630 may contact the glass tube 102 when the glass tube 102 is indexed into and out of the piercing station 212. In some embodiments, the piercing jet 630 may be coupled to an actuator (not shown) that may be operable to move the piercing jet 630 into and out of position relative to the proximal end 150 of the glass tube 102. In some embodiments, the distance G3 between the tip 634 of the piercing jet 630 and the outer surface 140 of the glass tube 102 may be less than or equal to 10 mm. However, in some embodiments, the distance G3 may be influenced by the inner diameter ID (FIG. 4) of the glass tube 102, the process speed, the converter setup, and/or the type of glass.

Referring to FIG. 12B, the piercing jet 630 may be vertically positioned (i.e., in the +/−Z direction of the coordinate axis of FIG. 12B) so that the gas flow from the piercing jet 630 flows across the meniscus 350 of the glass tube 102 to create a vacuum along the surface of the meniscus 350 sufficient to open the meniscus 350. In some embodiments, the piercing jet 630 may be positioned so that the center of the tip 634 of the piercing jet 630 is vertically aligned with the X-Y plane defined by the meniscus 350 of the glass tube 102. Alternatively, the piercing jet 630 may be vertically positioned lower (i.e., in the −Z direction of the coordinate axis of FIG. 12B) than the proximal end 150 of the glass tube 102 so that the tip 634 of the piercing jet 630 is spaced apart from the proximal end 150 of the glass tube 102 in the +/−Z direction of the coordinate axis of FIG. 12B by a distance G4. The distance G4 may be small enough to enable the gas flow from the piercing jet 630 to produce sufficient suction force/vacuum against the meniscus 350 to open the meniscus 350. If the distance G4 is too great so that the piercing jet 630 is vertically spaced too far from the meniscus 350 of the glass tube 102, then the air flow from the piercing jet 630 may not be sufficient to create an amount of suction needed to pierce the meniscus 350. The distance G4 may be influenced by the inner diameter ID (FIG. 4) of the glass tube 102, the process speed, the converter setup, and/or the type of glass.

Referring back to FIG. 12A, the piercing station 212 may also include the suction tube 602 of the suction system 600 positioned vertically below the proximal end 150 of the glass tube 102. In some embodiments, the suction tube 602 may be vertically aligned (i.e., in the +/−Z direction of the coordinate axis of FIG. 12A) with the axis D of the glass tube 102 to center the proximal end 610 of the suction tube 602 directly below the proximal end 150 of the glass tube 102. In some embodiments, the proximal end 610 of the suction tube 602 may be vertically spaced apart from the proximal end 150 of the glass tube 102 by the distance G2 previously described in this disclosure. Alternatively, in other embodiments, the suction tube 602 may be indexed upward towards the proximal end 150 of the glass tube 102 after the piercing jet 630 pierces the meniscus 350.

Referring to FIG. 12A, in operation, the main turret 108 indexes the glass tube 102 from the separating station 206 to the piercing station 212. Once the glass tube 102 is in position within the piercing station 212, the control valve 636 may open to initiate gas flow across the meniscus 350 at the proximal end 150 of the glass tube 102 to open the meniscus 350. When the meniscus 350 has been opened, the control valve 636 may partially or fully close to decrease or stop the gas flow across the proximal end 150 of the glass tube 102. In some embodiments, the control valve 636 may be maintained in the open or partially open position to continue to apply suction at the proximal end 150 of the glass tube 102. In some embodiments, the gas pulse produced by the piercing jet 630 and control valve 636 may have a duration that is less than the dwell time of the converter 100. In still other embodiments, the gas pulse may have a duration that is less than a sum of the dwell time and the index time of the converter 100. The duration of the gas pulse produced by the piercing jet 630 may depend on the inner diameter ID (FIG. 4) of the glass tube 102, the process speed, the converter setup, and/or the type of glass. The control valve 614 of the suction system 600 may then operate to deliver a negative pressure pulse through the suction tube 602 to the proximal end 150 of the glass tube 102. In some embodiments, the suction tube 602 may be indexed into position after piercing and before the control valve 614 operates to deliver the gas pulse to the proximal end 150 of the glass tube 102. The negative pressure pulse may cause gases and vapors in the internal volume of the glass tube 102 to flow downward (i.e., in the −Z direction of the coordinate axis of FIG. 12A) and out of the glass tube 102 through the proximal end 150 of the glass tube 102. Using the piercing jet 630 to open the meniscus 350 of the glass tube 102 formed in the separating station 206 may reduce or prevent the deposition of vaporized volatile constituents of the glass on the interior surface 146 of the glass tube 102 by eliminating the piercing burner 352 in the piercing station 212. Integration of the suction system 600 with the piercing jet 630 to evacuate gases and vapors from the internal volume of the glass tube 102 after piercing the meniscus 350 with the piercing jet 630 may further reduce deposition of vaporized volatile constituents of the glass on the interior surface 146 of the glass tube 102. Reducing deposition of vaporized volatile constituents of the glass on the interior surface 146 of the glass tube 102 may reduce the SHR of the glass articles 103 produced from the glass tube 102.

Figure 12C:
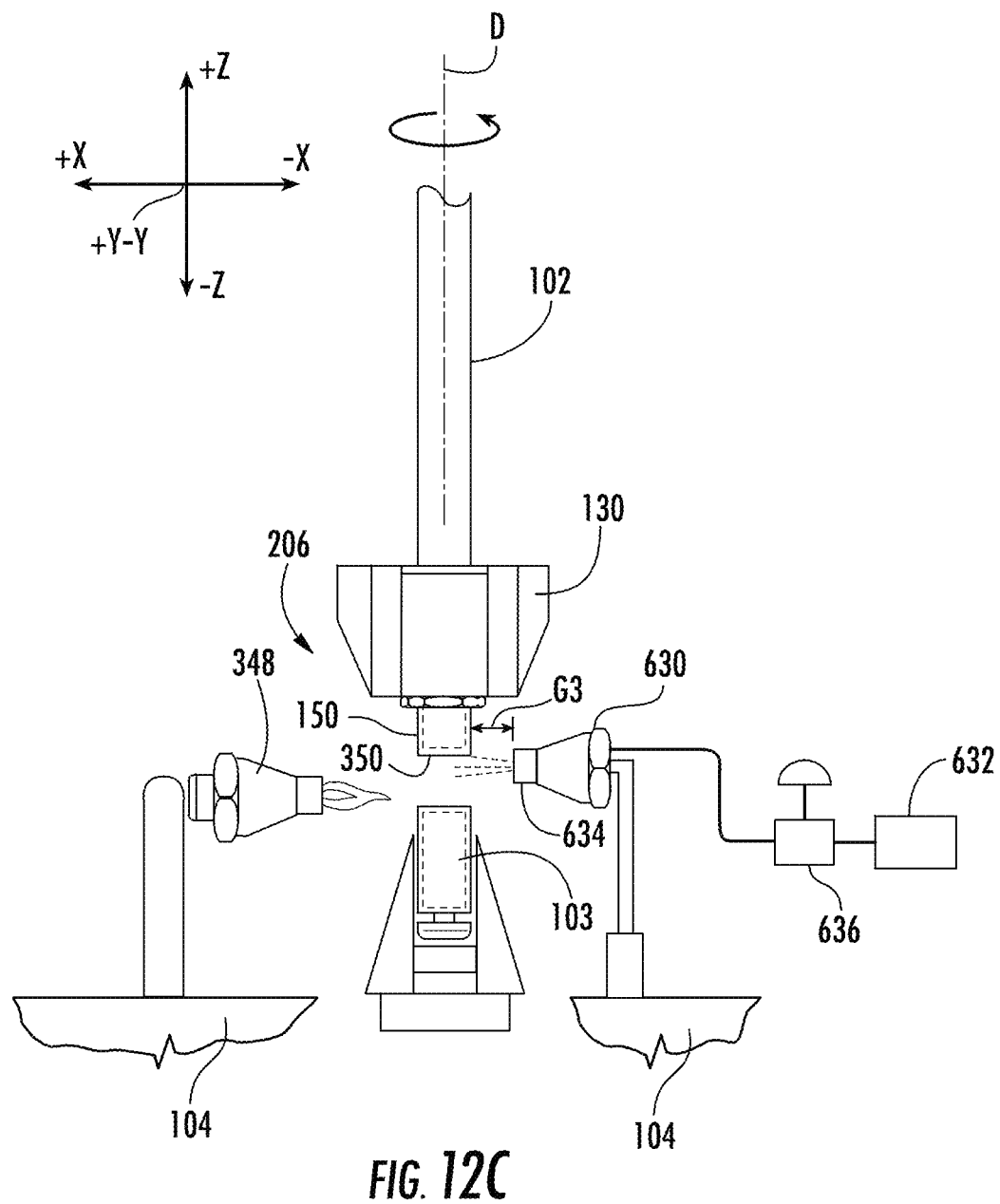
FIG. 12C schematically depicts the piercing jet depicted in FIGS. 12A and 12B incorporated into a separating station of the converter of FIG. 1, according to one or more embodiments shown and described herein.

Referring to FIG. 12C, in an alternative embodiment, the piercing jet 630 may be positioned at the separating station 206 of the converter 100. The piercing jet 630 may be configured to deliver a gas pulse across the meniscus 350 immediately after separation of the glass article 103 from the glass tube 102 and formation of the meniscus 350 across the proximal end 150 of the glass tube 102. The piercing jet 630 may be positioned and oriented relative to the proximal end 150 of the glass tube 102 as previously described in relation to FIGS. 12A and 12B.

Referring to FIG. 12C, in operation, the converter 100 indexes the glass tube 102 into the separating station 206. When the glass tube 102 is in position in the separating station 206, the separating burner 348 operates to heat the glass tube 102 and separate the glass article 103 from the proximal end 150 of the glass tube 102. Once the glass article 103 has been separated from the glass tube 102, the control valve 636 may open to deliver a gas pulse through the piercing jet 630 and across the meniscus 350 formed at the proximal end 150 of the glass tube 102 during separation. The gas pulse may flow across the meniscus 350 and may produce a suction force on the meniscus 350. The suction force on the meniscus 350 may be sufficient to pierce the meniscus 350 to open the proximal end 150 of the glass tube 102. As discussed hereinabove, incorporating the piercing jet 630 into the separating station 206 to open the meniscus 350 in the separating station 206 may reduce the deposition of vaporized volatile constituents of the glass on the interior surface 146 of the glass tube 102 by eliminating the piercing burner 352. Eliminating the piercing burner 352 may enable the piercing station 212 of the converter 100 to be reconfigured into a different type of processing station 106, such as a heating station 202 for example. The ability to utilize the piercing station 212 for an additional processing station 106 may improve the efficiency of the converter 100, by reducing the processing time and increasing the throughput.

Figure 13A:
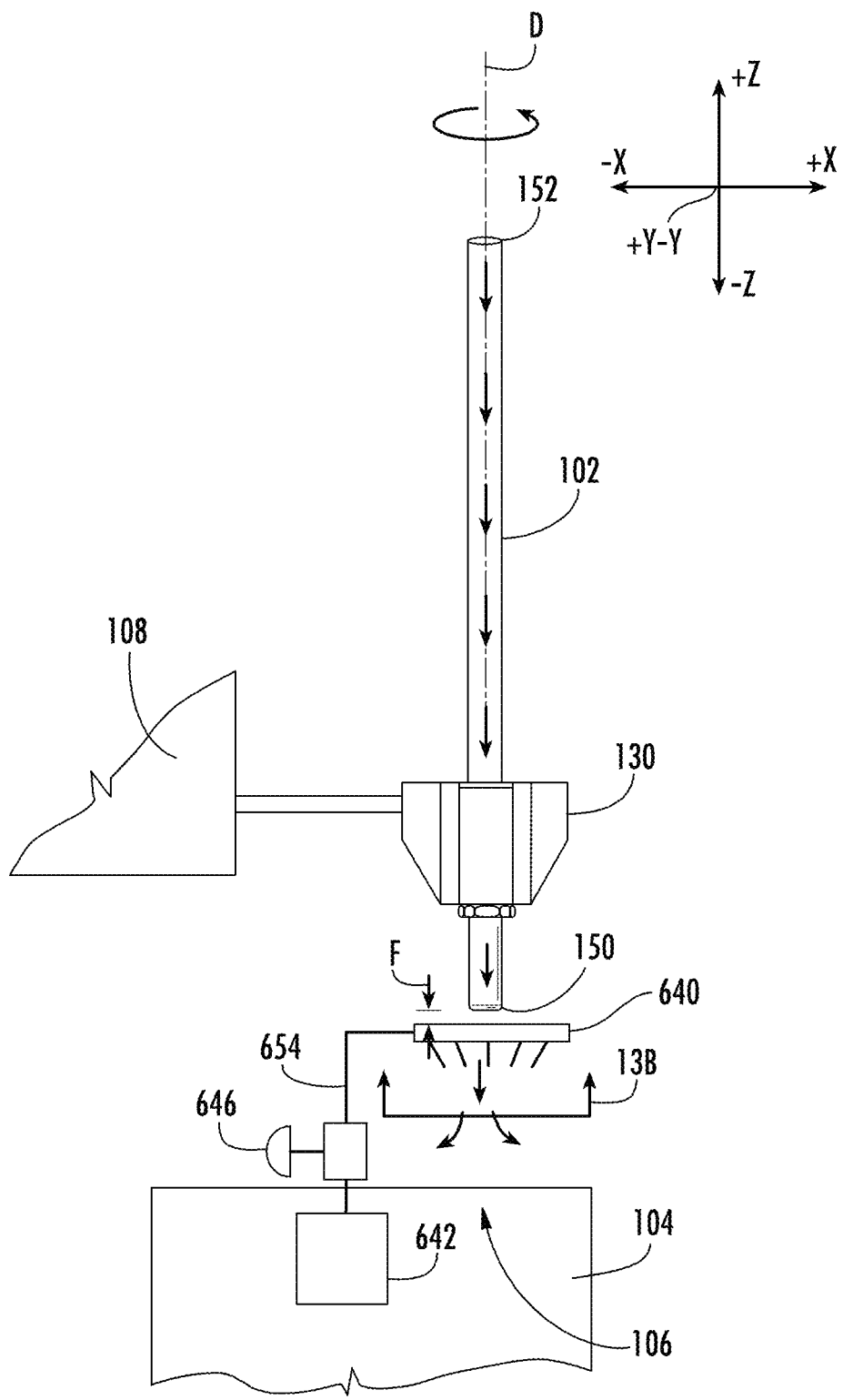
FIG. 13A schematically depicts another embodiment of a suction system having a ring burner disposed at a processing station of the converter of FIG. 1, according to one or more embodiments shown and described herein.
Figure 13B:
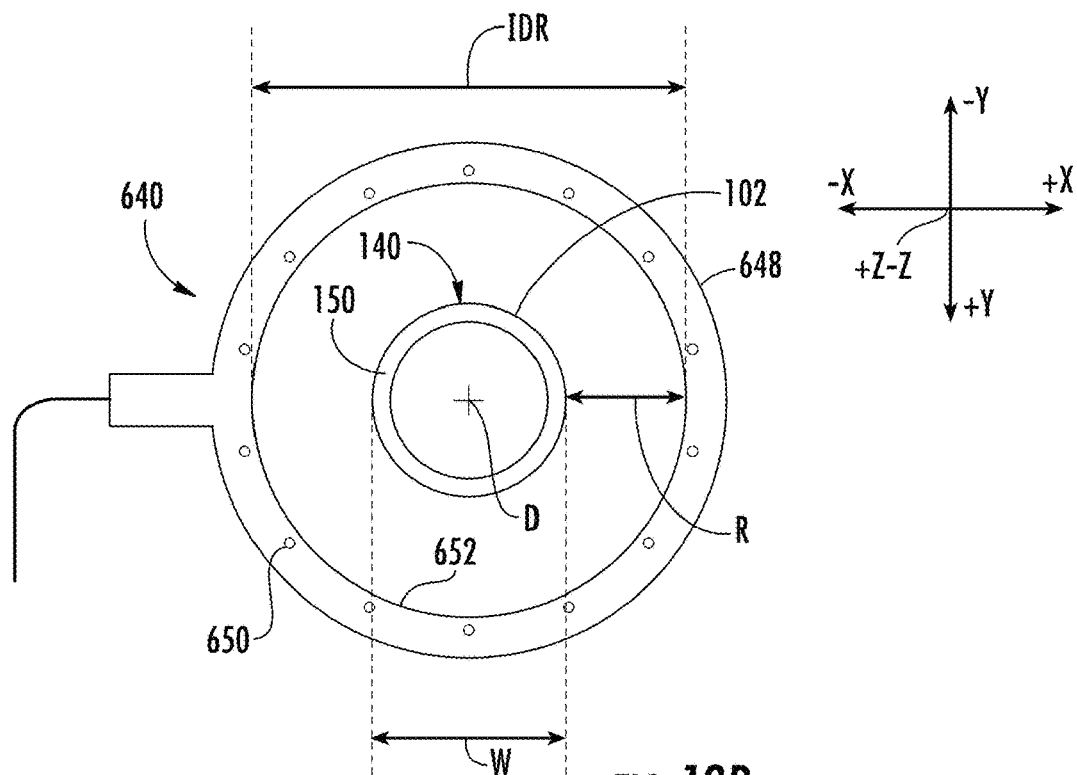
FIG. 13B schematically depicts a bottom view of the ring burner of the suction system of FIG. 13A, according to one or more embodiments shown and described herein.

Referring now to FIGS. 13A and 13B, the suction system 600 may include a ring burner 640, a combustion gas source 642, and a control valve 646. The ring burner 640 may be configured to produce a downward (i.e., in the −Z direction of the coordinate axis of FIG. 31A) conical flame around the proximal end 150 of the glass tube 102. The downward-oriented conical flame may produce a downdraft that produces a negative pressure at the proximal end 150 of the glass tube 102. In some embodiments, the negative pressure produced by the ring burner 640 may be sufficient to overcome the chimney effect in the internal volume of the glass tube 102 to produce a flow of gases and/or vapors downward through the glass tube 102 and out of the proximal end 150 of the glass tube 102. Alternatively or additionally, in other embodiments, the negative pressure produced by the ring burner 640 may be sufficient to pierce the meniscus 350 formed at the proximal end 150 of the glass tube 102 in the separating station 206.

Figure 13C:
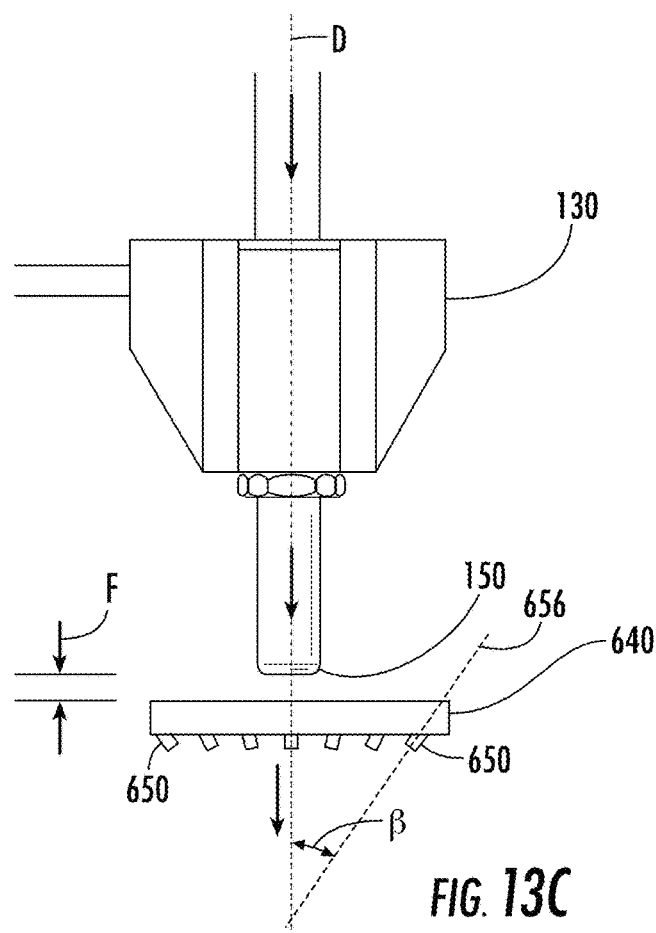
FIG. 13C schematically depicts a side view of the ring burner of the suction system of FIG. 13A, according to one or more embodiments shown and described herein.

FIG. 13B illustrates a bottom view of an exemplary embodiment of the ring burner 640 taken from the perspective of reference line 13B in FIG. 13A. Referring to FIG. 13B, the ring burner 640 may include a ring or U-shaped burner manifold 648 having a plurality of jets 650 defined in an inner radial wall 652 of the burner manifold 648. In some embodiments, the jets 650 may comprise openings in the inner radial wall 652. Alternatively, in other embodiments, the jets 650 may further include nozzles coupled to each of the openings in the inner radial wall 652. The plurality of jets 650 may be oriented in a direction away from the proximal end 150 of the glass tube 102. For example, each of the jets 650 may be oriented slightly downward (i.e., in the −Z direction of the coordinate axis of FIG. 13). Referring to FIG. 13C, each jet 650 may have a centerline 656 that extends from the jet 650 downward and towards the axis D of the glass tube 102. The centerline 656 of the jet 650 may intersect the axis D of the glass tube 102 to form an angle β between the centerline 656 and the axis D. In some embodiments, the angle β may be greater than 0° and less than 90°, such as from 10° to 80°, from 20° to 70°, or from 30° to 60°. In some embodiments, the jets 650 of the ring burner 640 may produce a generally conical flame directed vertically downward in a direction away from the proximal end 150 of the glass tube 102.

As shown in FIG. 13B, the ring burner 640 may be positioned to be centered on the axis D of the glass tube 102 so that the ring burner 640 surrounds the proximal end 150 of the glass tube 102. The burner manifold 648 may have an inner diameter IDR that is larger than the width W of the glass tube 102 (i.e., the outer diameter of the glass tube 102) so that the inner radial wall 652 of the burner manifold 648 is radially spaced apart from the outer surface 140 of the glass tube 102 by a radial distance R, when viewed in bottom view (i.e., when viewed in the +Z direction of the coordinate axis of FIG. 13A).

Referring back to FIG. 13A, the ring burner 640 may be positioned vertically (i.e., in the +/−Z direction of the coordinate axis of FIG. 13A) below the proximal end 150 of the glass tube 102. The burner manifold 648 of the ring burner 640 may be spaced apart from the proximal end 150 of the glass tube 102 by a distance F in the vertical direction (i.e., the +/−Z direction of the coordinate axis of FIG. 13A). In some embodiments, the distance F may be sufficiently small to enable the ring burner 640 to produce a negative pressure sufficient to overcome the chimney effect in the glass tube 102 and/or to open the meniscus 350 formed over the proximal end 150 of the glass tube 102. However, the distance F between the ring burner 640 and the proximal end 150 of the glass tube 102 should not be so small that the ring burner 640 contacts the proximal end 150 of the glass tube 102, which may exhibit dimensional variability from tube to tube, when the glass tube 102 is indexed between stations. In some embodiments, the distance F may be less than or equal to 25 mm. For example, in some embodiments, the distance F may be less than or equal to 20 mm, less than or equal to 15 mm, less than or equal to 10 mm, or even less than or equal to 5 mm. The distance F may be influenced by the inner diameter ID of the glass tube 102, the process speed, the converter setup, and/or the type of glass.

In some embodiments, the ring burner 640 may be translatable in the vertical direction (i.e., in the +/−Z direction of the coordinate axis of FIG. 13A) or in the horizontal direction (i.e., in the X-Y plane of the coordinate axis of FIG. 13A) relative to the proximal end 150 of the glass tube 102. For example, in some embodiments, the ring burner 640 may be moved into and out of position in a processing station 106 relative to the glass tube 102.

The combustion gas source 642 may be fluidly coupled to the ring burner 640 by a conduit 654. The combustion gas source 642 may include one or more of fuel gas, oxygen, compressed air, oxygen-enriched air, other gas or combinations of gases. Although FIG. 13A combustion gas source 642 as a single gas source, it is understood that combustion gas source 642 may include multiple gas sources, such as the fuel gas, oxygen source, and combustion air source (e.g., see the fuel gas supply 304, oxygen supply 306, and combustion air supply 308 described in relation to burner 302 in FIG. 3A). Referring to FIG. 13A, the control valve 646 may be positioned between the gas source 642 and the ring burner 640 to control operation of the ring burner 640. The control valve 646 may include one or more of a pneumatic actuator, electric actuator, hydraulic actuator, electromagnetic actuator, or other type of actuator. In some embodiments, the control valve 646 may include a solenoid. Although FIG. 13A depicts a single control valve 646, it is understood that multiple control valves 646 may be utilized in the suction system 600 when the gas source 642 includes multiple gas sources. For example, when the gas source 642 includes a fuel gas source, an oxygen source, and a combustion air source, the suction system 600 may include multiple control valves 646, one for each of the fuel gas, oxygen, and combustion air (e.g., similar to the fuel gas control valve 310, oxygen control valve 312, and air control valve 314 described for burner 302 in FIG. 3A). Other configurations are contemplated. The position of the control valve 646 may be manipulated to transition the ring burner 640 between a standby mode and a suction mode (i.e., between a pilot flame mode and full flame mode).

The suction system 600 having the ring burner 640 may be coupled to a fixed position at a specific processing station 106, such as the separating station 206, the piercing station 212, one of the heating stations 202, one of the forming stations 204 or another processing station 106. In some embodiments, the ring burner 640 of the suction system 600 may be positioned in the piercing station 212 of the converter 100. The ring burner 640 may produce sufficient negative pressure at the proximal end 150 of the glass tube 102 to pierce the meniscus 350 of the glass tube 102 in the piercing station 212. Using the ring burner 640 to pierce the meniscus 350 of the glass tube 102 may eliminate the piercing burner 352 from the piercing station 212. Eliminating the piercing burner 352 may reduce the deposition of vaporized volatile constituents on the interior surface 146 of the glass tube 102 by reducing the chimney effect in the internal volume of the glass tube 102. When used to pierce the meniscus 350, the ring burner 640 may be operated after the meniscus 350 is pierced to continue to generate the negative pressure to produce a flow of gases and vapors downward (i.e., the −Z direction of the coordinate axis of FIG. 13A) through the internal volume of the glass tube 102 and out of the proximal end 150 of the glass tube 102.

Alternatively, in other embodiments, the piercing station 212 may include the piercing burner 352 for piercing the meniscus 350 of the glass tube 102. In operation of these embodiments, the main turret 108 indexes the glass tube 102 into the piercing station 212. When the glass tube 102 is in position within the piercing station 212, the piercing burner 352 may operate to pierce the meniscus 350 of the glass tube 102. After the meniscus 350 is pierced, the piercing burner 352 may be shut off and the ring burner 640 of the suction system 600 may be operable to produce the negative pressure at the proximal end 150 of the glass tube 102. The negative pressure may produce a flow of gases and vapors downward (i.e., towards the proximal end 150 of the glass tube 102 in the −Z direction of the coordinate axis of FIG. 13A) through the internal volume of the glass tube 102 and out of the proximal end 150 of the glass tube 102. Evacuating the gases and vapors from the internal volume of the glass tube 102 with the ring burner 640 immediately after piercing the meniscus 350 of the glass tube 102 may reduce the deposition of vaporized volatile constituents of the glass on the interior surface 146 of the glass tube 102.

Figure 14A:
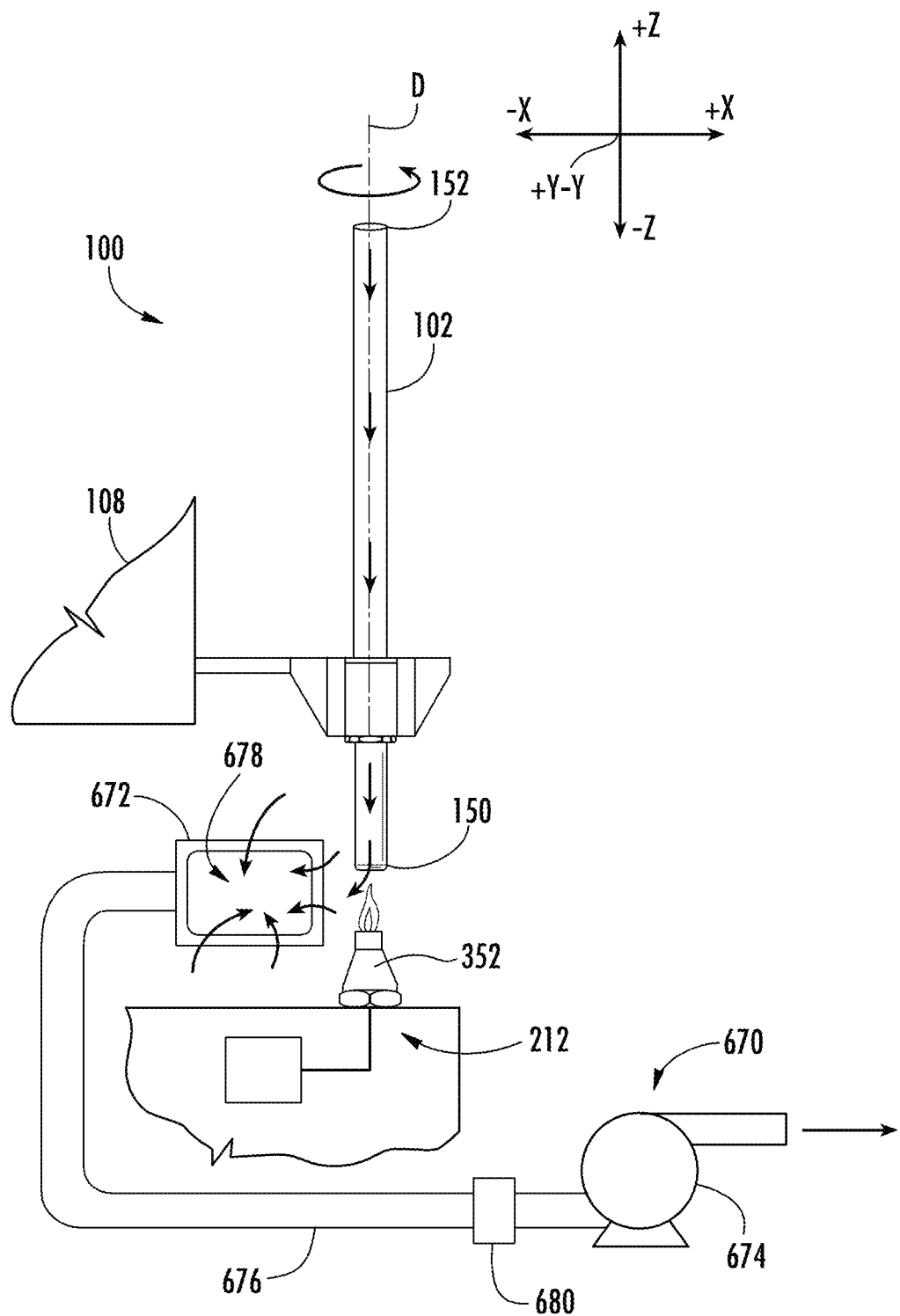
FIG. 14A schematically depicts yet another embodiment of a suction system of the converter of FIG. 1 that includes an exhaust system, according to one or more embodiments shown and described herein.
Figure 14B:
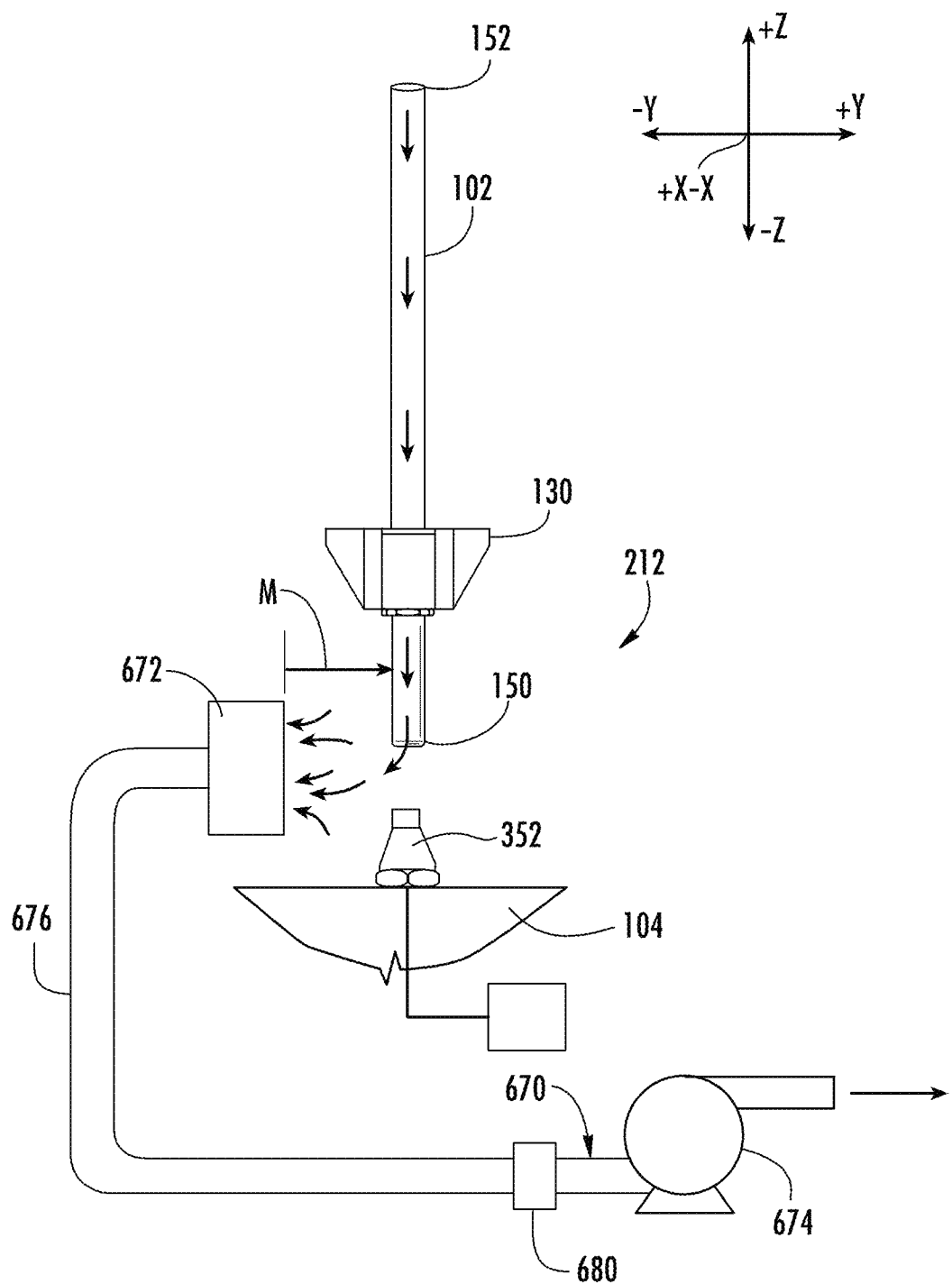
FIG. 14B schematically depicts an alternative orientation of the inlet vent of the exhaust system depicted in FIG. 14A, according to one or more embodiments shown and described herein.

Referring now to FIGS. 14A and 14B, the suction system 600 may comprise an exhaust system 670 that may include at least one inlet vent 672 fluidly coupled to an air handler 674 by a duct 676. The air handler 674 may be capable of drawing air into the inlet vent 672 and through the duct 676. Drawing air in through the inlet vent 672 may produce a localized negative pressure in the area of the proximal end 150 of the glass tube 102. This negative pressure may be sufficient to overcome the chimney effect produced by the piercing burner 352 in the piercing station 212 or one of the burners 302 in one of the heating stations 202. The negative pressure, by overcoming the chimney effect, may produce a flow of gases and vapors in the internal volume of the glass tube 102 towards the proximal end 150 of the glass tube 102 and out of the glass tube 102, thereby evacuating the gases and/or vapors from the internal volume of the glass tube 102. As previously discussed, evacuating the gases and/or vapors may reduce or prevent condensation of vaporized volatile constituents of the glass on the interior surface 146 of the glass tube 102, thereby reducing the SHR of the glass tube 102 and the glass articles 103 made therefrom.

Referring to FIGS. 14A and 14B, the inlet vent 672 may have an inlet opening 678 that may be positioned a distance M from the outer surface 140 of the glass tube 102 at the proximal end 150 of the glass tube 102. In some embodiments, the inlet vent 672 may be positioned between the processing station 106 and the main turret 108 and oriented so that the inlet opening 678 of the inlet vent 672 is spaced radially apart from the glass tube 102 in the processing station 106 by the distance M. Alternatively, in other embodiments (not shown), the inlet vent 672 may be positioned directly below the proximal end 150 of the glass tube 102 and oriented so that the inlet opening 678 faces vertically upward (i.e., in the +Z direction of the coordinate axis of FIGS. 14A and 14B). In these embodiments, the inlet vent 672 may be axially spaced apart from the proximal end 150 of the glass tube 102 by the distance M.

The distance M may be small enough to enable the exhaust system 670 to generate a negative pressure at the proximal end 150 of the glass tube 102 sufficient to overcome the chimney effect in the internal volume of the glass tube 102. However, if the distance M is too small, the inlet vent 672 may contact the proximal end 150 of the glass tube 102 as the glass tube 102 is indexed into or out of the processing station 106 due to slight dimensional variations in the glass tube 102 and/or the converter 100. Additionally, if the distance M is too small, the inlet vent 672 may interfere with the performance of the burners, such as the piercing burner 352 of the piercing station 212 or the burners 302 of one of the heating stations 202. In some embodiments, the distance M may be less than less than or equal to 25 mm. For example, in some embodiments, the distance M may be less than or equal to 20 mm, less than or equal to 15 mm, less than or equal to 10 mm or less than or equal to 5 mm. In other embodiments, the distance M may be from 2 mm to 25 mm, from 2 mm to 20 mm, from 2 mm to 15 mm, from 2 mm to 10 mm, from 2 mm to 5 mm, from 5 mm to 25 mm, from 5 mm to 20 mm, from 5 mm to 15 mm, or from 5 mm to 10 mm.

The air handler 674 may include, but is not limited to, one or more of a blower, fan, pump, vacuum pump, other vacuum device or air handling apparatus, or combinations of these. The duct 676 coupling the air handler 674 to the inlet vent 672 may include rigid duct, flexible duct, or a combination of both. Flexible duct may provide for adjustments to the position of the inlet vent 672 relative to the proximal end 150 of the glass tube 102. Because of the proximity of the inlet vent 672 and duct 676 to the processing stations 106, in some embodiments, the inlet vent 672 and the duct 676 may be constructed of heat resistant materials capable of withstanding the temperatures of heated gases and vapors generated in the vicinity of the glass tube 102 in the processing stations 106. Examples of heat resistant materials may include metals, ceramics, refractory materials, heat resistant plastics, other heat resistant materials, or combinations of these.

In some embodiments, the exhaust system 670 may optionally include a damper 680 positioned in the duct 676, between the duct 676 and the air handler 674, or between the duct 676 and the inlet vent 672. The damper 680 may be adjustable to control airflow through the exhaust system 670, thereby controlling the negative pressure generated by the exhaust system 670 at the proximal end 150 of the glass tube 102. The damper 680 may include one or more of a pneumatic actuator, electric actuator, hydraulic actuator, electromagnetic actuator, or other type of actuator. In some embodiments, the damper 680 may include a solenoid.

Referring to FIGS. 14A and 14B, the inlet vent 672 may be positioned at a processing station 106, such as the separating station 206, the piercing station 212, one of the heating stations 202, one of the forming stations 204, or combinations of these. In some embodiments, the suction system 600 may include a plurality of vents 672 with each of the vents 672 positioned at one of the processing stations 106. In operation, the inlet vent 672 may be positioned next to or below the proximal end 150 of the glass tube 102 as previous described. The air handler 674 may generate airflow through the duct 676 from the inlet vent 672 towards the air handler 674. Air from the vicinity of the proximal end 150 of the glass tube 102 is drawn into the inlet vent 672 by the flow of air through the duct 676, thereby producing a negative pressure in the vicinity of the proximal end 150 of the glass tube 102. The negative pressure may overcome the chimney effect and cause the gases and vapors inside the glass tube 102 to flow towards the proximal end 150 of the glass tube 102 and out of the glass tube 102.

Figure 15A:
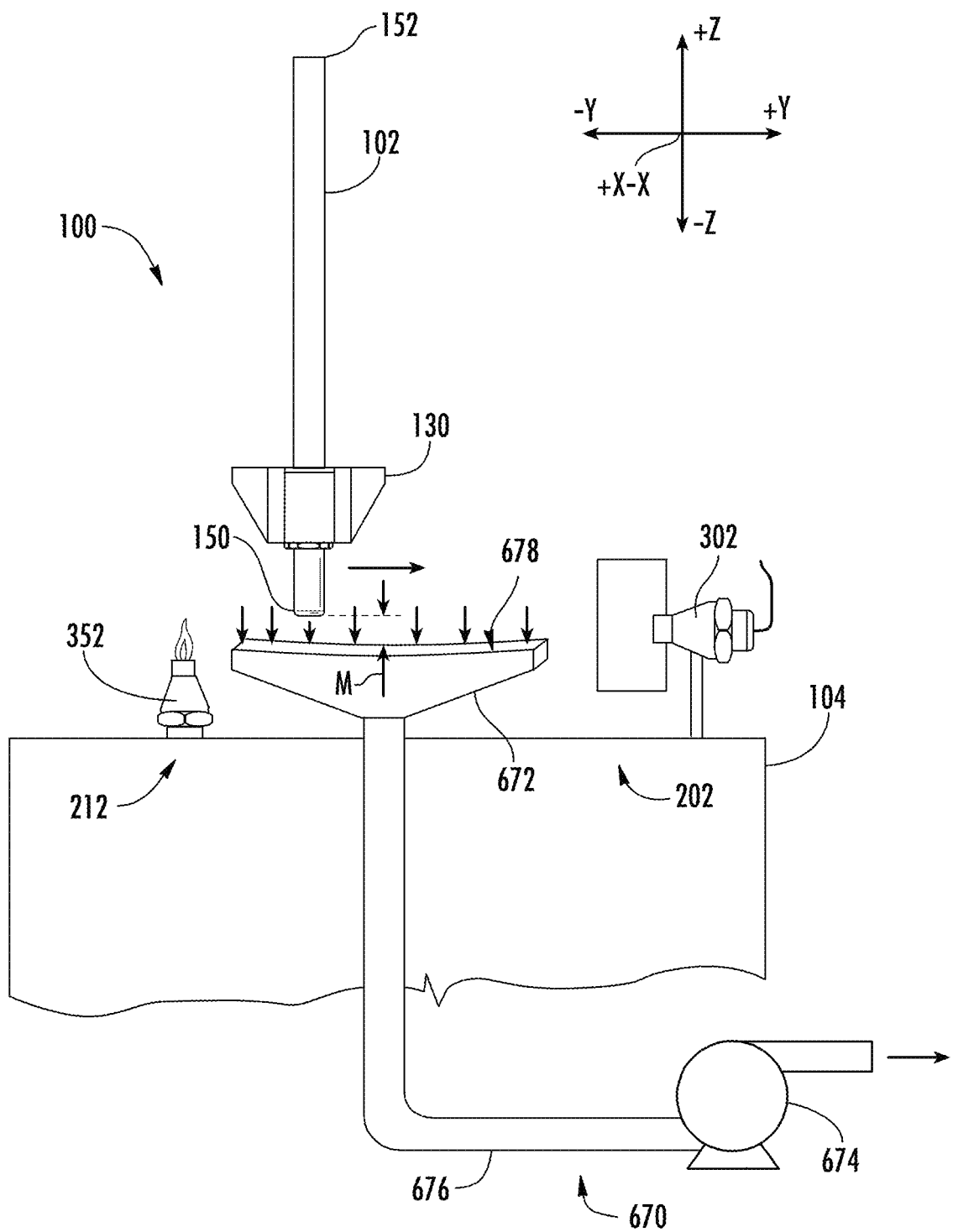
FIG. 15A schematically depicts another embodiment of a suction system that includes an exhaust system with an inlet vent positioned between two processing stations of the converter of FIG. 1, according to one or more embodiments shown and described herein.
Figure 15B:
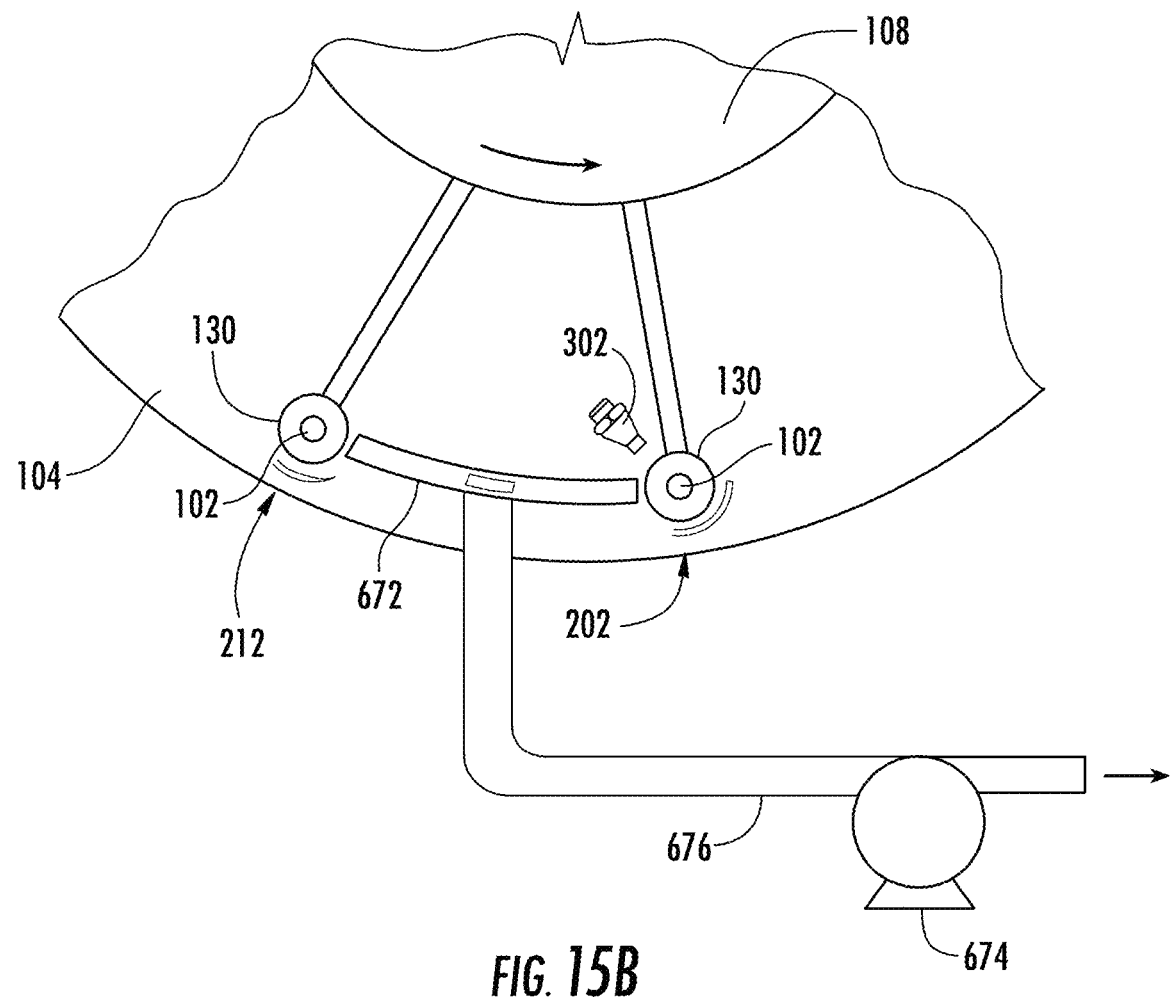
FIG. 15B schematically depicts a top view of the suction system of FIG. 15A, according to one or more embodiments shown and described herein.

Referring to FIGS. 15A and 15B, in some embodiments, the inlet vent 672 may be positioned between processing stations 106, such as between the separating station 206 and the piercing station 212 or between the piercing station 212 and a downstream processing station 106, for example. FIG. 15A depicts the inlet vent 672 positioned between the piercing station 212 and the heating station 202 downstream of the piercing station 212. The inlet vent 672 may be shaped to mirror the path taken by the glass tube 102 when the glass tube 102 is indexed between the two processing stations 106. For example, in some embodiments, the inlet vent 672 may be elongated and curved to coincide with an arcuate path of travel of the glass tube 102 as it is indexed between the processing stations 106. As shown in FIGS. 15A and 15B, the inlet vent 672 may be shaped like an elongated arcuate funnel with the opening 678 oriented vertically upward (i.e., in the +Z direction of the coordinate axis of FIG. 15A)

facing the proximal end 150 of the glass tube 102. Alternatively, in other embodiments, the converter 100 may have a linear shaped arrangement of processing stations 106, and the inlet vent 672 may be rectangular when viewed in top view to follow a linear path of the glass tube 102 between processing stations 106. The inlet vent 672 may be vertically spaced apart (i.e., in the +/−Z direction of the coordinate axis of FIG. 15A) from the proximal end 150 of the glass tube 102 by the distance M previously described.

Referring to FIG. 15B, in operation, at the end of the dwell time, the converter 100 may index the glass tube 102 from the piercing station 212 to the heating station 202 downstream of the piercing station 212. The exhaust system 670 may operate continuously to produce a continuous negative pressure in the areas above the inlet vent 672. As the glass tube 102 passes out of the piercing station 212 during the index time, the proximal end 150 of the glass tube 102 may travel over and along the inlet vent 672 of the exhaust system 670, thereby subjecting the proximal end 150 of the glass tube 102 to the negative pressure above the inlet vent 672. As previously discussed, as the glass tube 102 travels along the inlet vent 672, the negative pressure produced by the exhaust system 670 may overcome the chimney effect in the glass tube 102 and cause the gases and vapors in the glass tube 102 to flow towards the proximal end 150 of the glass tube 102 and out of the glass tube 102. As the glass tube 102 enters the separating station 206 during the last part of the rotation, the glass tube 102 may pass beyond the inlet vent 672 and out of the negative pressure region produced above the inlet vent 672.

Referring to FIGS. 5-8, a method for producing an article 103 from a glass tube 102 having an inner surface 146 may include introducing the glass tube 102 to a converter 100 having a plurality of processing stations 106 comprising at least one heating station 202 and at least one forming station 204 and heating the proximal end 150 of the glass tube 102 at the at least one heating station 202, wherein alkali is released from the glass tube 102 during the heating. The method further includes forming at least one feature of the article 103 at the proximal end 150 of the glass tube 102 in the at least one forming station 204, separating the article 103 from the proximal end 150 of the glass tube 102 at a separating station 206, and producing a flow of gas adjacent to the proximal end 150 of the glass tube 102. The flow of gas is operable to remove at least a portion of the atmosphere in an interior of the glass tube 102. In some embodiments, the contamination of the inner surface 146 by the alkali released from the glass tube 102 is at least reduced.

In some embodiments, producing the flow of gas adjacent to the proximal end 150 of the glass tube 102 may include producing a flow of gas from the distal end 152 towards the proximal end 150 of the glass tube 102. In some embodiments, separating the article 103 from the glass tube 102 may include thermally separating the article 103 from the glass tube 102 such that a meniscus 350 of glass is formed on the proximal end 150 of the glass tube 102 during thermal separation. In some embodiments, producing the flow of gas adjacent to the proximal end 150 the glass tube 102 may open the meniscus 350 of glass. In some embodiments, producing the flow of gas adjacent to the proximal end 150 of the glass tube 102 may include producing a positive flow of gas orthogonal to a longitudinal axis of the glass tube 102 adjacent to the proximal end 150 of the glass tube 102. Alternatively or additionally, in some embodiments, producing the flow of gas adjacent to the proximal end 150 of the glass tube 102 may include producing a positive flow of gas external to the glass tube 102 and at a non-zero angle with the longitudinal axis of the glass tube 102.

In some embodiments, producing the flow of gas adjacent to the proximal end 150 of the glass tube 102 may include introducing a gas pulse into the distal end 152 of the glass tube 102. In some of these embodiments, separating the article 103 from the glass tube 102 may include thermally separating the article 103 from the glass tube 102 and forming a meniscus 350 of glass across the proximal end 150 of the glass tube 102. The gas pulse may be sufficient to open the meniscus 350 of the glass tube 102. In some embodiments, the gas pulse may have a duration less than a sum of a dwell time or and an index time of the converter 100. In some embodiments, the method may further include adjusting a flow rate or volume of the gas pulse in response to changes in a length of the glass tube 102.

In some embodiments, producing the flow of gas adjacent to the proximal end 150 of the glass tube 102 may include producing a negative pressure at the proximal end 150 of the glass tube 102. Producing the negative pressure at the proximal end 150 of the glass tube 102 may include producing a negative pressure pulse adjacent to the proximal end 150 of the glass tube 102. In some embodiments, the negative pressure pulse may be sufficient to open the meniscus 350 formed at the proximal end 150 of the glass tube 102 during thermal separation. In some embodiments, producing the flow of gas adjacent to the proximal end 150 of the glass tube 102 may include producing the flow of gas radially across a surface of a meniscus 350 of glass formed on the glass tube during thermally separating the article 103 from the glass tube 102, wherein the flow of gas produces a negative pressure sufficient to open the meniscus 350. In some embodiments, the flow of gas adjacent to the proximal end 150 of the glass tube 102 may be produced when the glass tube 102 is positioned in at least one of the plurality of processing stations 106. Alternatively, in other embodiments, the method may further include indexing the glass tube 102 between two of the plurality of processing stations 106 and the flow of gas adjacent to the proximal end 150 of the glass tube 102 may be produced while indexing the glass tube 102 between the two of the plurality of processing stations 106.

Referring now to FIGS. 16A-20, embodiments of a gas flow system 900 and methods for reducing and/or preventing the formation of deposits on the interior surface 146 of the glass tube 102 using the gas flow system 900 during the conversion process are disclosed. These systems and methods may reduce and/or prevent the formation of deposits of volatile constituents of the glass on the interior surface 146 of the glass tube 102 by introducing a flow of gas or gas pulse (i.e., a flow of gas for a limited duration) through the glass tube 102 to open the meniscus 350 of glass formed at the proximal end 150 of the glass tube 102 in the separating station 206 or in the piercing station 212. The gas flow or gas pulse delivered by the gas flow system 900 may be sufficient to open the meniscus 350 instead of using the piercing burner 352. The gas pulse introduced by the gas flow system 900 may pass through the glass tube 102 from the distal end 152 to the proximal end 150 of the glass tube 102 (i.e., the −Z direction of the coordinate axis of FIG. 16A). Thus, the gas flow system 900 may allow for elimination of the piercing burner 352 and/or elimination of the piercing station 212 of the converter 100. Eliminating the piercing burner 352 from the converter 100 may reduce the chimney effect which may cause deposition of volatile constituents of the glass on the interior surface 146 of the glass tube 102. Additionally, removing the piercing burner 352 may allow the piercing station 212 to be converted to another type of processing station 106, such as a heating station 202 for example.

Figure 16A:
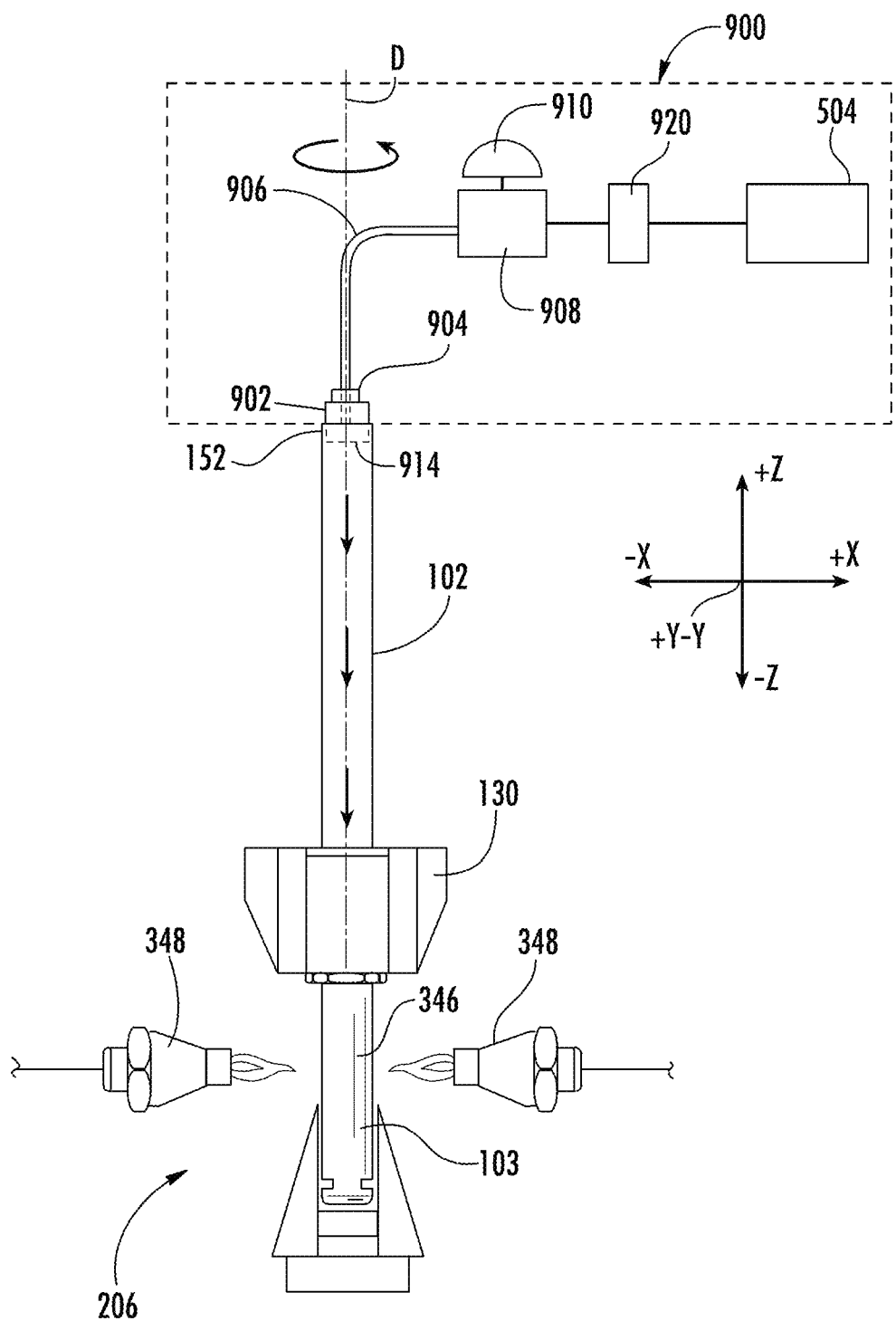
FIG. 16A schematically depicts another embodiment of a gas flow system of the converter of FIG. 1, according to one or more embodiments shown and described herein.
Figure 16B:
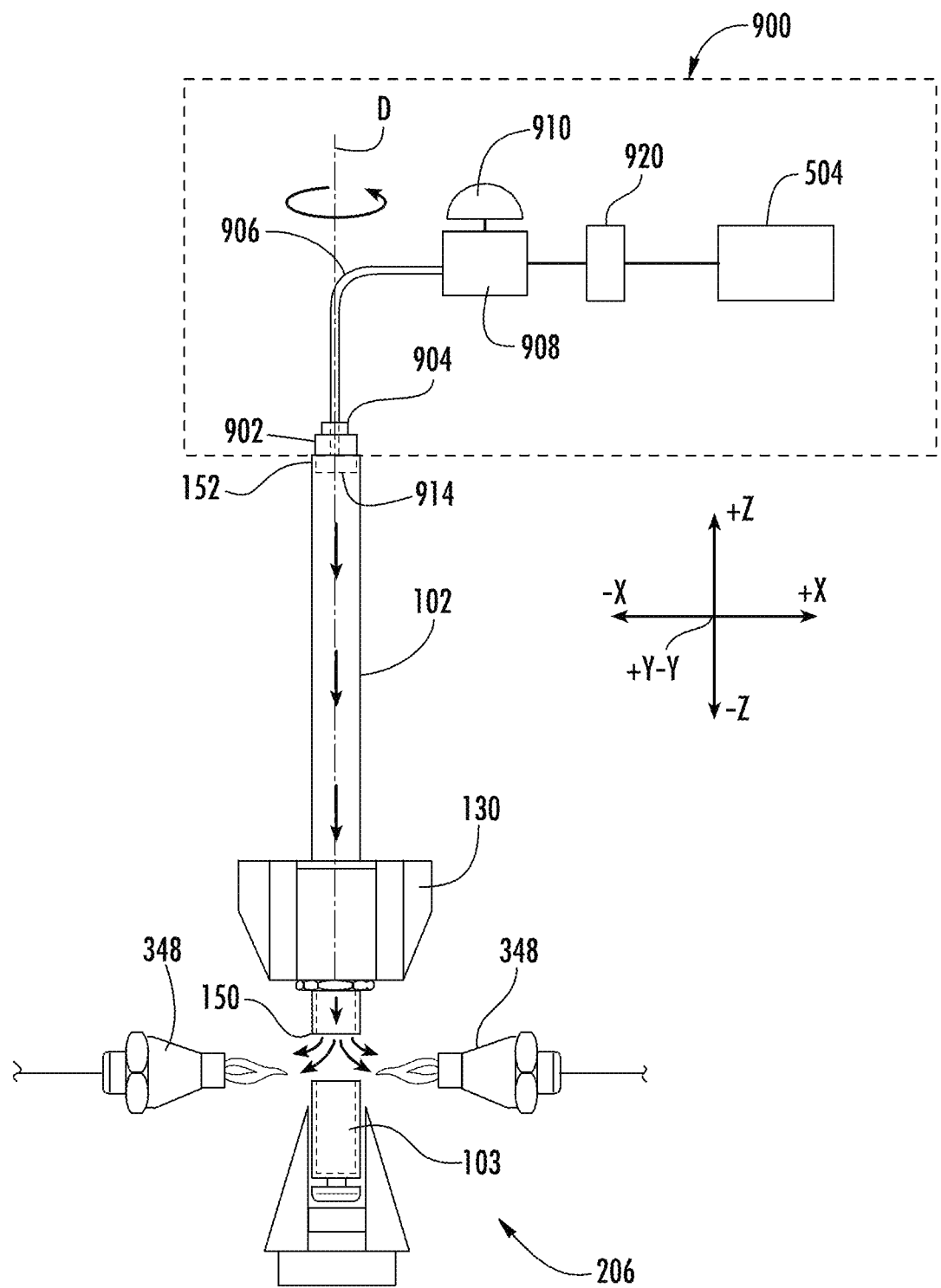
FIG. 16B schematically depicts further operation of the gas flow system of FIG. 16A, according to one or more embodiments shown and described herein.

Referring to FIGS. 16A-16B, the converter 100 may include a gas flow system 900 operable to deliver a flow of gas or a gas pulse into the distal end 152 of the glass tube 102, thereby producing a flow of gas through the glass tube 102 from the distal end 152 to the proximal end 150. In some embodiments, the gas flow system 900 may be operable to introduce a gas pulse through the glass tube 102 immediately following separation of the glass article 103 from the glass tube 102 in the separating station 206. In some embodiments, the gas flow or gas pulse through the glass tube 102 may be sufficient to open the meniscus 350 formed at the proximal end 150 of the glass tube 102 following separation of the glass article 103 from the glass tube 102 at the separating station 206. In still other embodiments, the gas flow system 900 may be operable to deliver a gas pulse through the glass tube 102 at other processing stations 106, such as heating stations 202 or forming stations 204 for example, to counteract the chimney effect in the glass tube 102 and reduce or prevent deposition of volatile constituents of the glass onto the interior surface 146 of the glass tube 102.

Figure 17:
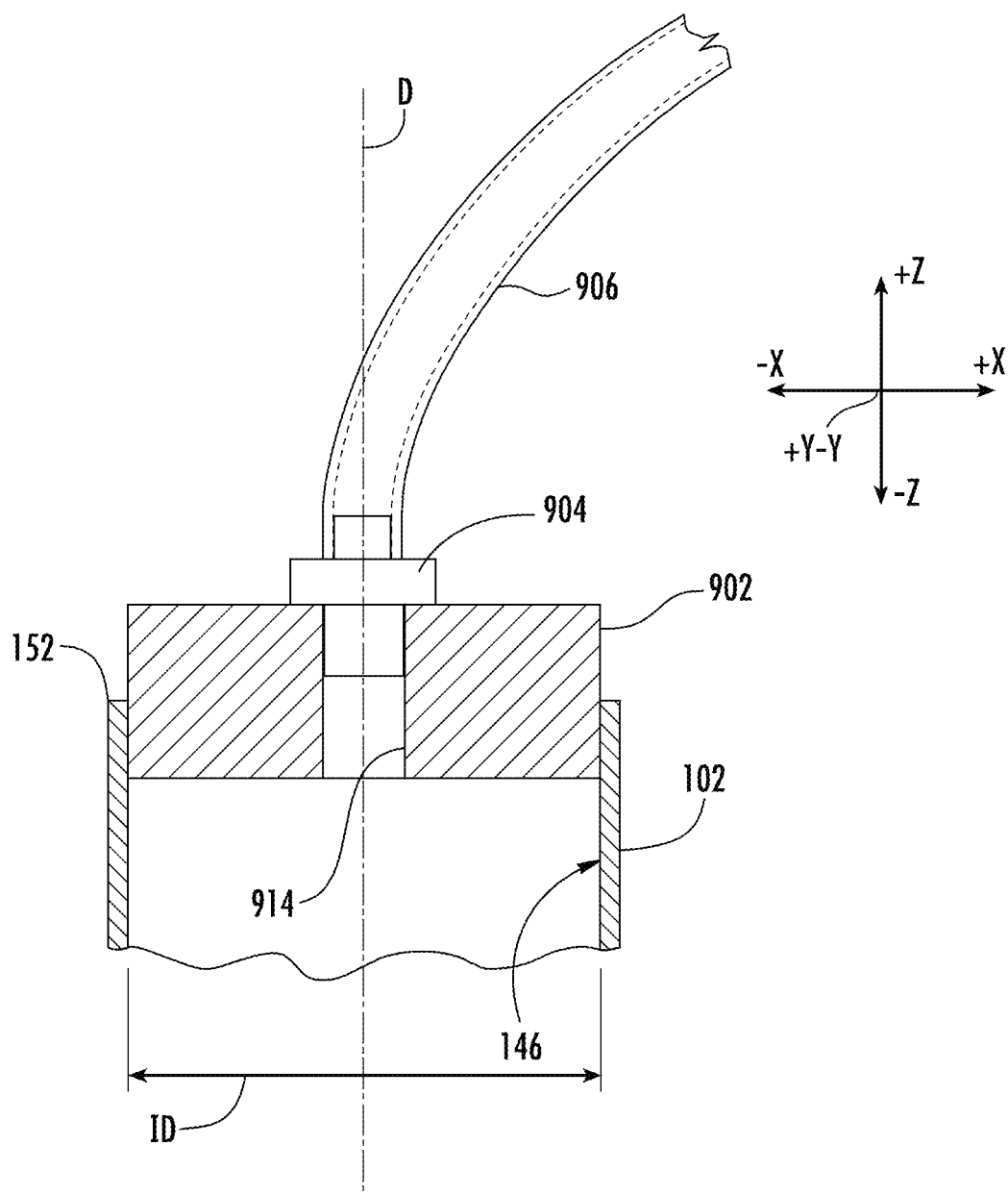
FIG. 17 schematically depicts a glass tube connector of the gas flow system of FIG. 16A, according to one or more embodiments shown and described herein.

Referring to FIGS. 16A and 17, for each of the holder 130 positions of the converter 100, the gas flow system 900 may include a glass tube connector 902 engageable with the distal end 152 of the glass tube 102. In some embodiments, the glass tube connector 902 may be a stopper made from a resilient material, such as rubber for example. In some embodiments, the glass tube connector 902 may include one or more of polytetrafluoroethylene (Teflon™ marketed by Chemours), silicone, Viton, nitrile rubber (Buna N), other fluoropolymer, or combinations of these. In some embodiments, the glass tube connector 902 may be a resilient material approved for contact with pharmaceutical compositions. In some embodiments, the glass tube connector 902 may be engageable with the distal end 152 of the glass tube 102 through an interference fit with the interior surface 146 of the glass tube 102. At least a portion of the glass tube connector 902 may be disposed inside the glass tube 102 with a portion of an outer surface of the glass tube connector 902 contacting the interior surface 146 of the glass tube 102 to produce a gas-tight seal between the glass tube connector 902 and the interior surface 146 of the glass tube 102. Alternatively, the glass tube connector 902 may be a cap engageable with the outer surface of the distal end 152 of the glass tube 102, such as by an interference fit between an inner surface of the cap and the outer surface 140 of the glass tube 102.

Referring to FIG. 17, the glass tube connector 902 may include a central bore 914 extending longitudinally (i.e., in the +/−Z direction of the coordinate axis of FIG. 17) through the glass tube connector 902. A swivel connector 904 may be coupled to the glass tube connector 902 and coupled to a flexible conduit 906. In some embodiments, a portion of the swivel connector 904 may be disposed within the central bore 914 of the glass tube connector 902. The swivel connector 904 may swivel or rotate to allow the glass tube connector 902 to rotate relative to the flexible conduit 906, which may allow the glass tube connector 902 to rotate with the glass tube 102 when the glass tube 102 is rotated by the holder 130 in one or more processing stations 106.

Referring to FIG. 16A, each flexible conduit 906 may be coupled to a valve 908 to fluidly couple the valve 908 to the glass tube connector 902 and the distal end 152 of the glass tube 102. The valve 908 may be any type of valve suitable for controlling the flow of gases. Examples of valves suitable for valve 908 may include, but are not limited to ball valves, gate valves, globe valves, butterfly valves, or other types of valves. Each of the valves 908 may also be operatively coupled to a valve actuator 910 configured to open and close the valve 908 to control the flow of gas to the glass tube connector 902. The valve actuator 910 may be a pneumatic actuator, an electronic actuator, a hydraulic actuator, an electromechanical actuator, an electromagnetic actuator, or other type of actuator. In some embodiments, the valve actuator 910 may be a solenoid.

Figure 18:
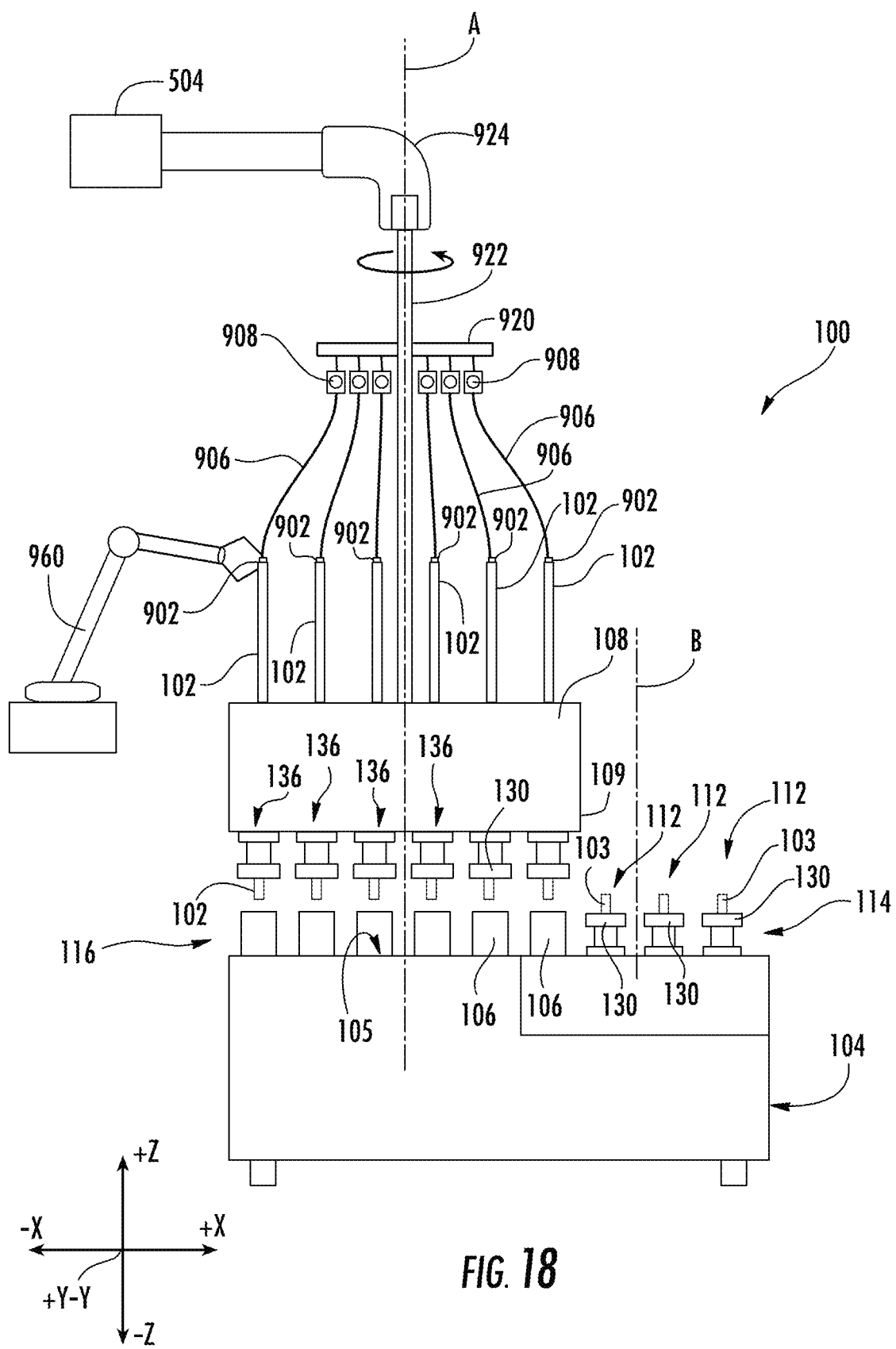
FIG. 18 schematically depicts another embodiment of the gas flow system of FIG. 16A, according to one or more embodiments shown and described herein.
Figure 19:
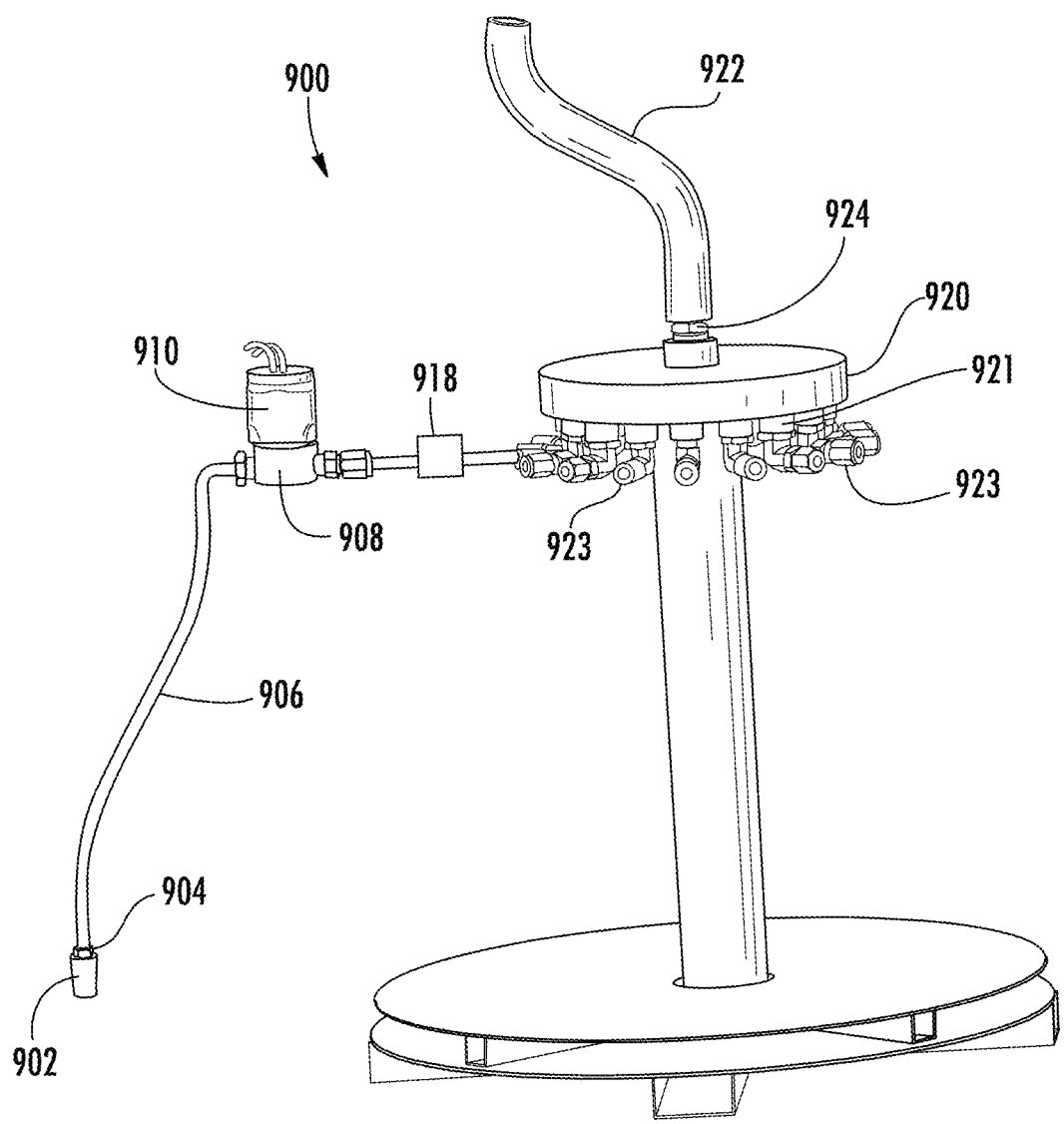
FIG. 19 schematically depicts an embodiment of a manifold of the gas flow system of FIG. 18, according to one or more embodiments shown and described herein.

Referring to FIGS. 18 and 19, the valve 908 for each of the glass tube connectors 902 may be fluidly coupled to a manifold 920. In some embodiments, the manifold 920 may be mechanically coupled to the main turret 108 for rotation with the main turret 108 during operation of the converter 100. The manifold 920 may be fluidly coupled to the gas source 504 through a gas supply conduit 922 and a rotating union 924. Although the manifold 920 is depicted in FIGS. 18 and 19 as having a circular shape, the manifold 920 may have other shapes. For example, in some embodiments, the converter 100 may have a linear arrangement of processing stations 106, and the manifold 920 may have a linear arrangement corresponding to the linear path of the glass tube 102 as it is indexed through the processing stations 106.

Referring to FIG. 19, in some embodiments, the gas flow system 900 may include a flow meter 918. The flow meter 918 may be a mass flow meter, a mass flow controller, or a volume flow meter. In some embodiments, the flow meter 918 may be disposed between the valve 908 and the manifold 920. Alternatively, in other embodiments, the flow meter 918 may be positioned downstream of the valve 908, such as between the valve 908 and the glass tube connector 902. In still other embodiments, the flow meter 918 may be positioned upstream of the manifold 920, such as between the manifold 920 and the gas source 504.

Referring back to FIGS. 18 and 19, the manifold 920 may include a plurality of distribution ports 921. Each distribution port 921 may include a connector 923 which may be removably coupleable to one of the plurality of valves 908. Alternatively, in other embodiments, each of the valves 908 may be positioned between the connector 923 and the distribution port 921 at one of the distribution ports 921. In these embodiments, each connector 923 may be coupled directly to the one of the flexible conduits 906.

During operation of the gas flow system 900, gas may flow from the gas source 504 and into the manifold 920. The manifold 920 may distribute the gas flow to each of the distribution ports 921. Upon actuation of the valve actuator 910, the gas flows through the valve 908, the flexible conduit 906, and the glass tube connector 902, to deliver a gas pulse into the distal end 152 of the glass tube 102. The gas from the gas source 504 may include compressed air, nitrogen, inert gas, reactant gas, other gas or combination of gases. In some embodiments, the gas of the gas source may be an inert gas, such as argon, which may further reduce the probability of forming deposits on the interior surface 146 of the glass tube 102.

In some embodiments, the gas pulse may have a pulse duration that may be less than the time required for the main turret 108 to cycle once through all of the processing stations 106. Alternatively, in other embodiments, the pulse duration may be less than the dwell time of the converter 100. In still other embodiments, the pulse duration may be less than the index time of the converter 100. In still other embodiments, the pulse duration may be less than the sum of the dwell time and the index time of the converter. In some embodiments, the pulse duration may be less than a sum of the index time and the dwell time of the converter 100. The pulse duration may be influenced by the inner diameter ID (FIG. 4) of the glass tube 102, the process speed, the converter setup, and/or the glass type.

When a new glass tube 102 is loaded into one of the holders 130 of the converter 100, the glass tube connector 902 from that holder position may be removed from the distal end 152 of the consumed glass tube 102, the new glass tube 102 may be loaded into the holder 130, and the glass tube connector 902 may be inserted into the distal end 152 of the new glass tube 102. In some embodiments, the glass tube connector 902 may be removed from one glass tube and inserted into a new glass tube manually by an operator of the converter 100. In other embodiments, an insertion device 960 may be used to remove the glass tube connector 902 and insert the glass tube connector 902 in the new glass tube. The insertion device 960 may be a pneumatic, hydraulic, electromechanical, or electromagnetic device capable of removing and inserting the glass tube connector 902 into the distal end 152 of the glass tube 102. For example, the insertion device 960 may be a robotic arm as illustrated in FIG. 18. Other types of insertion devices 960 are contemplated.

Referring to FIGS. 16A-16B, the gas flow system 900 may be utilized to introduce the gas pulse into the glass tube 102 immediately after separation of the article 103 from the glass tube 102 in the separating station 206 to open the meniscus 350 immediately following separation. Referring to FIG. 16A, in the separating station 206, the separation burners 348 heat the separation region 346 of the glass tube 102 to separate the article 103 from the glass tube 102. Referring to FIG. 16B, immediately after the article 103 is separated from the glass tube 102, the valve actuator 910 corresponding to the separating station 206 may activate to partially or fully open the valve 908 to allow the gas to flow from the gas source 504 through the valve 908 and into the distal end 152 of the glass tube 102 at the separating station 206. The gas flow through the glass tube 102 may be sufficient to open the meniscus 350 formed over the proximal end 150 of the glass tube 102. In some embodiments, the valve actuator 910 may maintain the valve 908 in the open or partially open position for a period of time following opening of the meniscus 350 to further evacuate vaporized volatile constituents from the internal volume of the glass tube 102. At the expiration of the period of time, the valve actuator 910 may operate to close the valve 908 to end the gas pulse into the distal end 152 of the glass tube 102.

In some embodiments, the gas flow system 900 may be configured to deliver a gas pulse to the distal end 152 of the glass tube 102 at one or more processing stations 106 other than the separating station 206. For example, the gas flow system 900 may be configured to deliver a gas pulse to the distal end 152 of the glass tube 102 at one or more heating stations 202, forming stations 204, cooling stations 210, other processing stations 106, or combinations of processing stations.

In some embodiments, the gas pulse introduced to the distal end 152 of the glass tube 102 may have a volumetric flow rate of gas during the gas pulse sufficient to open the meniscus 350 of the glass tube 102 after separation of the glass article 103 from the glass tube 102. In still in other embodiments, the volumetric flow rate of gas during the gas pulse may be sufficient to evacuate gases and vapors from the internal volume of the glass tube 102. However, if the volumetric flow rate of gas during the gas pulse is too high, undesired cooling of the glass tube 102 may result. The volume flow rate of the gas during the gas pulse may be influenced by the inner diameter ID (FIG. 4) of the glass tube 102, the process speed, the converter setup, and/or the glass type.

As each glass article 103 is separated from the glass tube 102 through multiple cycles of the glass tube 102 through the processing stations 106 of the converter 100, the length of the glass tube 102 decreases, which reduces the internal volume of the glass tube 102. As the internal volume of the glass tube 102 decreases, the volumetric flow rate or the mass flow rate of gas sufficient to prevent formation of the meniscus 350, to pierce the meniscus 350 after separation, or to evacuate vapors from the internal volume of the glass tube 102 may also decrease. Similarly, as the internal volume of the glass tube 102 decreases, the pressure of the gas pulse sufficient to open the meniscus 350 after separation or to evacuate vapors from the internal volume of the glass tube 102 may also decrease. In some embodiments, operation of the converter 100 with the gas flow system 900 may include modifying at least one of the duration of the gas pulse, the pressure of the gas pulse, or the volume flow rate (or mass flow rate) of the gas pulse in response to a change in a length of the glass tube 102. In some embodiments, the volumetric flow rate and/or pressure of gas during the gas pulse may be decreased with each decrease in the length of the glass tube 102. The volume of the gas pulse introduced to the glass tube 102 may be modified by changing the duration of time that the valve 908 is open. The volume or mass flow rate of the gas pulse may also be changed by by utilizing a mass flow controller or mass flow meter. Alternatively, in other embodiments, the volumetric flow rate and/or pressure of the gas during the gas pulse may be set to a volumetric flow rate sufficient to open the meniscus 350 after separation or to evacuate vapors from the internal volume of the glass tube 102 for a new glass tube 102 having a maximum length prior to separation of a glass article 103 therefrom.

By opening the meniscus 350 in the separating station 206 immediately following thermal separation of the article 103 from the glass tube 102, the gas flow system 900 may eliminate the piercing burner 352 from the piercing station 212. Eliminating the piercing burner 352 from the piercing station 212 may reduce the amount of vaporized volatile constituents deposited on the interior surface 146 of the glass tube 102, which may reduce the SHR of the glass article 103 made from the glass tube 102. The gas flow system 900 may also be utilized to introduce a gas pulse into other processing stations 106, such as heating station 202 and forming station 204, to evacuate the internal volume of the glass tube 102, which may further reduce or prevent deposits of vaporized volatile constituents on the interior surface 146 of the glass tube 102. Further, eliminating the piercing burner 352 from the piercing station 212 may allow the piercing station 212 to be reconfigured into another type of processing station 106, such as a heating station 202 or a forming station 204. For example, the piercing station 212 may be reconfigured into a forming station 204 to further build-up the thickness of the proximal end 150 of the glass tube 102 prior to downstream forming stations 204. In some embodiments, the piercing station 212 may be removed altogether to reduce the number of processing stations 106 on the converter 100, thereby increasing the efficiency of the converter 100 by increasing the throughput. Additionally, the gas pulse may provide cooling to the interior surface 140 of the glass tube 102 after separation or other heating or forming operation. For example, the gas pulse may be continued after separation of the glass article 103 from the glass tube 102 for a duration of time to provide cooling to the interior surface 140 of the glass tube 102, thereby decreasing the amount of time that the glass tube 102 is exposed to temperatures sufficient to vaporize volatile constituents of the glass.

Figure 20:
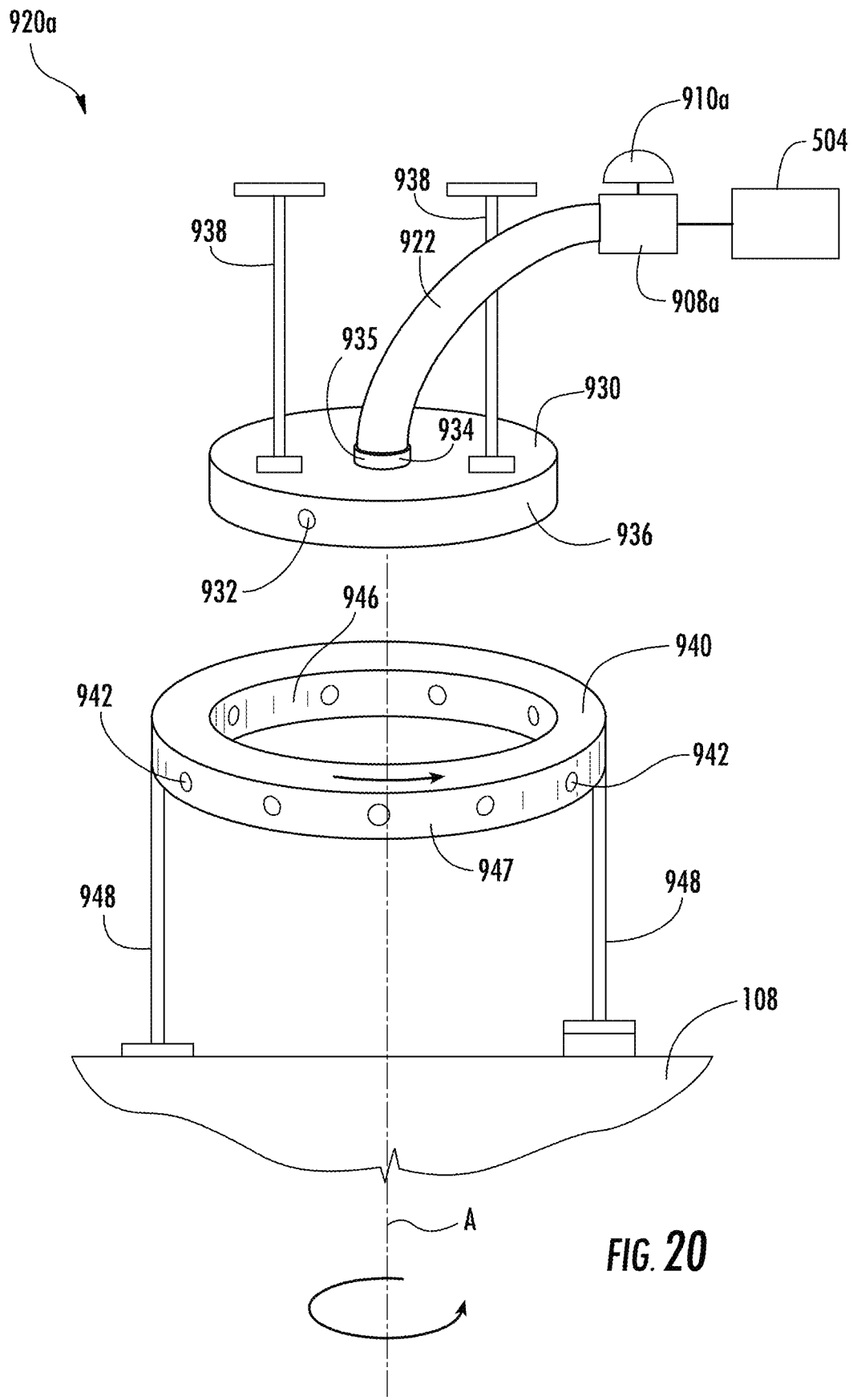
FIG. 20 schematically depicts another embodiment of a manifold of the gas flow system of FIG. 18, according to one or more embodiments shown and described herein.

As previously described in relation to FIGS. 18 and 19, the gas flow system 900 may include the valve 908 and the valve actuator 910 for each of the glass tube connectors 902 corresponding to each of the holders 130 of the converter 100. Alternatively, in some embodiments, the gas flow system 900 may include a single valve 908a and a single actuator 910a operatively coupled to the valve, as illustrated in FIG. 20. Referring to FIG. 20, the gas flow system 900 may include a manifold 920a that has an inner ring 930 and an outer ring 940 positioned to surround the inner ring 930 and rotatable relative to the inner ring 930. The manifold 920a of the gas flow system 900 is schematically depicted in FIG. 20 in an exploded view to better illustrate the inner ring 930 and the outer ring 940. When installed, the inner ring 930 may be positioned within the outer ring 940 so that an outer surface 936 of the inner ring 930 may be in slidable contact with an inner surface 946 of the outer ring 940. The inner ring 930 may have gas supply channel 932 extending from a central region 934 of the inner ring 930 to the outer surface 936 of the inner ring 930. The gas supply channel 932 may be fluidly coupled to an inlet coupling 935. The inlet coupling 935 may be in fluid communication with the single valve 908a through the gas supply conduit 922. The inner ring 930 may be rigidly coupled to one or more fixed supports 938 so that the inner ring 930 may remain stationary during operation of the converter 100 and does not rotate with the main turret 108. The fixed support 938 may be coupled to a stationary object such as a wall, ceiling, floor, or base of the converter, for example.

In some embodiments, the inner ring 930 may have a single gas supply channel 932. The inner ring 930 may be oriented so that the single gas supply channel 932 may be directed toward a specific processing station 106. In some embodiments, the single gas supply channel 932 may be positioned to correspond to the separating station 206 of the converter 100. In other embodiments, the single gas supply channel 932 may be positioned to correspond to the piercing station 212. Alternatively, in some embodiments, the inner ring 930 may have a plurality of gas supply channels 932 so that the gas may be introduced simultaneously to a plurality of processing stations 106, such as heating stations 202, forming stations 204, separating stations 206, piercing stations 212, or combinations of processing stations 106.

Referring to FIG. 20, the outer ring 940 may be coupled to the main turret 108 by one or more outer ring supports 948 so that the outer ring 940 may rotate with the main turret 108 and rotate relative to the inner ring 930. The outer ring 940 may have a plurality of gas delivery channels 942 extending through the outer ring 940 from an inner surface 946 to an outer surface 947 of the outer ring 940. The outer ring 940 may include a plurality of connectors 923 coupled to the outer ring 940. Each of the connectors 923 may be in fluid communication with one of the gas delivery channels 942. Each of the connectors 923 may be fluidly coupled to one of the glass tube connectors 902 (FIG. 19) through one of the flexible conduits 906 (FIG. 19).

Referring to FIG. 20, in operation, indexing of the main turret 108 may cause the outer ring 940 to rotate. At the end of the index time, as the main turret 108 position each of the glass tubes 102 in the next processing station 106, the gas supply channel 932 of the inner ring 930 may align with one of the gas delivery channels 942 of the outer ring 940, thereby establishing fluid communication between the single valve 908a and the gas delivery channels 942. The valve actuator 910 may then actuate to open the valve 908 to allow gas from the gas source 504 to flow through the gas supply conduit 922, the gas supply channel 932, and the gas delivery channel 942, and into the distribution port 921 corresponding to the processing station 106 to which it is desired to deliver the gas pulse to the glass tube 102. The gas pulse passes through the connector 923 and the flexible conduit 906 to the distal end 152 of the glass tube 102 positioned in the processing station 106. At the end of the dwell time, the main turret 108 may rotate to index the glass tubes 102 to the next processing station 106. As the outer ring 940 rotates with the main turret 108, the gas delivery channel 942 rotates out of alignment with the gas supply channel 932 and the subsequent gas delivery channel 942 rotates into alignment with the gas supply channel 932.

Referring to FIG. 16A, in some embodiments, the gas flow system 900 may include only a single glass tube connector 902 positioned at a specific processing station 106, such as the separating station 206. The flexible conduit 906 may fluidly couple the single glass tube connector 902 to the valve 908 for controlling the flow of the gas from the gas source 504 to the single glass tube connector 902. At the separating station 206, the glass tube connector 902 may be inserted into the distal end 152 of the glass tube 102 indexed into the separating station 206. Once the glass tube connector 902 is inserted, separation of the glass article 103 from the glass tube 102 may commence. After separation is complete and the meniscus 350 opened, the glass tube connector 902 may be removed from the glass tube 102 and the glass tube 102 may be indexed to the next processing station 106. In some embodiments, the glass tube connector 902 may be removed from the glass tube 102 manually by an operator of the converter 100. In other embodiments, an insertion device 960 (FIG. 18) may be used to remove the glass tube connector 902 and insert the glass tube connector 902 in the new glass tube 102. The insertion device may be a pneumatic, hydraulic, electromechanical, or electromagnetic device capable of removing and inserting the glass tube connector 902 into the distal end 152 of the glass tube 102. For example, a robotic arm may be used to remove the glass tube connector 902 and insert it into the glass tube 102.

Referring to FIGS. 16A-20, a method for producing an article 103 from a glass tube 102 having an inner surface may include introducing the glass tube 102 to a converter 100 having a plurality of processing stations 106 comprising at least one heating station 202 and at least one forming station 204 and heating the proximal end 150 of the glass tube 102 at the at least one heating station 202. Alkali is released from the glass tube 102 during the heating. The method may further include forming at least one feature of the article 103 at the proximal end 150 of the glass tube 102 in the at least one forming station 204, separating the article 103 from the proximal end 150 of the glass tube 102 at a separating station 206, and introducing a flow of gas to the distal end 152 of the glass tube 102 by a gas flow system 900. The gas flow system 900 may include a manifold 920 fluidly couplable to the gas source 504 and a plurality of glass tube connectors 902. Each glass tube connector 902 may be removably coupleable to the distal end 152 of the glass tube 102 and fluidly coupled to the manifold 920 by the conduit 906. For at least one of the glass tube connectors 902, the gas flow system 900 may be operable to pass a gas from the manifold 920, through the conduit 906, through the glass tube connector 902, and into the distal end 152 of the glass tube 102. Passing the gas into the distal end 152 of the glass tube 102 may produce a flow of gas adjacent to the proximal end 150 of the glass tube 102. The flow of gas may be operable to remove at least a portion of an atmosphere from an interior of the glass tube 102 and reduce contamination of an inner surface 146 of the glass tube 102 by alkali released from the glass tube 102.

In some embodiments, separating the article 103 from the glass tube 102 may include thermal separation that produces a meniscus 350 of glass across the proximal end 150 of the glass tube 102, and the flow of gas adjacent to the proximal end 150 of the glass tube 102 may be sufficient to open the meniscus 350. In some embodiments, introducing the flow of gas may include introducing a gas pulse to the distal end 152 of the glass tube 102. In some embodiments, the gas pulse may have a duration less than the sum of a dwell time and an index time of the converter. In some embodiments, the gas pulse may be sufficient to open the meniscus 350 formed during thermal separation of the article 103 from the glass tube 102.

In some embodiments, the method may include introducing a plurality of gas pulses to the distal end 152 of the glass tube 102. In some embodiments, the method may further include controlling at least one of a duration of the gas pulse, a pressure of the gas pulse, or a volume flow rate of the gas pulse in response to changes in a length of the glass tube 102. The flow of gas may be introduced to the distal end 152 of the glass tube 102 when the glass tube 102 is positioned in one of the plurality of processing stations 106. In some embodiments, the flow of gas may be introduced to the distal end 152 of the glass tube 102 when the glass tube 102 is positioned in the separating station 206 or the piercing station 212 of the converter 100.

EXAMPLES

The following examples illustrate the operation of the disclosed system and methods for reducing the SHR of glass articles manufactured from glass tube in a converter. The following examples illustrate use of the the disclosed systems and methods for reducing SHR of glass articles manufactured from aluminosilicate glass tubing, such as VALOR™ glass manufactured and marketed by Corning Incorporated. The aluminosilicate glass tubing may be further processed by annealing and/or ion exchanging the glass tubing after converting. For some aluminosilicate glass compositions, such as VALOR™ glass, the annealing and/or ion-exchanging processes subsequent to converting significantly reduce the SHR of the glass articles. The following examples illustrate the effects of the disclosed systems and methods only on the SHR of the glass tubing resulting from the converting process and do not include the effects of subsequent annealing and/or ion-exchange processes. Thus, the SHR data presented in the following examples reflects the SHR from the converting process and does not represent the SHR of the final glass article. The operation of the disclosed systems and methods may produce different results for different types of glasses, such as borosilicate glasses and soda-lime glasses, which are conventionally used to produce pharmaceutical packages. The volatilization behavior of borosilicate glasses and soda-lime glasses is different than the volatilization behavior of aluminosilicate glasses. The SHR interactions in annealing processes may also be different for borosilicate glasses and soda-lime glasses compared to aluminosilicate glasses. Therefore, it should be understood that the SHR results produced by the disclosed systems and methods and the process areas of the converter in which the SHR mitigation is most effective is expected to be different for borosilicate and soda-lime glass compositions compared to aluminosilicate glass compositions.

Example 1

Aluminosilicate glass tubes were converted into glass vials using a converter. The aluminosilicate glass tubes were VALOR™ glass tubes manufactured by Corning Incorporated. The converter used was a Vial Forming Machine Model RP16 with Automatic Tube Feeder manufactured by AMBEG Dr. J. Dichter GmbH, which included sixteen processing stations in the main circuit and eight secondary processing stations in the secondary circuit. Descriptions of the processing stations of the main circuit of the converter used for Example 1 are provided in Table 1 hereinbelow.

TABLE 1

Description of the processing stations of the converter of Example 1

| Station No. | Description of Operation | Type of Station |
| --- | --- | --- |
| A1 | Tube Loading and/or Cooling Station | Tube Loading/Cooling |
| A2 | Cool an Existing Tube or Preheat a Newly Loaded Length of Glass Tube | Cooling/Heating |
| A3 | Optional Separation Preheat | Heating |
| A4 | Separation Preheat | Heating |
| A5 | Separating | Separating |
| A6 | Flame Pierce of the Meniscus | Piercing |
| A7 | First Shoulder Preheat | Heating |
| A8 | Second Shoulder Preheat | Heating |
| A9 | Third Shoulder Preheat | Heating |
| A10 | Shoulder Forming | Forming |
| A11 | Flange Preheating | Heating |
| A12 | Flange Forming | Forming |
| A13 | Flange Finish Preheating | Heating |
| A14 | Flange Finishing | Forming |
| A15 | Cooling | Cooling |
| A16 | Tube Drop to Determine the Vial Length | Tube Drop |

The converter was equipped with a gas flow system according to FIG. 5. The FIG. 5 device was configurable to allow a continuous flow of gas to all the tubes on the convertor or to cycle the gas flow on or off to deliver gas flow pulses to the glass tubes. Further, the device could be connected to deliver gas to only one tube to test the efficacy of delivering gas flows at specific position(s) on the converter. It should be noted that during the time when no gas flow is delivered, the end cap is present, hence the top of tube is effectively closed off by the delivery device. In this example, the convertor was setup to produce vials approximately to ISO 2R using glass tube of 16.75 mm outside diameter, 1.1 mm wall thickness, at a converter speed 31 parts per minute (ppm).

A control set of vials (Sample 1A) was produced using the converter without the gas flow system installed to provide a baseline comparison to conventional processing approaches. Additional vials (Samples 1B, 1C, 1D, 1E, and 1G) were produced on the converter using the gas flow system to introduce a gas pulse at the distal end of the glass tube at selected processing stations. Last, a set of vials (Sample 1F) were produced on the converter with the gas flow system installed at the selected processing stations but not utilized to deliver a gas pulse to the distal end of the glass tube (that is the top of the tube was effectively capped around the process). The following Table 2 provides a cross-reference of the sample numbers and the processing stations into which the gas pulse was delivered.

TABLE 2

Cross-reference of processing stations at which the gas pulse was delivered to the glass tube in Example 1

| Sample No. | Processing Stations Into Which Gas Pulse Delivered |
|---|---|
| 1A | Baseline Open end configuration, FIG. 5 device not used |
| 1B | A13 only |
| 1C | A11 and A13 |
| 1D | A7, A8, A9, A11, and A13 |
| 1E | A5, A7, A8, A9, A11, and A13 |
| 1F | None (all capped) |
| 1G | A5 only |

Figure 22:
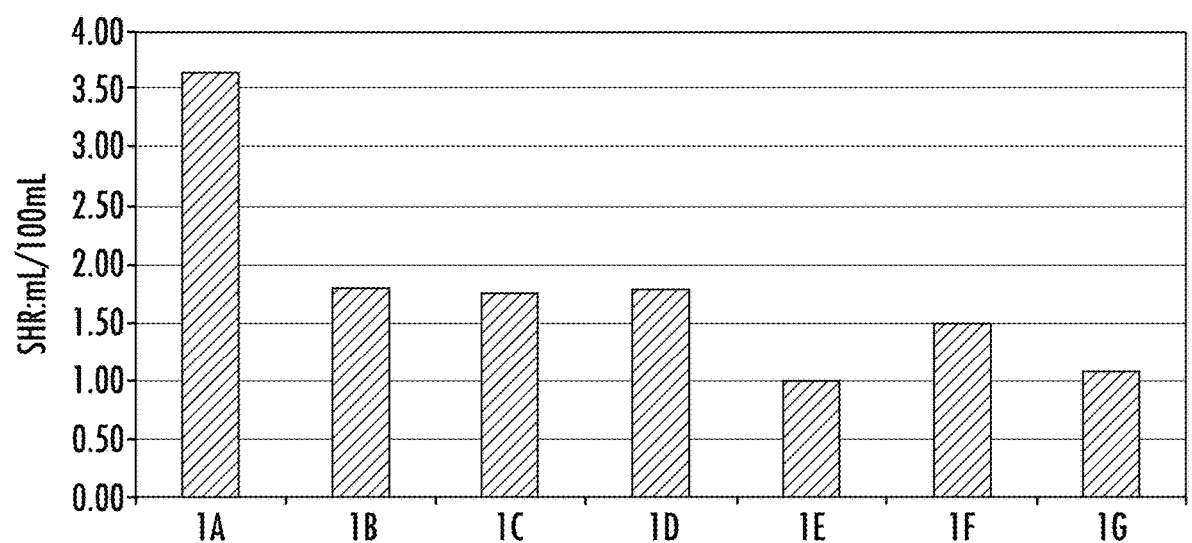
FIG. 22 graphically depicts the SHR (y-axis) of glass vial samples made on the converter of FIG. 1 having different configurations (x-axis) using a gas flow system illustrating influence of delivering gas flow at various points in the converting process, according to one or more embodiments shown and described herein.

Each of the sample vials of Example 1 were evaluated for SHR according to the Surface Glass Test described in USP <660>. The SHR assessments were performed on the sample vials, which were not annealed, but rather were in their as-converted state prior to any post conversion processing. The results of the SHR evaluation for each of the samples of Example 1 are provided in FIG. 22 in units of milliliters of HCl per 100 milliliters of analyte (ml/100 ml analyte). As shown in FIG. 22, Sample 1A represents the baseline SHR of the converted glass vials manufactured without introducing a gas pulse or purge at the distal end of the glass tube.

In case 1F, the gas flow system was installed but no flow was used to deliver a gas pulse to the distal end of the glass tubes during the converting process. Instead, the gas flow system acted as a plug that prevented the flow of gases and vapors up through the internal volume of the glass tube by blocking one open end of the glass tube. This approach for case 1F provides an example similar to the conventional converting technique of making the glass articles from glass tubes with one end closed (i.e., the distal end of the glass tube is closed). As shown in FIG. 22, blocking or plugging one end of the glass tube as in Sample 1F reduced the SHR of the glass vial to about 1.5 ml/100 ml analyte. As previously discussed, the highest levels of vaporized volatile constituents are created in the hottest portion (i.e., portions of the process resulting in the highest glass temperatures) of the converting process, which include thermal separation and piercing operations. Not intending to be bound by theory, once created, the vaporized volatile constituents may be carried upward or downward within the internal volume of the glass tube as the glass tube progresses through the converting process. The direction (i.e., upward or downward) in which the vaporized volatile constituents are carried may be influenced by environmental factors, such as, but not limited to, positioning of venting exhaust hoods; bouyancy chimney effect forces from the hot gases rising in the glass tube; Venturi-type flows resulting from burner heating, which induce internal flow within the glass tube; or combinations of these. It can be appreciated that these effects can vary widely with the design and operation of a converting environment. This Example 1F is an illustration of the SHR implications on this glass by mitigating upward transport flow of the vaporized volatile constituents through the internal volume of the glass tube by closing the distal end of the glass tube.

For Examples 1B-1D, a gas pulse is introduced to the glass tube after the piercing step. The glass reaches its greatest temperature in the piercing step, which is only slightly greater than the glass temperatures experienced during thermal separation. As previously discussed, increasing the glass temperature increases the rate at which volatile constituents are vaporized from the glass. Thus, it is understood that the greatest rate of vaporization of volatile constituents occurs during the piercing and thermal separation steps, during which the glass temperatures are the greatest. Examples 1B-1E demonstrate the SHR impact of ejection or purging of the vaporized volatile constituent laden gases in the interior volume of the glass tube being processed. Comparison of Examples 1E and 1G to Example 1F show that delivering the gas pulse at the distal end of the glass tube during tube separation in the separation station A5 provides additional reduction in the SHR of the vials compared to just capping the distal end of the glass tube as in Example 1F. The impact of gas purging the glass tube during piercing on SHR performance is shown to exceed other effects which could be at play, such as the dynamics of piercing which would influence the degree and amount of volatiles which get injected into the tube interior at this step.

Note that for samples 1E and 1G, introducing the gas pulse at the separating station A5 resulted in further reduction in SHR of the glass vials. One can see that SHR of approximately 1.0 was shown with purging at separation. These examples show the beneficial effects of air pulse which ejects volatile laden gases generated at thermal separation and pierce. Note that in sample 1E, the piercing burner functioned as normal so that the benefit of SHR was attributable to the efficacy of the purging pulse. This is further evidence of the benefit of purging the tube interior of volatiles Example 1G providing interesting and unexpected results. In Example 1G, the pulse of gas flow was delivered during the entire thermal separation process step. It was discovered that at certain purge flows (i.e., volume flow rate of the gas), the flow would spontaneously open the meniscus of glass remaining after separation and eliminate the need for piercing at the next processing station. Eliminating the requirement for piercing in a vial conversion process can be of significant benefit to reducing SHR by eliminating the highest temperature area of the process and may also simplify the process and potentially enable faster part making speeds. This discovery enabled further research into other approaches to eliminate or minimize dependency on a piercing burner, covered in some of the examples below.

Example 2

For Example 2, glass vials were made using a Vial Forming Machine Model RP18 with Automatic Tube Feeder manufactured by AMBEG Dr. J. Dichter GmbH, which included eighteen processing stations in the main circuit and nine secondary processing stations in the secondary circuit. A gas flow system according to FIG. 5 was installed at the piercing station of the RP18 converter and configured to deliver a gas flow pulse to the distal end of the glass tube only at the piercing station. The convertor was setup to make approximately equivalent ISO 2R vials with 16.75 mm OD tube, 1.1 mm wall thickness, at 31 ppm conversions speed.

The gas pulse flow was increased to 2500 cubic feet per minute (cfm), which showed to be sufficient to open the molten glass meniscus formed at the proximal end of the glass tube, thus demonstrating the feasibility of piercing the meniscus using the gas pulse, as initially discovered in Example 1 previously discussed. It can be appreciated that the flow required to open the molten end of the tube changes depending on the distance between the glass tube and the external injective device, the specific geometry of the injector nozzle, glass temperature, meniscus thickness, and other process conditions which would be expected to differ in converting environments.

Figure 23:
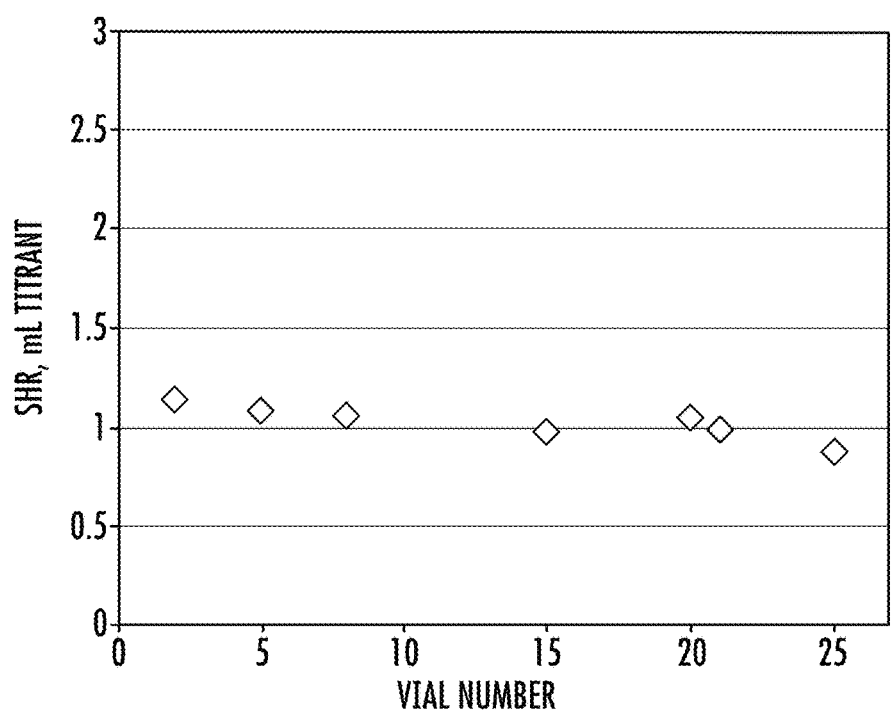
FIG. 23 graphically depicts the SHR (y-axis) of glass vials (x-axis) produced on the converter of FIG. 1 in which externally injected air was added at the piercing station and the meniscus of the glass tube was opened with the same gas pulse, according to one or more embodiments shown and described herein.

The glass vials produced in Example 2, were evaluated for SHR according to the Surface Glass Test described in USP <660>. The SHR assessments were performed on the sample vials, which were not annealed, but rather were in their as-converted state prior to any post conversion processing. The results of the SHR for the randomly selected vials of Example 2 are provided in FIG. 23. The SHR results in FIG. 23, which were obtained using externally injected air purge flow, are comparable to the SHR results for Examples 1E and 1G shown in FIG. 22, in which the gas purge was delivered in an otherwise closed end environment. Example 2 is further evidence of the benefits of ejection of vaporized volatile constituents from the internal volume of the glass tube during converting on the SHR of the converted glass articles. Example 2 also demonstrates the discovery that the air flow pulse can be used to open the meniscus formed on the proximal end of the glass tube during thermal separation and this can be manifested beyond a close coupled manifold of Example 1 to a more practical externally injected manifestation.

Example 3

Example 3 illustrates the benefit of inducing purging flows by using suction devices to reduce SHR of the glass tube during the converting process. The converter used for Example 3 was a Vial Forming Machine Model RP16 with Automatic Tube Feeder manufactured by AMBEG Dr. J. Dichter GmbH, which included sixteen processing stations in the main circuit and eight secondary processing stations in the secondary circuit. The converter was outfitted with a suction system having a plurality of suction tubes, similar to FIG. 12A. Each heating station downstream of piercing station was equipped with one of the suction tubes. This configuration was used to demonstrate effectiveness of inducing internal air purging by inducing downward flow by external suction rather than by positively introducing a flow of gas to the glass tube, as in Example 1. Referring to Table 1 hereinabove, the stations equipped with suction tubes included stations A7, A8, A9, A11, and A13. For this Example 3, alumina suction tubes were oriented below the glass tube end with the proximal end of the suction tube spaced apart from the proximal end of the glass tube by from 7 mm to 10 mm. For this illustration, flow was regulated through a manifolded piping system to a suction pump. In this case of this experiment, it was important to limit flow levels to not overheat the experimental piping system temperature limits, though engineering solutions for higher temperature exhaust could be straightforwardly manifested in a production type environment.

As with the other examples, the convertor was setup to make approximately equivalent ISO 2R vials with 16.75 mm OD tube, 1.1 mm wall thickness, at 31 ppm conversions speed. The sample vials for Example 3 were evaluated for SHR according to the Surface Glass Test described in USP <660>. The SHR assessments were performed on the sample vials, which were not annealed, but rather were in their as-converted state prior to any post conversion processing. As a baseline (i.e., sample 3A), sample glass vials were produced from glass tube using the converter without applying suction at any of the processing stations. For samples 3B, the sample vials were produced on the converter and vacuum was applied to the proximal end of each glass tube at each of the heating stations after the piercing station.

Figure 24:
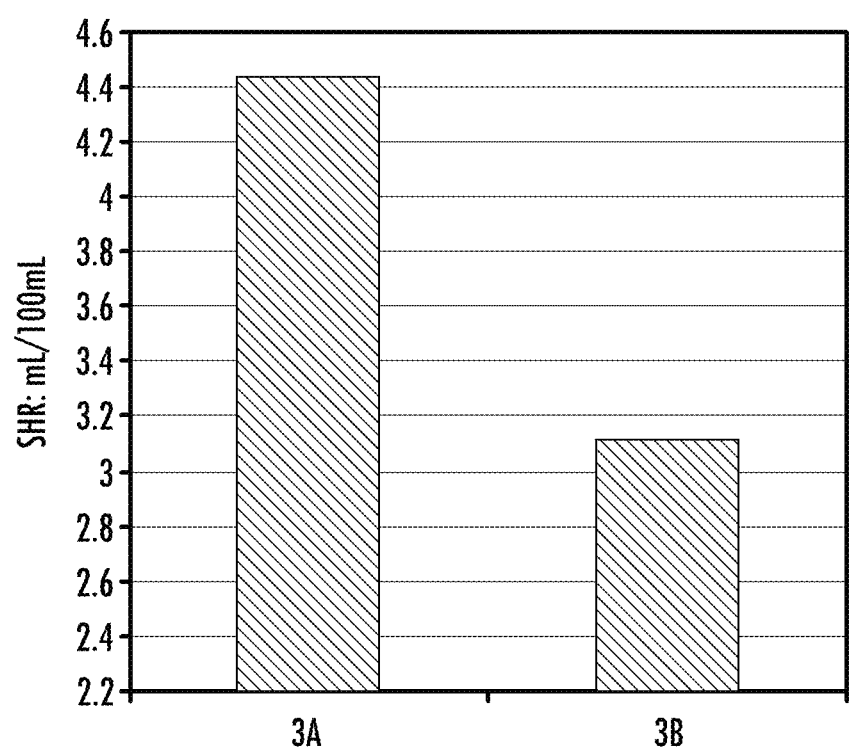
FIG. 24 graphically depicts the SHR (y-axis) of glass vials produced by the converter of FIG. 1 with and without suction induced downward flow induced at burner stations after piercing, according to one or more embodiments shown and described herein.

FIG. 24 shows the results in SHR (ml of 0.1 molar HCl required to titrate 100 ml of solution) for samples 3A and 3B. The baseline SHR value of 4.44 milliliters per 100 milliliters of analyte for samples 3A made by the conversion process with no SHR mitigation was reduced to 3.12 for sample 3B by application of the suction tubes to post piercing burner locations. The SHR result achieved with application of suction tubes therefore represents a 70% reduction in the total contribution of all forming steps. It should be noted that baseline SHR in this case was significantly higher in this example than others. Not intending to be bound by theory, it is believed that higher temperature glass process conditions and unfavorable exhaust flows may have increased the baseline SHR in this Example 3. The Example 3 results illustrate the benefits to SHR performance of the glass articles resulting from purging of the glass tube interior by externally applied suction induced flows. It should also be noted that further experiments showed the volatile gas clouds tend to move upward through the internal volume of the glass tube mainly during the index (i.e., the time when the converter turret is moving the glass tubes between processing stations). From example 3 results, it is expected that suction approaches, such as those described in in this disclosure, would produce a purging flow effect resulting in improvements in SHR performance similar to those demonstrated in Examples 1 and 2 for positive air flow embodiments.

While various embodiments of the converter 100 and system and methods for reducing the SHR of the glass tube 102 during the converting process have been described herein, it should be understood that it is contemplated that each of these embodiments and techniques may be used separately or in conjunction with one or more embodiments and techniques.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A system for producing glass articles from glass tubing comprising:
   a converter including a plurality of processing stations, a base, a main turret, and a secondary turret, wherein:
      the plurality of processing stations comprise at least one heating station, at least one forming station, and a separating station;
      the converter is operable to index a glass tube through the plurality of processing stations; and
      the main turret comprises the at least one heating station, the at least one forming station, and the separating station; and
   a gas flow system comprising:
      a manifold fluidly couplable to a gas source; and
      a plurality of glass tube connectors, each glass tube connector removably coupleable to a distal end of the glass tube and fluidly coupled to the manifold by a conduit, wherein:
         the manifold is separate from and positioned above the base and the main turret;
         the manifold comprises an inner ring having a gas supply channel and an outer ring surrounding the inner ring and rotatable with the main turret relative to the inner ring;
         when each glass tube connector is coupled to the glass tube, at least a portion of the glass tube connector is disposed inside of the glass tube; and for at least one of the glass tube connectors, the gas flow system is operable to pass a gas from the manifold, through the conduit, through the glass tube connector, and into the glass tube through the distal end of the glass tube, and wherein passing the gas into the distal end of the glass tube produces a flow of gas adjacent to a proximal end of the glass tube, the flow of gas operable to remove at least a portion of an atmosphere from an interior of the glass tube and reduce contamination of an inner surface of the glass tube by alkali released from the glass tube.

2. The system of claim 1, wherein the gas flow system is operable to deliver a gas pulse to the distal end of the glass tube.

3. The system of claim 2, wherein the gas pulse has a duration less than a sum of an index time and a dwell time of the converter.

4. The system of claim 2, wherein the separating station is a thermal separating station and the gas pulse is sufficient to open a meniscus of glass formed at the proximal end of the glass tube during thermal separation.

5. The system of claim 1, wherein each of the plurality of glass tube connectors includes a central bore extending axially through the glass tube connector and a swivel connector disposed at least partially within the central bore, wherein the swivel connector allows the glass tube to rotate relative to the manifold, and the interference fit between the glass tube connector and the glass tube maintains the orientation of the glass tube connector relative to the glass tube during rotation of the glass tube.

6. The system of claim 1, wherein the manifold comprises a plurality of valves, each of the plurality of valves fluidly coupled to one of the plurality of glass tube connectors.

7. The system of claim 6, wherein the manifold comprises a plurality of valve actuators, each of the plurality of valve actuators operatively coupled to one of the plurality of valves, wherein each valve actuator is operable to open and close the associated valve to deliver the gas pulse to the distal end of the glass tube.

8. The system of claim 1, further comprising at least one flow meter fluidly coupled to the manifold and operable to measure a flow rate or a total flow of the gas pulse to the distal end of the glass tube.

9. The system of claim 1, wherein the gas flow system further comprises at least one flow controller operable to vary a flow rate of the gas in response to changes in a length of the glass tube.

10. The system of claim 1, wherein the manifold comprises:
an inner ring having a gas supply channel; and
an outer ring surrounding the inner ring and rotatable with a main turret of the converter relative to the inner ring, the outer ring having a plurality of gas delivery channels, each of the gas delivery channels fluidly coupled to one of the plurality of glass tube connectors;
wherein the manifold is operable to align one of the plurality of gas delivery channels of the outer ring with the gas supply channel of the inner ring to fluidly couple one of the plurality of glass tubes to the gas source.

11. A method for producing an article from a glass tube having an inner surface comprising:
introducing the glass tube to the system of claim 1 for producing glass articles from glass tubing;
heating the proximal end of the glass tube at the at least one heating station, wherein alkali is released from the glass tube during the heating;
forming at least one feature of the article at the proximal end of the glass tube in the at least one forming station;
separating the article from the proximal end of the glass tube at a separating station; and
introducing the flow of gas into the glass tube through the distal end of the glass tube by the gas flow system of the system of claim 1.

12. The method of claim 11, wherein separating the article from the glass tube comprises thermal separation that produces a meniscus of glass across the proximal end of the glass tube and wherein the flow of gas adjacent to the proximal end of the glass tube is sufficient to open the meniscus.

13. The method of claim 11, wherein introducing the flow of gas comprises introducing a gas pulse to the distal end of the glass tube.

14. The method of claim 13, wherein the gas pulse has a duration less than the sum of a dwell time and an index time of the converter.

15. The method of claim 13, wherein separating the article from the glass tube comprises thermal separation that produces a meniscus of glass across the proximal end of the glass tube and wherein the gas pulse is sufficient to open the meniscus.

16. The method of claim 13, wherein a plurality of gas pulses are introduced to the distal end of the glass tube.

17. The method of claim 13, further comprising controlling at least one of a duration of the gas pulse, a pressure of the gas pulse, or a volume flow rate of the gas pulse in response to changes in a length of the glass tube.

18. The method of claim 13, further comprising controlling at least one of a duration of the gas pulse, a pressure of the gas pulse, or a volume flow rate of the gas pulse in response to changes in the tube diameter, wall thickness, glass type, converter operating temperatures, or combinations of these.

19. The method of claim 11, comprising introducing the flow of gas to the distal end of the glass tube when the glass tube is positioned in one of the plurality of processing stations.

20. A system for producing glass articles from glass tubing comprising:
a converter comprising a plurality of processing stations, a base, a main turret, and a secondary turret, wherein:
the plurality of processing stations comprise at least one heating station, at least one forming station, and a separating station;
the main turret comprises the at least one heating station, the at least one forming station, and the separating station; and
the converter is operable to index a glass tube through the plurality of processing stations; and
a gas flow system comprising:
a manifold fluidly coupleable to a gas source, wherein:
the manifold is separate from and positioned above the base and the main turret; and
the manifold comprises an inner ring having a gas supply channel and an outer ring surrounding the inner ring and rotatable with the main turret of the converter relative to the inner ring; and
a plurality of glass tube connectors, each glass tube connector removably coupleable to a distal end of the glass tube and fluidly coupled to the manifold by a conduit, wherein when each glass tube connector is coupled to the glass tube, at least a portion of the glass tube connector is disposed inside of the glass tube and the glass tube connector forms an interference fit with an inner surface of the glass tube, the interference fit maintaining the orientation of the glass tube connector relative to the glass tube upon a movement of either the glass tube or the glass tube connector;

wherein for at least one of the glass tube connectors, the gas flow system is operable to pass a gas from the manifold, through the conduit, through the glass tube connector, and into the glass tube through the distal end of the glass tube, and wherein passing the gas into the distal end of the glass tube produces a flow of gas adjacent to a proximal end of the glass tube, the flow of gas operable to remove at least a portion of an atmosphere from an interior of the glass tube and reduce contamination of an inner surface of the glass tube by alkali released from the glass tube.

21. The system of claim 20, wherein the manifold is coupled to the main turret.

22. The system of claim 20 wherein:

the outer ring comprises an inner surface; and the inner ring comprises an outer surface in slideable contact with the inner surface of the outer ring.

* * * * *